US008151884B2

(12) United States Patent
Kaminsky et al.

(10) Patent No.: US 8,151,884 B2
(45) Date of Patent: Apr. 10, 2012

(54) COMBINED DEVELOPMENT OF OIL SHALE BY IN SITU HEATING WITH A DEEPER HYDROCARBON RESOURCE

(75) Inventors: Robert D. Kaminsky, Houston, TX (US); William A. Symington, Houston, TX (US); Jesse D. Yeakel, Missouri City, TX (US); Michele M. Thomas, Houston, TX (US); Steve R. Krohn, Spring, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 454 days.

(21) Appl. No.: 11/973,750

(22) Filed: Oct. 10, 2007

(65) Prior Publication Data

US 2008/0087427 A1 Apr. 17, 2008

Related U.S. Application Data

(60) Provisional application No. 60/851,542, filed on Oct. 13, 2006.

(51) Int. Cl.
*E21B 36/00* (2006.01)
*E21B 43/24* (2006.01)

(52) U.S. Cl. ....... 166/302; 166/369; 166/60; 166/272.1; 166/245

(58) Field of Classification Search .................. None
See application file for complete search history.

(56) References Cited

U.S. PATENT DOCUMENTS

| 363,419 | A | 5/1887 | Poetsch |
|---|---|---|---|
| 895,612 | A | 8/1908 | Baker |
| 1,342,780 | A | 6/1920 | Vedder |
| 1,422,204 | A | 7/1922 | Hoover et al. |
| 1,666,488 | A | 4/1928 | Crawshaw |

(Continued)

FOREIGN PATENT DOCUMENTS

CA 994694 8/1976

(Continued)

OTHER PUBLICATIONS

Boyer, H. E. et al. (1985) "Chapter 16: Heat-Resistant Materials," *Metals Handbook*, American Society for Metals, 16 pages.

(Continued)

*Primary Examiner* — Angela M DiTrani
(74) *Attorney, Agent, or Firm* — ExxonMobil Upstream Research Company Law Department

(57) ABSTRACT

A method for producing hydrocarbons from subsurface formations at different depths is first provided. In one aspect, the method includes the step of heating organic-rich rock, in situ, within a subsurface formation at a first depth. The result of the heating step is that at least a portion of the organic-rich rock is pyrolyzed into hydrocarbon fluids. Preferably, the organic-rich rock of the subsurface formation of the first depth is oil shale. The method also includes providing at least one substantially unheated zone within the formation of the first depth. In this way, the organic-rich rock in that zone is left substantially unpyrolyzed. The method further includes drilling at least one production well through the unheated zone, and completing the at least one production well in a subsurface formation at a second depth that is deeper than the first depth. Thereafter, hydrocarbon fluids are produced through the at least one production well.

46 Claims, 9 Drawing Sheets

U.S. PATENT DOCUMENTS

| | | | |
|---|---|---|---|
| 1,701,884 A | 2/1929 | Hogle | |
| 1,872,906 A | 8/1932 | Doherty | |
| 2,033,560 A | 3/1936 | Wells | 166/1 |
| 2,033,561 A | 3/1936 | Wells | 166/21 |
| 2,534,737 A | 12/1950 | Rose | 73/38 |
| 2,584,605 A | 2/1952 | Merriam et al. | |
| 2,634,961 A | 4/1953 | Ljungstrom | 262/3 |
| 2,732,195 A | 1/1956 | Ljungstrom | 262/3 |
| 2,777,679 A | 1/1957 | Ljungstrom | 262/3 |
| 2,780,450 A | 2/1957 | Ljungstrom | 262/3 |
| 2,795,279 A | 6/1957 | Sarapuu | |
| 2,812,160 A | 11/1957 | West et al. | 255/1.4 |
| 2,813,583 A | 11/1957 | Marx et al. | |
| 2,847,071 A | 8/1958 | De Priester | 166/39 |
| 2,887,160 A | 5/1959 | De Priester et al. | 166/59 |
| 2,895,555 A | 7/1959 | De Priester | 166/59 |
| 2,923,535 A | 2/1960 | Ljungstrom | 262/3 |
| 2,944,803 A | 7/1960 | Hanson | 262/3 |
| 2,952,450 A | 9/1960 | Purre | 262/3 |
| 2,974,937 A | 3/1961 | Kiel | |
| 3,004,601 A | 10/1961 | Bodine | 166/39 |
| 3,013,609 A | 12/1961 | Brink | 166/39 |
| 3,095,031 A | 6/1963 | Eurenius et al. | 158/99 |
| 3,106,244 A | 10/1963 | Parker | |
| 3,109,482 A | 11/1963 | O'Brien | 158/115 |
| 3,127,936 A | 4/1964 | Eurenius | 166/39 |
| 3,137,347 A | 6/1964 | Parker | 166/39 |
| 3,149,672 A | 9/1964 | Orkiszewski et al. | 166/39 |
| 3,170,815 A | 2/1965 | White | |
| 3,180,411 A | 4/1965 | Parker | 166/11 |
| 3,183,675 A | 5/1965 | Schroeder | 61/36 |
| 3,183,971 A | 5/1965 | McEver et al. | |
| 3,194,315 A | 7/1965 | Rogers | 166/57 |
| 3,205,942 A | 9/1965 | Sandberg | |
| 3,225,829 A | 12/1965 | Chown et al. | 166/59 |
| 3,228,869 A | 1/1966 | Irish | |
| 3,241,611 A | 3/1966 | Dougan | 166/7 |
| 3,241,615 A | 3/1966 | Brandt et al. | 166/59 |
| 3,254,721 A | 6/1966 | Smith et al. | 166/59 |
| 3,256,935 A | 6/1966 | Nabor et al. | 166/9 |
| 3,263,211 A | 7/1966 | Heidman | |
| 3,267,680 A | 8/1966 | Schlumberger | 61/36 |
| 3,271,962 A | 9/1966 | Dahms et al. | 61/36 |
| 3,284,281 A | 11/1966 | Thomas | 166/2 |
| 3,285,335 A | 11/1966 | Reistle, Jr. | |
| 3,288,648 A | 11/1966 | Jones | |
| 3,294,167 A | 12/1966 | Vogel | 166/11 |
| 3,295,328 A | 1/1967 | Bishop | 61/0.5 |
| 3,323,840 A | 6/1967 | Mason et al. | |
| 3,358,756 A | 12/1967 | Vogel | |
| 3,372,550 A | 3/1968 | Schroeder | 61/36 |
| 3,376,403 A | 4/1968 | Mircea | 219/10.49 |
| 3,382,922 A | 5/1968 | Needham | |
| 3,400,762 A | 9/1968 | Peacock et al. | 166/11 |
| 3,436,919 A | 4/1969 | Shock et al. | 61/0.5 |
| 3,439,744 A | 4/1969 | Bradley | |
| 3,455,391 A | 7/1969 | Matthews et al. | 166/303 |
| 3,468,376 A | 9/1969 | Slusser et al. | 166/272 |
| 3,500,913 A | 3/1970 | Nordgren et al. | 166/259 |
| 3,501,201 A | 3/1970 | Closmann et al. | 299/4 |
| 3,502,372 A | 3/1970 | Prats | |
| 3,513,914 A | 5/1970 | Vogel | 166/271 |
| 3,515,213 A | 6/1970 | Prats | |
| 3,516,495 A | 6/1970 | Patton | |
| 3,521,709 A | 7/1970 | Needham | |
| 3,528,252 A | 9/1970 | Gail | 61/36 |
| 3,528,501 A | 9/1970 | Parker | |
| 3,547,193 A | 12/1970 | Gill | |
| 3,559,737 A | 2/1971 | Ralstin et al. | 166/281 |
| 3,572,838 A | 3/1971 | Templeton | |
| 3,599,714 A | 8/1971 | Messman | 166/258 |
| 3,602,310 A | 8/1971 | Halbert | 166/303 |
| 3,613,785 A | 10/1971 | Closmann et al. | 166/271 |
| 3,620,300 A | 11/1971 | Crowson | 166/248 |
| 3,642,066 A | 2/1972 | Gill | 166/248 |
| 3,661,423 A | 5/1972 | Garret | |
| 3,692,111 A | 9/1972 | Breithaupt et al. | 166/252 |
| 3,695,354 A | 10/1972 | Dilgren et al. | |
| 3,700,280 A | 10/1972 | Papadopoulos et al. | |
| 3,724,225 A | 4/1973 | Mancini et al. | 62/12 |
| 3,729,965 A | 5/1973 | Gartner | 70/395 |
| 3,730,270 A | 5/1973 | Allred | |
| 3,739,851 A | 6/1973 | Beard | |
| 3,741,306 A | 6/1973 | Papadopoulos | 166/252 |
| 3,759,328 A | 9/1973 | Ueber et al. | |
| 3,759,329 A | 9/1973 | Ross | 166/308.1 |
| 3,759,574 A | 9/1973 | Beard | |
| 3,779,601 A | 12/1973 | Beard | |
| 3,880,238 A | 4/1975 | Tham et al. | |
| 3,882,937 A | 5/1975 | Robinson | 166/267 |
| 3,882,941 A | 5/1975 | Pelofsky | |
| 3,888,307 A | 6/1975 | Closmann | |
| 3,924,680 A | 12/1975 | Terry | |
| 3,943,722 A | 3/1976 | Ross | 61/36 |
| 3,950,029 A | 4/1976 | Timmins | 299/2 |
| 3,958,636 A | 5/1976 | Perkins | |
| 3,967,853 A | 7/1976 | Closmann et al. | |
| 3,978,920 A | 9/1976 | Badyopadhyay et al. | 166/258 |
| 3,999,607 A | 12/1976 | Pennington et al. | |
| 4,003,432 A | 1/1977 | Paull et al. | 166/271 |
| 4,005,750 A | 2/1977 | Shuck | 166/308 |
| 4,007,786 A | 2/1977 | Schlinger | |
| 4,008,762 A | 2/1977 | Fisher et al. | |
| 4,008,769 A | 2/1977 | Chang | |
| 4,014,575 A | 3/1977 | French et al. | |
| 4,030,549 A | 6/1977 | Bouck | 166/280 |
| 4,037,655 A | 7/1977 | Carpenter | |
| 4,043,393 A | 8/1977 | Fisher et al. | |
| 4,047,760 A | 9/1977 | Ridley | |
| 4,057,510 A | 11/1977 | Crouch et al. | |
| 4,065,183 A | 12/1977 | Hill et al. | |
| 4,067,390 A | 1/1978 | Camacho et al. | 166/302 |
| 4,069,868 A | 1/1978 | Terry | |
| 4,071,278 A | 1/1978 | Carpenter et al. | 299/5 |
| 4,093,025 A | 6/1978 | Terry | |
| 4,096,034 A | 6/1978 | Anthony | 176/87 |
| 4,125,159 A | 11/1978 | Vann | 166/285 |
| 4,140,180 A | 2/1979 | Bridges et al. | 166/248 |
| 4,149,595 A | 4/1979 | Cha | |
| 4,160,479 A | 7/1979 | Richardson et al. | |
| 4,163,475 A | 8/1979 | Cha et al. | |
| 4,167,291 A | 9/1979 | Ridley | |
| 4,169,506 A | 10/1979 | Berry | |
| 4,185,693 A | 1/1980 | Crumb et al. | |
| 4,186,801 A | 2/1980 | Madgavkar et al. | |
| 4,202,168 A | 5/1980 | Acheson et al. | |
| 4,239,283 A | 12/1980 | Ridley | |
| 4,246,966 A | 1/1981 | Stoddard et al. | |
| 4,250,230 A | 2/1981 | Terry | |
| 4,265,310 A | 5/1981 | Britton et al. | |
| 4,271,905 A | 6/1981 | Redford et al. | |
| 4,272,127 A | 6/1981 | Hutchins | |
| 4,285,401 A | 8/1981 | Erickson | |
| 4,318,723 A | 3/1982 | Holmes et al. | |
| 4,319,635 A | 3/1982 | Jones | 166/263 |
| 4,320,801 A | 3/1982 | Rowland et al. | |
| 4,324,291 A | 4/1982 | Wong et al. | |
| 4,340,934 A | 7/1982 | Segesman | |
| 4,344,485 A | 8/1982 | Butler | |
| 4,358,222 A | 11/1982 | Landau | 405/130 |
| 4,362,213 A | 12/1982 | Tabor | |
| 4,368,921 A | 1/1983 | Hutchins | 299/2 |
| 4,369,842 A | 1/1983 | Cha | |
| 4,372,615 A | 2/1983 | Ricketts | 299/2 |
| 4,375,302 A | 3/1983 | Kalmar | |
| 4,384,614 A | 5/1983 | Justheim | |
| 4,397,502 A | 8/1983 | Hines | 299/2 |
| 4,401,162 A | 8/1983 | Osborne | 166/248 |
| 4,412,585 A | 11/1983 | Bouck | 166/248 |
| 4,417,449 A | 11/1983 | Hegarty et al. | |
| 4,473,114 A | 9/1984 | Bell et al. | |
| 4,474,238 A | 10/1984 | Gentry et al. | 166/268 |
| 4,483,398 A | 11/1984 | Peters et al. | |
| 4,485,869 A | 12/1984 | Sresty et al. | 166/248 |
| 4,487,257 A | 12/1984 | Dauphine | 166/60 |
| 4,487,260 A | 12/1984 | Pittman et al. | 166/259 |
| 4,511,382 A | 4/1985 | Valencia et al. | 62/20 |

| Patent No. | Date | Inventor | Class |
|---|---|---|---|
| 4,533,372 A | 8/1985 | Valencia et al. | 62/12 |
| 4,537,067 A | 8/1985 | Sharp et al. | 73/151 |
| 4,545,435 A | 10/1985 | Bridges et al. | |
| 4,546,829 A | 10/1985 | Martin et al. | |
| 4,550,779 A | 11/1985 | Zakiewicz | 166/248 |
| 4,567,945 A | 2/1986 | Segalman | 166/248 |
| 4,589,491 A | 5/1986 | Perkins | 166/302 |
| 4,589,973 A | 5/1986 | Minden | |
| 4,602,144 A | 7/1986 | Vogel | |
| 4,607,488 A | 8/1986 | Karinthi et al. | 62/45 |
| 4,626,665 A | 12/1986 | Fort | 219/534 |
| 4,633,948 A | 1/1987 | Closmann | |
| 4,634,315 A | 1/1987 | Owen et al. | 405/217 |
| 4,637,464 A | 1/1987 | Forgac et al. | |
| 4,640,352 A | 2/1987 | Vanmeurs et al. | 166/245 |
| 4,671,863 A | 6/1987 | Tejeda | |
| 4,694,907 A | 9/1987 | Stahl et al. | 166/303 |
| 4,704,514 A | 11/1987 | Van Egmond et al. | 219/278 |
| 4,705,108 A | 11/1987 | Little et al. | 166/248 |
| 4,706,751 A | 11/1987 | Gondouin | |
| 4,730,671 A | 3/1988 | Perkins | |
| 4,737,267 A | 4/1988 | Pao et al. | |
| 4,747,642 A | 5/1988 | Gash et al. | 299/11 |
| 4,754,808 A | 7/1988 | Harmon et al. | 166/254 |
| 4,776,638 A | 10/1988 | Hahn | |
| 4,779,680 A | 10/1988 | Sydansk | |
| 4,815,790 A | 3/1989 | Rosar et al. | |
| 4,817,711 A | 4/1989 | Jeambey | |
| 4,828,031 A | 5/1989 | Davis | |
| 4,860,544 A | 8/1989 | Krieg et al. | 62/45 |
| 4,886,118 A | 12/1989 | Van Meurs et al. | 166/245 |
| 4,923,493 A | 5/1990 | Valencia et al. | 62/13 |
| 4,926,941 A | 5/1990 | Glandt et al. | 166/248 |
| 4,928,765 A | 5/1990 | Nielson | |
| 4,929,341 A | 5/1990 | Thirumalachar et al. | |
| 4,974,425 A | 12/1990 | Krieg et al. | 62/45.1 |
| 5,016,709 A | 5/1991 | Combe et al. | 166/245 |
| 5,036,918 A | 8/1991 | Jennings et al. | |
| 5,050,386 A | 9/1991 | Krieg et al. | 62/45.1 |
| 5,055,030 A | 10/1991 | Schirmer | |
| 5,055,180 A | 10/1991 | Klaila | |
| 5,082,055 A | 1/1992 | Hemsath | |
| 5,085,276 A | 2/1992 | Rivas et al. | |
| 5,117,908 A | 6/1992 | Hofmann | |
| 5,120,338 A | 6/1992 | Potts, Jr. et al. | 62/12 |
| 5,217,076 A | 6/1993 | Masek | |
| 5,236,039 A | 8/1993 | Edelstein | |
| 5,255,742 A | 10/1993 | Mikus | 166/303 |
| 5,275,063 A | 1/1994 | Steiger et al. | 73/865 |
| 5,297,626 A | 3/1994 | Vinegar et al. | 166/271 |
| 5,305,829 A | 4/1994 | Kumar | 166/245 |
| 5,372,708 A | 12/1994 | Gewertz | |
| 5,377,756 A | 1/1995 | Northrop et al. | |
| 5,392,854 A | 2/1995 | Vinegar et al. | 166/271 |
| 5,411,089 A | 5/1995 | Vinegar et al. | 166/272 |
| 5,416,257 A | 5/1995 | Peters | 588/1 |
| 5,620,049 A | 4/1997 | Gipson et al. | 166/248 |
| 5,621,844 A | 4/1997 | Bridges | |
| 5,661,977 A | 9/1997 | Shnell | |
| 5,730,550 A | 3/1998 | Andersland et al. | 405/128 |
| 5,838,634 A | 11/1998 | Jones et al. | |
| 5,844,799 A | 12/1998 | Joseph et al. | |
| 5,868,202 A | 2/1999 | Hsu | |
| 5,899,269 A | 5/1999 | Wellington et al. | 166/58 |
| 5,905,657 A | 5/1999 | Celniker | |
| 5,907,662 A | 5/1999 | Buettner | |
| 5,956,971 A | 9/1999 | Cole et al. | 62/623 |
| 6,015,015 A | 1/2000 | Luft et al. | |
| 6,016,867 A | 1/2000 | Gregoli et al. | |
| 6,023,554 A | 2/2000 | Vinegar et al. | 392/301 |
| 6,055,803 A | 5/2000 | Mastronarde et al. | |
| 6,056,057 A | 5/2000 | Vinegar et al. | |
| 6,079,499 A | 6/2000 | Mikus et al. | |
| 6,148,911 A | 11/2000 | Gipson et al. | 166/248 |
| 6,158,517 A | 12/2000 | Hsu | |
| 6,246,963 B1 | 6/2001 | Cross et al. | |
| 6,247,358 B1 | 6/2001 | Dos Santos | 73/152.11 |
| 6,328,104 B1 | 12/2001 | Graue | |
| 6,434,435 B1 | 8/2002 | Tubel et al. | |
| 6,480,790 B1 | 11/2002 | Calvert et al. | |
| 6,540,018 B1 | 4/2003 | Vinegar et al. | |
| 6,581,684 B2 | 6/2003 | Wellington et al. | 166/245 |
| 6,585,046 B2 | 7/2003 | Neuroth et al. | |
| 6,589,303 B1 | 7/2003 | Lokhandwala et al. | |
| 6,591,906 B2 | 7/2003 | Wellington et al. | |
| 6,607,036 B2 | 8/2003 | Ranson et al. | 166/302 |
| 6,609,761 B1 | 8/2003 | Ramey et al. | |
| 6,668,922 B2 | 12/2003 | Ziauddin et al. | |
| 6,684,644 B2 | 2/2004 | Mittricker et al. | 60/772 |
| 6,684,948 B1 | 2/2004 | Savage | |
| 6,708,758 B2 | 3/2004 | de Rouffignac et al. | 166/245 |
| 6,709,573 B2 | 3/2004 | Smith | |
| 6,712,136 B2 | 3/2004 | de Rouffignac et al. | 166/245 |
| 6,715,546 B2 | 4/2004 | Vinegar et al. | 166/245 |
| 6,722,429 B2 | 4/2004 | de Rouffignac et al. | 166/245 |
| 6,742,588 B2 | 6/2004 | Wellington et al. | 166/245 |
| 6,745,831 B2 | 6/2004 | de Rouffignac et al. | |
| 6,745,832 B2 | 6/2004 | Wellington et al. | 166/245 |
| 6,752,210 B2 | 6/2004 | de Rouffignac et al. | |
| 6,754,588 B2 | 6/2004 | Cross et al. | |
| 6,764,108 B2 | 7/2004 | Ernst et al. | |
| 6,782,947 B2 | 8/2004 | de Rouffignac et al. | 166/245 |
| 6,796,139 B2 | 9/2004 | Briley et al. | |
| 6,820,689 B2 | 11/2004 | Sarada | |
| 6,832,485 B2 | 12/2004 | Sugarmen et al. | |
| 6,854,929 B2 | 2/2005 | Vinegar et al. | 405/129.65 |
| 6,858,049 B2 | 2/2005 | Mittricker | 48/127.7 |
| 6,877,555 B2 | 4/2005 | Karanikas et al. | |
| 6,880,633 B2 | 4/2005 | Wellington et al. | 166/245 |
| 6,887,369 B2 | 5/2005 | Moulton et al. | 208/107 |
| 6,896,053 B2 | 5/2005 | Berchenko et al. | 166/245 |
| 6,896,707 B2 | 5/2005 | O'Rear et al. | |
| 6,913,078 B2 | 7/2005 | Shahin et al. | 166/245 |
| 6,918,444 B2 | 7/2005 | Passey et al. | 166/258 |
| 6,923,155 B2 | 8/2005 | Gottemoller et al. | |
| 6,923,258 B2 | 8/2005 | Wellington et al. | 166/245 |
| 6,932,155 B2 | 8/2005 | Vinegar et al. | 166/245 |
| 6,948,562 B2 | 9/2005 | Wellington et al. | 166/272.1 |
| 6,951,247 B2 | 10/2005 | De Rouffignac et al. | |
| 6,953,087 B2 | 10/2005 | de Rouffignac et al. | 166/245 |
| 6,964,300 B2 | 11/2005 | Vinegar et al. | 166/245 |
| 6,969,123 B2 | 11/2005 | Vinegar et al. | 299/3 |
| 6,988,549 B1 | 1/2006 | Babcock | |
| 6,994,160 B2 | 2/2006 | Wellington et al. | |
| 6,997,518 B2 | 2/2006 | Vinegar et al. | |
| 7,001,519 B2 | 2/2006 | Linden et al. | |
| 7,004,247 B2 | 2/2006 | Cole et al. | |
| 7,004,251 B2 | 2/2006 | Ward et al. | |
| 7,011,154 B2 | 3/2006 | Maher et al. | 166/245 |
| 7,032,660 B2 | 4/2006 | Vinegar et al. | 166/245 |
| 7,036,583 B2 | 5/2006 | de Rouffignac et al. | 166/245 |
| 7,048,051 B2 | 5/2006 | McQueen | |
| 7,051,807 B2 | 5/2006 | Vinegar et al. | |
| 7,055,600 B2 | 6/2006 | Messier et al. | |
| 7,063,145 B2 | 6/2006 | Veenstra et al. | |
| 7,066,254 B2 | 6/2006 | Vinegar et al. | 166/245 |
| 7,073,578 B2 | 7/2006 | Vinegar et al. | 166/245 |
| 7,077,198 B2 | 7/2006 | Vinegar et al. | 166/245 |
| 7,077,199 B2 | 7/2006 | Vinegar et al. | 166/250.1 |
| 7,093,655 B2 | 8/2006 | Atkinson | 166/266 |
| 7,096,942 B1 | 8/2006 | de Rouffignac et al. | 166/245 |
| 7,096,953 B2 | 8/2006 | de Rouffignac et al. | 166/302 |
| 7,100,994 B2 | 9/2006 | Vinegar et al. | |
| 7,104,319 B2 | 9/2006 | Vinegar et al. | 166/245 |
| 7,121,342 B2 | 10/2006 | Vinegar et al. | 166/302 |
| 7,124,029 B2 | 10/2006 | Jammes et al. | |
| 7,165,615 B2 | 1/2007 | Vinegar et al. | |
| 7,181,380 B2 | 2/2007 | Dusterhoft et al. | |
| 7,198,107 B2 | 4/2007 | Maguire | |
| 7,219,734 B2 | 5/2007 | Bai et al. | |
| 7,225,866 B2 * | 6/2007 | Berchenko et al. | 166/245 |
| 7,243,618 B2 | 7/2007 | Gurevich | |
| 7,322,415 B2 | 1/2008 | de St. Remey | |
| 7,331,385 B2 | 2/2008 | Symington et al. | 166/248 |
| 7,353,872 B2 | 4/2008 | Sandberg | |
| 7,357,180 B2 | 4/2008 | Vinegar et al. | 166/254.1 |
| 7,441,603 B2 | 10/2008 | Kaminsky et al. | 166/308.1 |
| 7,461,691 B2 | 12/2008 | Vinegar et al. | |

| | | |
|---|---|---|
| 7,484,561 B2 | 2/2009 | Bridges |
| 7,516,785 B2 | 4/2009 | Kaminsky ............... 166/245 |
| 7,516,786 B2 | 4/2009 | Dallas et al. |
| 7,516,787 B2 | 4/2009 | Kaminsky ............. 166/250.1 |
| 7,546,873 B2 | 6/2009 | Kim et al. |
| 7,549,470 B2 | 6/2009 | Vinegar et al. |
| 7,556,095 B2 | 7/2009 | Vinegar |
| 7,617,869 B2 | 11/2009 | Carney |
| 7,631,691 B2 | 12/2009 | Symington et al. |
| 7,644,993 B2 | 1/2010 | Kaminsky et al. |
| 7,647,971 B2 | 1/2010 | Kaminsky |
| 7,647,972 B2 | 1/2010 | Kaminsky |
| 7,654,320 B2 | 2/2010 | Payton |
| 7,669,657 B2 | 3/2010 | Symington et al. |
| 7,743,826 B2 | 6/2010 | Harris et al. |
| 7,798,221 B2 | 9/2010 | Vinegar et al. |
| 7,857,056 B2 | 12/2010 | Kaminsky et al. |
| 7,860,377 B2 | 12/2010 | Vinegar et al. |
| 7,905,288 B2 | 3/2011 | Kinkead |
| 2001/0049342 A1 | 12/2001 | Passey et al. |
| 2002/0013687 A1 | 1/2002 | Ortoleva |
| 2002/0023751 A1 | 2/2002 | Neuroth et al. |
| 2002/0029882 A1 | 3/2002 | Rouffignac et al. |
| 2002/0049360 A1 | 4/2002 | Wellington et al. |
| 2002/0077515 A1 | 6/2002 | Wellington et al. |
| 2002/0099504 A1 | 7/2002 | Cross et al. |
| 2003/0080604 A1 | 5/2003 | Vinegar et al. |
| 2003/0085570 A1 | 5/2003 | Ernst et al. |
| 2003/0111223 A1 | 6/2003 | Rouffignac et al. |
| 2003/0131994 A1 | 7/2003 | Vinegar et al. |
| 2003/0131995 A1 | 7/2003 | de Rouffignac et al. |
| 2003/0178195 A1 | 9/2003 | Agee et al. |
| 2003/0183390 A1 | 10/2003 | Veenstra et al. |
| 2003/0192691 A1* | 10/2003 | Vinegar et al. ........... 166/250.12 |
| 2003/0196788 A1 | 10/2003 | Vinegar et al. |
| 2003/0196789 A1 | 10/2003 | Wellington |
| 2003/0209348 A1 | 11/2003 | Ward et al. |
| 2003/0213594 A1 | 11/2003 | Wellington et al. |
| 2004/0020642 A1 | 2/2004 | Vinegar et al. |
| 2004/0140095 A1 | 7/2004 | Vinegar et al. |
| 2004/0198611 A1 | 10/2004 | Atkinson |
| 2004/0211557 A1 | 10/2004 | Cole et al. |
| 2005/0051327 A1 | 3/2005 | Vinegar et al. |
| 2005/0252656 A1 | 11/2005 | Maguire |
| 2005/0252832 A1 | 11/2005 | Doyle et al. |
| 2005/0252833 A1 | 11/2005 | Doyle et al. |
| 2005/0269077 A1 | 12/2005 | Sandberg ............... 166/249 |
| 2005/0269088 A1 | 12/2005 | Vinegar et al. |
| 2006/0021752 A1 | 2/2006 | de St. Remey |
| 2006/0100837 A1 | 5/2006 | Symington et al. |
| 2006/0213657 A1 | 9/2006 | Berchenko et al. |
| 2007/0000662 A1 | 1/2007 | Symington et al. |
| 2007/0023186 A1 | 2/2007 | Kaminsky et al. |
| 2007/0045265 A1 | 3/2007 | McKinzie, II ........... 219/207 |
| 2007/0045267 A1 | 3/2007 | Vinegar et al. |
| 2007/0084418 A1 | 4/2007 | Gurevich |
| 2007/0095537 A1 | 5/2007 | Vinegar |
| 2007/0102359 A1 | 5/2007 | Lombardi et al. |
| 2007/0131415 A1 | 6/2007 | Vinegar et al. |
| 2007/0144732 A1 | 6/2007 | Kim et al. ............... 166/245 |
| 2007/0209799 A1 | 9/2007 | Vinegar et al. ......... 166/302 |
| 2007/0246994 A1 | 10/2007 | Symington et al. |
| 2008/0087420 A1 | 4/2008 | Symington et al. |
| 2008/0087421 A1 | 4/2008 | Kaminsky |
| 2008/0087426 A1 | 4/2008 | Kaminsky |
| 2008/0087427 A1 | 4/2008 | Symington et al. ....... 166/272.1 |
| 2008/0087428 A1 | 4/2008 | Symington et al. ....... 166/272.2 |
| 2008/0173443 A1 | 7/2008 | Symington et al. ....... 166/248 |
| 2008/0185145 A1 | 8/2008 | Carney et al. |
| 2008/0207970 A1 | 8/2008 | Meurer et al. ............ 585/24 |
| 2008/0230219 A1 | 9/2008 | Kaminsky ............... 166/248 |
| 2008/0271885 A1 | 11/2008 | Kaminsky ............... 166/245 |
| 2008/0283241 A1 | 11/2008 | Kaminsky et al. ........ 166/245 |
| 2008/0289819 A1 | 11/2008 | Kaminsky et al. ........ 166/256 |
| 2008/0290719 A1 | 11/2008 | Symington et al. ....... 299/3 |
| 2009/0038795 A1 | 2/2009 | Kaminsky et al. |
| 2009/0050319 A1 | 2/2009 | Kaminsky et al. ........ 166/257 |
| 2009/0101346 A1 | 4/2009 | Vinegar et al. |
| 2009/0101348 A1 | 4/2009 | Kaminsky |
| 2009/0107679 A1 | 4/2009 | Kaminsky |
| 2009/0133935 A1 | 5/2009 | Kinkead |
| 2009/0145598 A1 | 6/2009 | Symington et al. ....... 166/250.01 |
| 2009/0308608 A1 | 12/2009 | Kaminsky et al. |
| 2010/0078169 A1 | 4/2010 | Symington et al. |
| 2010/0089575 A1 | 4/2010 | Kaminsky et al. |
| 2010/0089585 A1 | 4/2010 | Kaminsky |
| 2010/0095742 A1 | 4/2010 | Symington et al. |
| 2010/0101793 A1 | 4/2010 | Symington et al. |
| 2010/0218946 A1 | 9/2010 | Symington et al. |
| 2010/0282460 A1 | 11/2010 | Stone et al. |
| 2010/0319909 A1 | 12/2010 | Symington et al. |

FOREIGN PATENT DOCUMENTS

| | | | |
|---|---|---|---|
| CA | 1288043 | 8/1991 | ............... 166/38 |
| CA | 2560223 | 3/2007 | |
| EP | 0387846 | 9/1990 | |
| FR | EP 0866212 | 9/1998 | |
| GB | 855408 | 11/1960 | |
| GB | 1454324 | 11/1976 | |
| GB | 1463444 | 2/1977 | |
| GB | 1 478 880 | 7/1977 | |
| GB | 1501310 | 2/1978 | |
| GB | 1559948 | 1/1980 | |
| GB | 1595082 | 8/1981 | |
| WO | WO 82/01408 | 4/1982 | |
| WO | WO 90/06480 | 6/1990 | |
| WO | WO 99/67504 | 12/1999 | |
| WO | WO 01/78914 | 10/2001 | |
| WO | WO 01/81505 | 11/2001 | |
| WO | WO 02/085821 | 10/2002 | |
| WO | WO 2005/010320 | 2/2005 | |
| WO | WO 2005/045192 | 5/2005 | |
| WO | WO 2006/115943 | 11/2006 | |
| WO | WO2007/033371 | 3/2007 | |
| WO | WO2007/050445 | 5/2007 | |
| WO | WO 2007/050479 | 5/2007 | |
| WO | WO2010/047859 | 4/2010 | |

OTHER PUBLICATIONS

Brandt, H. et al. (1965) "Stimulating Heavy Oil Reservoirs With Downhole Air-Gas Burners," *World Oil*, (Sep. 1965), pp. 91-95.

DePriester, C. et al. (1963) "Well Stimulation by Downhole Gas-Air Burner," *Jrnl. Petro. Tech.*, (Dec. 1963), pp. 1297-1302.

Mut, Stephen (2005) "The Potential of Oil Shale," *Shell Oil Presentation at National Academies, Trends in Oil Supply Demand*, in Washington, DC, Oct. 20-21, 2005, 11 pages.

Salamonsson, G. (1951) "The Ljungstrom in Situ Method for Shale-Oil Recovery," $2^{nd}$ *Oil Shale and Cannel Coal Conference*, 2, Glasgow, Scotland, Inst. of Petrol., London, pp. 260-280.

Sierra, R. et al. (2001) "Promising Progress in Field Application of Reservoir Electrical Heating Methods," *SPE 69709*, SPE Int'l Thermal Operations and Heavy Oil Symposium, Venezuela, Mar. 2001, 17 pages.

Smith, F. M. (1966) "A Down-hole Burner—Versatile Tool for Well Heating," $25^{th}$ *Tech. Conf. on Petroleum Production*, Pennsylvania State Univ., pp. 275-285.

Yen, T. F. et al. (Year) *Oil Shale*, Amsterdam, Elsevier, p. 292.

International Search Report dated Apr. 24, 2008 for PCT/US07/021668 filed Oct. 10, 2007.

Allred, (1964) "Some Characteristic Properties of Colorado Oil Shale Which May Influence in Situ Processing," *Quarterly Colo. School of Mines*, $1^{st}$ Symposium Oil Shale, v.59. No. 3, pp. 47-75.

Baugman, G. L. (1978) *Synthetic Fuels Data Handbook*, Second Edition, Cameron Engineers Inc.

Burnham, A. K. et al. (1983) "High-Pressure Pyrolysis of Green River Oil Shale" in *Geochemistry and Chemistry of Oil Shales: ACS Symposium Series*.

Burwell, E. L. et al. (1970) "Shale Oil Recovery by In-Situ Retorting—A Pilot Study" *Journal of Petroleum Engr.*, Dec. 1970, pp. 1520-1524.

Cook, G. L. et al. (1968) "The Composition of Green River Shale Oils" *United Nations Symposium of the Development and Utilization of Oil Shale Resources*, 23 pgs.

Cummins, J. J. et al. (1972) "Thermal Degradation of Green River Kerogen at 150 to 350C: Rate of Product Formation, Report of Investigation 7620," *US Bureau of Mines*, 1972.

Dougan, P. M. et al. (1981) "BX in Situ Oil Shale Project," *Colorado School of Mines; Fourteenth Oil Shale Symposium Proceedings*, 1981, pp. 118-127.

Dougan, P. M. (1979) "The BX in Situ Oil Shale Project," *Chem. Engr. Progress*, pp. 81-84.

Duncan, D. C., (1967) "Geologic Setting of Oil Shale Deposits and World Prospects," *in Proceedings of the Seventh World Petroleum Congress*, vol. 3, Elsevier Publishing, pp. 659-667.

Fisher, S. T. (1980) "A Comparison of Eleven Processes for Production of Energy from the Solid Fossil Fuels of North America," *SPE 9098*, pp. 1-27.

Hill, G.R. et al. (1967) "The Characteristics of a Low Temperature in Situ Shale Oil," *4th Symposium on Oil Shale, Quarterly of the Colorado School of Mines*, vol. 62(3), pp. 641-656.

Ingram, L. L. et al. (1983) "Comparative Study of Oil Shales and Shale Oils from the Mahogany Zone, Green River Formation (USA) and Kerosene Creek Seam, Rundle Formation (Australia)," *Chemical Geology*, 38, pp. 185-212.

Jacobs, H. R. (1983) "Analysis of the Effectiveness of Steam Retorting of Oil Shale", *AIChE Symposium Series—Heat Transfer—Seattle 1983* pp. 373-382.

Johnson, D. J. (1966) "Decomposition Studies of Oil Shale," *University of Utah,* May 1966.

Prats, M. et al. (1975) "The Thermal Conductivity and Diffusivity of Green River Oil Shales", *Journal of Petroleum Technology*, pp. 97-106, Jan. 1975.

Rajeshwar, K. et al. (1979) "Review: Thermophysical Properties of Oil Shales", *Journal of Materials Science*, v.14, pp. 2025-2052.

Rupprecht, R. (1979) "Application of the Ground-Freezing Method to Penetrate a Sequence of Water-Bearing and Dry Formations—Three Construction Cases," *Engineering Geology*, 13, pp. 541-546.

Sandberg, C. R. et al. (1962) "In-Situ Recovery of Oil from Oil Shale—A Review and Summary of Field and Laboratory Studies," RR62.039FR, Nov. 1962.

Siskin, M. et al. (1995) "Detailed Structural Characterization of the Organic Material in Rundel Ramsay Crossing and Green River Oil Shales," *Kluwer Academic Publishers*, pp. 143-158.

Sresty, G. C.; et al. (1982) "Kinetics of Low-Temperature Pyrolysis of Oil Shale by the IITRI RF Process," *Colorado School of Mines; Fifteenth Oil Shale Symposium Proceedings*, Aug. 1982, pp. 411-423.

Stoss, K. et al. (1979) "Uses and Limitations of Ground Freezing With Liquid Nitrogen," *Engineering Geology*, 13, pp. 485-494.

Thomas, G. W. (1964) "A Simplified Model of Conduction Heating in Systems of Limited Permeability," *Soc.Pet. Engineering Journal*, Dec. 1964, pp. 335-344.

Thomas, G. W. (1966) "Some Effects of Overburden Pressure on Oil Shale During Underground Retorting," *Society of Petroleum Engineers Journal*, pp. 1-8, Mar. 1966.

Tihen, S. S. et al. (1967) "Thermal Conductivity and Thermal Diffusivity of Green River Oil Shale," *Thermal Conductivity: Proceedings of the Seventh Conference* (Nov. 13-16, 1967), NBS Special Publication 302, pp. 529-535, 1968.

Tisot, P. R. et al. (1970) "Structural Response of Rich Green River Oil Shales to Heat and Stress and Its Relationship to Induced Permeability," *Journal of Chemical Engineering Data*, v. 15(3), pp. 425-434.

Tisot, P. R. et al. (1971) "Structural Deformation of Green River Oil Shale as It Relates to in Situ Retorting," *US Bureau of Mines Report of Investigations 7576*, 1971.

Tisot, P. R. (1975) "Structural Response of Propped Fractures in Green River Oil Shale as It Relates to in Situ Retorting," *US Bureau of Mines Report of Investigations 8021*.

SPE 6069 "Produced Fluids Traveled Through Hot Section".

Berry, K. L., et al. (1982) "Modified in situ retorting results of two field retorts", Gary, J. H., ed., 15th Oil Shale Symp., CSM, pp. 385-396.

Bridges, J. E., et al. (1983) "The IITRI in situ fuel recovery process", *J. Microwave Power*, v. 18, pp. 3-14.

Chute, F. S., and Vermeulen, F. E., (1988) "Present and potential applications of electromagnetic heating in the in situ recovery of oil", AOSTRA J. Res., vol. 4, pp. 19-33.

Chute, F. S. and Vermeulen, F.E., (1989) "Electrical heating of reservoirs", Hepler, L., and Hsi, C., eds., AOSTRA Technical Handbook on Oil Sands, Bitumens, and Heavy Oils, Chapt. 13, pp. 339-376.

Covell, J. R., et al. (1984) "Indirect in situ retorting of oil shale using the TREE process", Gary, J. H., ed., 17th Oil Shale Symposium Proceedings, Colorado School of Mines, pp. 46-58. c.

Humphrey, J. P. (1978) "Energy from in situ processing of Antrim oil shale", *DOE Report FE-2346-29*.

Katz, D.L. et al. (1978) "*Predicting Phase Behavior of Condensate/Crude-Oil Systems Using Methane Interaction Coefficients, J Petroleum Technology*", pp. 1649-1655.

Lekas, M. A. et al. (1991) "Initial evaluation of fracturing oil shale with propellants for in situ retorting—Phase 2", *DOE Report DOE/MC/11076-3064*.

Miknis, F.P, et al (1985) "Isothermal Decomposition of Colorado Oil Shale", DOE/FE/60177-2288 (DE87009043) May 1985.

Needham, et al (1976) "Oil Yield and Quality from Simulated In-Situ Retorting of Green River Oil Shale", Society of Petroleum Engineers of American Institute of Mining, Metallurgical and Petroleum Engineers, Inc. SPE 6069.

Riva, D. et al. (1998) "Suncor down under: the Stuart Oil Shale Project", Annual Meeting of the *Canadian Inst. of Mining, Metallurgy, and Petroleum,* Montreal, May 3-7.

Stevens, A. L., and Zahradnik, R. L. (1983) "Results from the simultaneous processing of modified in situ retorts 7& 8", Gary, J. H., ed., *16th Oil Shale Symp.*, CSM, p. 267-280.

Tissot, B. P., and Welte, D. H. (1984) *Petroleum Formation and Occurrence,* New York, Springer-Verlag, p. 160-174, 175-198 and 254-266.

Tissot, B. P., and Welte, D. H. (1984) *Petroleum Formation and Occurrence,* New York, Springer-Verlag, p. 267-289 and 470-492.

Tyner, C. E. et al. (1982) "Sandia/Geokinetics Retort 23: a horizontal in situ retorting experiment", Gary, J. H., ed., *15th Oil Shale Symp.*, CSM, p. 370-384.

Oil and Gas Journal, 1998, "Aussie oil shale project moves to Stage 2", Oct. 26, p. 42.

US Pat No. 7,516,787—Office Action mailed Apr. 3, 2008.
US Pat No. 7,516,785—Office Action mailed Apr. 2, 2008.
US Pat No. 7,331,385—Office Action mailed Jul. 12, 2007.
U.S. Appl. No. 11/973,750 Office Action mailed Dec. 4, 2008.
EP Search Report dated Feb. 16, 2007 (RS 114807, Corresponding to U.S. Appl. No. 11/973,753).
EP Search Report dated Mar. 12, 2009 (EP 08 00 3956,—Corresponding to U.S. Appl. No. 12/271,521).
EP Search Report dated Dec. 29, 2003 (RS 110243, Corresponding to US Pat 7,331,385).
International Search Report for PCT/US07/21669, Apr. 29, 2008.
International Search Report for PCT/US04/11508, Jan. 5, 2005.
International Search Report for PCT/US08/88045, Feb. 12, 2009.
International Search Report for PCT/US07/021968, May 14, 2008.
International Search Report for PCT/US07/021968, May, 21, 2008.
Ali, A.H.A, et al, (2003) "Watching Rocks Change-Mechanical Earth Modeling", *Oilfield Review*, pp. 22-39.
Asquith, G., et al., (2004) *Basic Well Log Analysis*, Second Ed., Chapter 1, pp. 1-20.
Ball, J.S., et al. (1949) "Composition of Colorado Shale-Oil Naphtha", *Industrial and Engineering Chemistry*, vol. 41, No. 3 pp. 581-587.
Barnes, A. L. et al. (1968) "Quarterly of the Colorado School of Mines" *Fifth Symposium on Oil Shale*, v. 63(4), Oct. 1968, pp. 827-852.
Bastow, T.P., (1998) Sedimentary Processes Involving Aromatic Hydrocarbons. Thesis (PhD in Applied Chemistry) Curtin University of Technology (Australia), December, p. 102.
Blanton, T. L. et al, (1999) "Stress Magnitudes from Logs: Effects of Tectonic Strains and Temperature", *SPE Reservoir Eval. & Eng. 2*, vol. 1, February, pp. 62-68.
Brandt, A. R., "*Converting Oil Shale to Liquid Fuels: Energy Inputs and Greenhouse Gas Emissions of the Shell in Situ Conversion Process*," Environ. Sci. Technol. 2008, 42, pp. 7489-7495.

Charlier, R. et al, (2002) "Numerical Simulation of the Coupled Behavior of Faults During the Depletion of a High-Pressure/High-Temperature Reservoir", *Society of Petroleum Engineers*, SPE 78199, pp. 1-12.

Cipolla, C.L., et al. (1994), "Practical Application of in-situ Stress Profiles", *Society of Petroleum Engineers*, SPE 28607, pp. 487-499.

Day, R. L., (1998) "Solution Mining of Colorado Nahcolite, Wyoming State Geological Survey Public Information Circular 40," *Proceedings of the First International Soda Ash Conference*, V.II (Rock Springs, Wyoming, Jun. 10-12) pp. 121-130.

Domine, F. et al. (2002) "Up to What Temperature is Petroleum Stable? New Insights from a 5200 Free Radical Reactions Model", *Organic Chemistry*, 33, pp. 1487-1499.

Dunks, G. et al. (1983) "Electrochemical Studies of Molten Sodium Carbonate," *Inorg. Chem.*, 22, pp. 2168-2177.

Dusseault, M.B. (1998) "Casing Shear: Causes, Cases, Cures", Society of Petroleum Engineers, SPE 48,864 pp. 337-349.

Dyni, J. R., (1974) "Stratigraphy and Nahcolite Resources of the Saline Facies of the Green River Formation in Northwest Colorado," in D.K. Murray (ed.), *Guidebook to the Energy Resources of the Piceance Creek Basin Colorado, Rocky Mountain Association of Geologists*, Guidebook, pp. 111-122.

Fainberg, V. et al. (1998) "Integrated Oil Shale Processing Into Energy and Chemicals Using Combined-Cycle Technology," *Energy Sources*, v.20.6, Abstract, 1 page.

Farouq Ali, S. M., (1994), "Redeeming features of in situ combustion", DOE/NIPER *Symposium on in Situ Combustion Practices-Past, Present, and Future Application*, Tulsa, OK, Apr. 21-22, No. ISC 1, p. 3-8.

Fox, J. P., (1980) "Water-related Impacts of In-Situ Oil Shale Processing," *California Univ., Berkeley, Lawrence Berkeley Lab*, Chapters 6-7.

Fredrich, J. T. et al, (1996) "Three-Dimensional Geomechanical Simulation of Reservoir Compaction and Implications for Well Failures in the Belridge Diatomite", *Society of Petroleum Engineers*SPE 36698, pp. 195-210.

Fredrich, J. T. et al, (2000) "Geomechanical Modeling of Reservoir Compaction, Surface Subsidence, and Casing Damage at the Belridge Diatomite Field", *SPE Reservoir Eval. & Eng.3*, vol. 4, August, pp. 348-359.

Fredrich, J. T. et al, (2003) "Stress Perturbations Adjacent to Salt Bodies in the Deepwater Gulf of Mexico", *Society of Petroleum Engineers*SPE 84554, pp. 1-14.

Frederiksen, S. et al, (2000) "A Numerical Dynamic Model for the Norwegian-Danish Basin", *Tectonophysics*, 343, 2001, pp. 165-183.

Freund, H. et al., (1989) "Low-Temperature Pyrolysis of Green River Kerogen", *The American Association of Petroleum Geologists Bulletin*, vol. 73, No. 8 (August) pp. 1011-1017.

Gatens III, J. M. et al, (1990) "In-Situ Stress Tests and Acoustic Logs Determine Mechanical Properties and Stress Profiles in the Devonian Shales", *SPE Formation Evaluation*SPE 18523, pp. 248-254.

Garthoffner, E. H., (1998), "Combustion front and burned zone growth in successful California ISC projects", SPE 46244, pp. 1-11.

Greaves, M., et al. (1994) "In situ combustion (ISC) processes: 3D studies of vertical and horizontal wells", *Europe Comm. Heavy Oil Technology in a Wider Europe Symposium*, Berlin, Jun. 7-8, p. 89-112.

Hansen, K. S. et al, (1989) "Earth Stress Measurements in the South Belridge Oil Field, Kern County, California", *SPE Formation Evaluation*, December. pp. 541-549.

Hansen, K. S. et al, (1993) "Finite-Element Modeling of Depletion-Induced Reservoir Compaction and Surface Subsidence in the South Belridge Oil Field, California", SPE 26074, pp. 437-452.

Hansen, K. S. et al, (1995) "Modeling of Reservoir Compaction and Surface Subsidence at South Belridge", *SPE Production & Facilities*, August. pp. 134-143.

Hardy, M. et al. (2003) "Solution Mining of Nahcolite at the American Soda Project, Piceance Creek, Colorado," *SME Annual Mtg.*, Feb. 24-26, Cincinnati, Ohio, Preprint 03-105.

Hardy, M., et al. (2003) "Solution Mining of Nahcolite at American Soda's Yankee Gulch Project," *Mining Engineering*, Oct. 2003, pp. 23-31.

Henderson, W, et al. (1968) "Thermal Alteration as a Contributory Process to the Genesis of Petroleum", *Nature* vol. 219, pp. 1012-1016.

Hilbert, L. B. et al, (1999) "Field-Scale and Wellbore Modeling of Compaction-Induced Casing Failures", *SPE Drill. & Completion*, 14(2), June pp. 92-101.

Hill, G. R. et al. (1967) "Direct Production of a Low Pour Point High Gravity Shale Oil", *I&EC Product Research and Development*, 6(1), March pp. 52-59.

Holditch, S. A., (1989) "Pretreatment Formation Evaluation", *Recent Advances in Hydraulic Fracturing*, SPE Monograph vol. 12, Chapter 2 (Henry L. Doherty Series), pp. 39-56.

Holmes, A. S. et al. (1982) "Process Improves Acid Gas Separation," *Hydrocarbon Processing*, pp. 131-136.

Holmes, A. S. et al. (1983) "Pilot Tests Prove Out Cryogenic Acid-Gas/Hydrocarbon Separation Processes," *Oil & Gas Journal*, pp. 85-91.

Ireson, A. T. (1990) "Review of the Soluble Salt Process for In-Situ Recovery of Hydrocarbons from Oil Shale with Emphasis on Leaching and Possible Beneficiation," 23rd *Colorado School of Mines Oil Shale Symposium* (Golden, Colorado), 152-161.

Kenter, C. J. et al, (2004) "Geomechanics and 4D: Evaluation of Reservoir Characteristics from Timeshifts in the Overburden", *Gulf Rocks 2004, 6th North America Rock Mechanics. Symposium(NARMS): Rock Mechanics Across Borders and Disciplines*, Houston, Texas, Jun. 5-9, ARMA/NARMS 04-627.

Kuo, M. C. T. et al (1979) "Inorganics leaching of spent shale from modified in situ.processing," J. H. Gary (ed.) *Twelfth Oil Shale Symposium Proceedings*, Colorado School of Mines, Golden CO., Apr. 18-20, pp. 81-93.

Laughrey, C. D. et al. (2003) "Some Applications of Isotope Geochemistry for Determining Sources of Stray Carbon Dioxide Gas," *Environmental Geosciences*, 10(3), pp. 107-122.

Le Pourhiet, L. et al, (2003) "Initial Crustal Thickness Geometry Controls on the Extension in a Back Arc Domain: Case of the Gulf of Corinth", *Tectonics*, vol. 22, No. 4, pp. 6-1—6-14.

Lundquist, L. (1951) "Refining of Swedish Shale Oil", *Oil Shale Cannel Coal Conference*, vol./Issue: 2, pp. 621-627.

Marotta, A. M. et al. (2003) "Numerical Models of Tectonic Deformation at the Baltica-Avalonia Transition Zone During the Paleocene Phase of Inversion", *Tectonophysics*, 373, pp. 25-37.

Mohammed, Y.A., et al (2001) "A Mathematical Algorithm for Modeling Geomechanical Rock Properties of the Khuff and PreKhuff Reservoirs in Ghawar Field",*Society of Petroleum Engineers*SPE 68194, pp. 1-8.

Molenaar, M. M. et al, (2004) "Applying Geo-Mechanics and 4D: '4D In-Situ Stress' as a Complementary Tool for Optimizing Field Management", *Gulf Rocks 2004, 6th North America Rock Mechanics Symposium (NARMS): Rock Mechanics Across Borders and Disciplines*, Houston, Texas, Jun. 5-9, *ARMA/NARMS 04-639*, pp. 1-7.

Moschovidis, Z. (1989) "Interwell Communication by Concurrent Fracturing—a New Stimulation Technique", *Journ. of Canadian Petro. Tech.* 28(5), pp. 42-48.

Motzfeldt, K. (1954) "The Thermal Decomposition of Sodium Carbonate by the Effusion Method," *Jrnl. Phys. Chem.*, v. LIX, pp. 139-147.

Newkirk, A. E. et al. (1958) "Drying and Decomposition of Sodium Carbonate," *Anal. Chem.*, 30(5), pp. 982-984.

Nielsen, K. R., (1995) "Colorado Nahcolite: a Low Cost Source of Sodium Chemicals," 7th *Annual Canadian Conference on Markets for Industrial Minerals*, (Vancouver, Canada, Oct. 17-18) pp. 1-9.

Nottenburg, R.N. et al. (1979) "Temperature and strees dependence of electrical and mechanical properties of Green River oil shale,"*Fuel*, 58, pp. 144-148.

Nowacki, P. (ed.), (1981)*Oil Shale Technical Handbook*, Noyes Data Corp.

Pattillo, P. D. et al, (1998) "Reservoir Compaction and Seafloor Subsidence at Vallhall", SPE 47274, 1998, pp.377-386.

Pattillo, P. D. et al, (2002) "Analysis of Horizontal Casing Integrity in the Valhall Field", SPE 78204, pp.1-10.

Persoff, P. et al. (1979) "Control strategies for abandoned in situ oil shale retorts,"J. H. Gary (ed.), 12th *Oil Shale Symposium Proceedings*, Corlorado School of Mines, Golden, CO., Apr. 18-20, pp. 72-80

Peters, G., (1990) "The Benificaiation of Oil Shale by the Solution Mining of Nahcolite," 23$^{rd}$ *Colorado School Of Mines Oil Shale Symposium* (Golden, CO) pp.142-151.

Plischke, B., (1994) "Flinite Element Analysis of Compaction and Subsidence—Experience Gained from Several Chalk Fields", *Society of Petroleum Engineers*, SPE 28129, 1994, pp. 795-802.

Prats, M. et al. (1975) "The Thermal Conductivity and Diffusivity of Green River Oil Shales ", *Journal of Petrleum Technology*, pp. 97-106, Jan. 1975.

Ramey, M. et al. (2004) "The History and Performance of Vertical Well Solution Mining of Nahcolite (NaHCO$_3$) in the Piceance Basin, Northwestern, Colorado, USA," *Solution Mining Research Institute: Fall 2004 Technical Meeting*(Berlin, Germany).

Reade Advanced Materials; 2006 About.com Electrical resistivity of materials, [Retrieved on Oct. 15, 2009]Retrieved from Internet: URL: http://www.reade.com/Particle%5FBriefings/elec%5Fres.html. Entire Document.

Ruzicka, D.J. et al. (1987) "Modified Method Measures Bromine Number of Heavy Fuel Oils",*Oil & Gas Journal*, 85(31), Aug. 3, pp. 48-50.

Sahu, D. et al. (1988) "Effect of Benzene and Thiophene on Rate of Coke Formation During Naphtha Pyrolysis", *Canadian Journ. of Chem. Eng.*, 66, Oct. pp. 808-816.

Smart, K. J. et al, (2004) "Integrated Structural Analysis and Geomechanical Modeling: an Aid to Reservoir Exploration and Development",*Gulf Rocks 2004, 6$^{th}$ North America Rock Mechanics Symposium(NARMS): Rock Mechanics Across Borders and Disciplines*, Houston, Texas, Jun. 5-9, ARMA/NARMS 04-470.

Symington, W.A., et al (2006) ExxonMobil's electrofrac process for in situ oil shale conversion 26$^{th}$ Oil Shale Symposium, Colorado School of Mines.

Syunyaev, Z.I. et al. (1965) "Change in the Resistivity of Petroleum Coke on Calcination, " Chemistry and Technology of Fuels and Oils, 1(4), pp. 292-295.

Templeton, C. C. (1978) "Pressure-Temperature Relationship for Decomposition of Sodium Bicarbonate from 200 to 600° F." *J. of Chem. And Eng. Data*, 23(1), pp. 7-8.

Thomas, A. M. (1963) "Thermal Decomposition of Sodium Carbonate Solutions," *J. Of Chem. And Eng.*Data, 8(1), pp. 51-54.

Turta, A., (1994), "In situ combustion- from pilot to commercial application",*DOE/NIPER Symposium on in Situ Combustion Practices-Past, Present, and Future Application*, Tulsa, OK, Apr. 21-22, No. ISC 3, p. 15-39.

Tzanco, E. T., et al. (1990), "Laboratory Combustion Behavior of Countess B Light Oil", *Petroleum Soc. of CIM and SPE*, Calgary, Jun. 10-13, No. CIM/SPE 90-63, p. 63.1-63.16.

Veatch, Jr. R.W. and Martinez, S.J., et al. (1990) "Hydraulic Fracturing: Reprint Series No. 28", Soc. of Petroleum Engineers SPE 14085, Part I, Overview.

Warpinski, N. R., (1989) "Elastic and Viscoelastic Calculations of Stresses in Sedimentary Basins", *SPE Formation Evaluation*, vol. 4, pp. 522-530.

Yoon, E. et al. (1996) "High-Temperature Stabilizers for Jet Fuels and Similar Hydrocarbon Mixtures. 1. Comparative Studies of Hydrogen Donors", *Energy & Fuels*, 10, pp. 806-811.

"Encyclopedia of Chemical Technology" (4$^{th}$ed.), *Alkali and Chlorine Products*, pp. 1025-1039 (1998).

EP Search Report dated Mar. 17, 2004 (RS 110686, Corresponding to U.S. Patent 7,441,603).

EP Search Report, Supplementary dated Apr. 10, 2007 (EP 04 77 9878 Corresponding to.U.S. Patent 7,441,603).

EP Search Report dated Apr. 29 2005 (RS 112183, Corresponding to U.S. Appl. No. 11/250,804, Published as US 2006/0100837 on May 11, 2008).

EP Search Report dated Jun. 2, 2006 (RS113865, corresponding to U.S. Appl. No. 11/726,651).

EP Search Report dated Feb. 16, 2007 (RS 114808, Corresponding to U.S. Appl. No. 11/973,746, Published as US 2008/0087420 on May 17, 2008).

EP Search Report dated Feb. 16, 2007 (RS 114804, Corresponding to U.S. Appl. No. 11/973,750, Published as US 2008/0087427 on Apr. 17, 2008).

EP Search Report dated Mar. 21, 2007 (RS 114890, Corresponding to U.S. Patent 7,516,787).

EP Search Report dated Nov. 13, 2007 (RS 115479, Corresponding to U.S. Appl. No. 12/148,414).

EP Search Report dated Aug. 29, 2007 (No. RS115553, Corresponding to U.S. Appl. No. 12/148,388).

EP Search Report dated Jul. 4, 2007 ( RS 115341 Corresponding to U.S. Appl. No. 12/074,899).

EP Search Report dated Jul. 5, 2007 (RS 115432 Corresponding to U.S. Appl. No. 12/075,087).

EP Search Report dated Aug. 29, 2007 (RS 1155554, Corresponding to U.S. Appl. No. 12/154,238).

EP Search Report dated Aug. 28, 2007 (RS 1155555, Corresponding to U.S. Appl. No. 12/154,256).

International Search Report for PCT/US01/09247 Jun. 20 2001.
International Search Report for PCT/USO4/24947 Mar. 10, 2005.
International Search Report for PCT/US07/07133, Jan. 4, 2008.
International Search Report for PCT/US07/21673 Jun. 24, 2008.
International Search Report for PCT/US07/21666 Apr. 4, 2008.
International Search Report for PCT/US07/21660 Apr. 4, 2008.
International Search Report for PCT/US08/005008, Aug. 29, 2008.
International Search Report for PCT/US08/05056, Aug. 25, 2008.
International Search Report for PCT/US08/003043, Jul. 2, 2008.
International Search Report for PCT/US08/083815, Mar. 20, 2009.
International Search Report for PCT/US08/006462 Sep. 22, 2008.
International Search Report for PCT/US08/006463 Aug. 22, 2008.
International Search Report for PCT/US07/21645 Apr. 21, 2008.
International Search Report for PCT/US09/037419 Jul. 7, 2009.
International Search Report for PCT/US09/055403, Oct. 22, 2009.
International Search Report for PCT/US10/20342 Feb. 26, 2010.
International Search Report for PCT/US10/031910 Aug. 3, 2010.
International Search Report for PCT/US10/057204 Jan. 27, 2011.
U.S. Appl. No. 12/630,636 Office Action mailed Oct. 27, 2010.
U.S. Appl. No. 11/250,804 Office Action mailed Oct. 16, 2008.
U.S. Appl. No. 11/250,804 Office Action mailed Jun. 11, 2009.
U.S. Appl. No. 11/973,746 Office Action mailed Jun. 25, 2009.
U.S. Appl. No. 11/973,746 Office Action mailed Nov. 8, 2010.
U.S. Appl. No. 11/973,750 Office Action mailed Jul. 22, 2009.
U.S. Appl. No. 12/638,630 Office Action mailed Mar. 16, 2011.
U.S. Appl. No. 12/712,904 Office Action mailed Nov. 10, 2010.
U.S. Appl. No. 12/148,414 Office Action mailed May 19, 2010.
U.S. Appl. No. 12/148,414 Office Action mailed Oct. 22, 2010.
U.S. Appl. No. 12/148,388 Office Action mailed Jun. 10, 2010.
U.S. Appl. No. 12/148,388 Office Action mailed Nov. 19, 2010.
U.S. Appl. No. 12/074,899 Office Action mailed Dec. 16, 2009.
U.S. Appl. No. 12/074,899 Office Action mailed Jul. 26, 2010.
U.S. Appl. No. 12/074,899 Office Action mailed Jan. 4, 2011.
U.S. Appl. No. 12/075,087 Office Action mailed Oct. 12, 2010.
U.S. Appl. No. 12/075,087 Office Action mailed Mar. 7, 2011.
U.S. Appl. No. 12/271,521 Office Action mailed Nov. 2, 2010.
U.S. Appl. No. 11/973,898 Office Action mailed May 6, 2010.
U.S. Appl. No. 11/973,898 Office Action mailed Dec. 20, 2010.
U.S. Appl. No. 12/405,901 Office Action mailed Feb. 14, 2011.
U.S. Appl. No. 12/154,238 Office Action mailed Apr. 22, 2011.
U.S. Appl. No. 12/154,256 Office Action mailed May 9, 2011.
U.S. Appl. No. 12/148,414 Office Action mailed May 17, 2011.
U.S. Appl. No. 12/443,680 Office Action mailed Jun. 23, 2011.
U.S. Pat No. 6,918,444—Office Action mailed Sep. 16, 2004.
U.S. Pat No. 7,631,691—Office Action mailed Mar. 18, 2009.
U.S. Pat No. 7,441,603—Office Action mailed Feb. 25, 2008.
U.S. Pat No. 7,857,056—Office Action mailed Mar. 19, 2010.
U.S. Pat No. 7,647,972—Office Action mailed May 19, 2009.
U.S. Pat No. 7,647,971—Office Action mailed May 21, 2009.
U.S. Pat No. 7,669,657—Office Action mailed Jun. 26, 2008.
U.S. Pat No. 7,669,657—Office Action mailed Dec. 15, 2008.
U.S. Pat No. 7,669,657—Office Action mailed Sep. 15, 2009.
U.S. Pat No. 7,644,993—Office Action mailed Jun. 24, 2009.

* cited by examiner

COMBINED DEVELOPMENT OF OIL SHALE BY IN SITU HEATING WITH A DEEPER HYDROCARBON RESOURCE

STATEMENT OF RELATED APPLICATIONS

This application claims the benefit of U.S. Provisional application 60/851,542 which was filed on Oct. 13, 2006. The provisional application is incorporated herein in its entirety by reference.

BACKGROUND OF THE INVENTION

1. Field of the Invention

The present invention relates to the field of hydrocarbon recovery from subsurface formations. More specifically, the present invention relates to the in situ recovery of hydrocarbon fluids from organic-rich rock formations including, for example, oil shale formations, coal formations and tar sands formations. The present invention also relates to methods for producing hydrocarbons from both an organic-rich rock formation matured through pyrolysis, and a deeper hydrocarbon resource.

2. Background of the Invention

Certain geological formations are known to contain an organic matter known as "kerogen." Kerogen is a solid, carbonaceous material. When kerogen is imbedded in rock formations, the mixture is referred to as oil shale. This is true whether or not the mineral is, in fact, technically shale, that is, a rock formed from compacted clay.

Kerogen is subject to decomposing upon exposure to heat over a period of time. Upon heating, kerogen molecularly decomposes to produce oil, gas, and carbonaceous coke. Small amounts of water may also be generated. The oil, gas and water fluids become mobile within the rock matrix, while the carbonaceous coke remains essentially immobile.

Oil shale formations are found in various areas worldwide, including the United States. Oil shale formations tend to reside at relatively shallow depths. In the United States, oil shale is most notably found in Wyoming, Colorado, and Utah. These formations are often characterized by limited permeability. Some consider oil shale formations to be hydrocarbon deposits which have not yet experienced the years of heat and pressure thought to be required to create conventional oil and gas reserves.

The decomposition rate of kerogen to produce mobile hydrocarbons is temperature dependent. Temperatures generally in excess of 270° C. (518° F.) over the course of many months may be required for substantial conversion. At higher temperatures substantial conversion may occur within shorter times. When kerogen is heated, chemical reactions break the larger molecules forming the solid kerogen into smaller molecules of oil and gas. The thermal conversion process is referred to as pyrolysis or retorting.

Attempts have been made for many years to extract oil from oil shale formations. Near-surface oil shales have been mined and retorted at the surface for over a century. In 1862, James Young began processing Scottish oil shales. The industry lasted for about 100 years. Commercial oil shale retorting through surface mining has been conducted in other countries as well such as Australia, Brazil, China, Estonia, France, Russia, South Africa, Spain, and Sweden. However, the practice has been mostly discontinued in recent years because it proved to be uneconomical or because of environmental constraints on spent shale disposal. (See T.F. Yen, and G.V. Chilingarian, "Oil Shale," Amsterdam, Elsevier, p. 292.) Further, surface retorting requires mining of the oil shale, which limits application to very shallow formations.

In the United States, the existence of oil shale deposits in northwestern Colorado has been known since the early 1900's. While research projects have been conducted in this area from time to time, no serious commercial development has been undertaken. Most research on oil shale production has been carried out in the latter half of the 1900's. The majority of this research was on shale oil geology, geochemistry, and retorting in surface facilities.

In 1947, U.S. Pat. No. 2,732,195 issued to Ljungstrom. That patent, entitled "Method of Treating Oil Shale and Recovery of Oil and Other Mineral Products Therefrom," proposed the application of heat at high temperatures to the oil shale formation in situ to distill and produce hydrocarbons. The '195 Ljungstrom patent is incorporated herein by reference.

Ljungstrom coined the phrase "heat supply channels" to describe bore holes drilled into the formation. The bore holes received an electrical heat conductor which transferred heat to the surrounding oil shale. Thus, the heat supply channels served as heat injection wells. The electrical heating elements in the heat injection wells were placed within sand or cement or other heat-conductive material to permit the heat injection wells to transmit heat into the surrounding oil shale while preventing the inflow of fluid. According to Ljungstrom, the "aggregate" was heated to between 500° and 1,000° C., in some applications.

Along with the heat injection wells, fluid producing wells were also completed in near proximity to the heat injection wells. As kerogen was pyrolyzed upon heat conduction into the rock matrix, the resulting oil and gas would be recovered through the adjacent production wells.

Ljungstrom applied his approach of thermal conduction from heated wellbores through the Swedish Shale Oil Company. A full scale plant was developed that operated from 1944 into the 1950's. (See G. Salamonsson, "*The Ljungstrom In Situ Method for Shale-Oil Recovery*," $2^{nd}$ Oil Shale and Cannel Coal Conference, v. 2, Glasgow, Scotland, Institute of Petroleum, London, p. 260-280 (1951).)

Additional in situ methods have been proposed. These methods generally involve the injection of heat and/or solvent into a subsurface oil shale. Heat may be in the form of heated methane (see U.S. Pat. No. 3,241,611 to J. L. Dougan), flue gas, or superheated steam (see U.S. Pat. No. 3,400,762 to D. W. Peacock). Heat may also be in the form of electric resistive heating, dielectric heating, radio frequency (RF) heating (U.S. Pat. No. 4,140,180, assigned to the ITT Research Institute in Chicago, Ill.) or oxidant injection to support in situ combustion. In some instances, artificial permeability has been created in the matrix to aid the movement of pyrolyzed fluids. Permeability generation methods include mining, rubblization, hydraulic fracturing (see U.S. Pat. No. 3,468,376 to M. L. Slusser and U.S. Pat. No. 3,513,914 to J. V. Vogel), explosive fracturing (see U.S. Pat. No. 1,422,204 to W. W. Hoover, et al.), heat fracturing (see U.S. Pat. No. 3,284,281 to R. W. Thomas), and steam fracturing (see U.S. Pat. No. 2,952,450 to H. Purre).

In 1989, U.S. Pat. No. 4,886,118 issued to Shell Oil Company, the entire disclosure of which is incorporated herein by reference. That patent, entitled "Conductively Heating a Subterranean Oil Shale to Create Permeability and Subsequently Produce Oil," declared that "[c]ontrary to the implications of... prior teachings and beliefs... the presently described conductive heating process is economically feasible for use even in a substantially impermeable subterranean oil shale." (col. 6, ln. 50-54). Despite this declaration, it is noted that few, if any, commercial in situ shale oil operations have occurred other than Ljungstrom's application. The '118 patent proposed controlling the rate of heat conduction within the rock surrounding each heat injection well to provide a uniform heat front.

Additional history behind oil shale retorting and shale oil recovery can be found in co-owned patent U.S. Pat. No. 7,331,385 entitled "Methods of Treating a Subterranean Formation to Convert Organic Matter into Producible Hydrocarbons," and in U.S. Pat. No. 7,441,603 entitled "Hydrocarbon Recovery from Impermeable Oil Shales." The Background and technical disclosures of these two patent publications are incorporated herein by reference.

A need exists for improved processes for the production of shale oil. In addition, a need exists for improved processes for producing hydrocarbons from both an organic-rich rock formation matured through pyrolysis, and a deeper hydrocarbon resource.

SUMMARY OF THE INVENTION

A method for producing hydrocarbons from subsurface formations at different depths is first provided. In one aspect, the method includes the step of heating organic-rich rock, in situ, within a subsurface formation at a first depth. The result of the heating step is that at least a portion of the organic-rich rock is pyrolyzed into hydrocarbon fluids. Preferably, the organic-rich rock of the subsurface formation of the first depth is oil shale.

The method also includes providing at least one substantially unheated zone within the subsurface formation of the first depth. In this way, the organic-rich rock in that zone is left substantially unpyrolyzed. The method further includes drilling at least one production well through the unheated zone, and completing the at least one production well in a subsurface formation at a second depth that is deeper than the first depth. Thereafter, hydrocarbon fluids are produced through the at least one production well.

In one embodiment, the step of heating the subsurface formation at the first depth comprises completing a plurality of heater wells designed to heat the organic-rich rock, in situ. The heater wells may be electrically resistive heater wells. Alternatively, the heater wells may be designed to circulate a heated fluid in order to heat the surrounding formation through thermal convection. Regardless of the method, the step of heating the subsurface formation at the first depth preferably results in at least a portion of the organic-rich rock formation reaching a temperature of 270° C. or greater.

The hydrocarbon fluids produced from the at least one production well may comprise natural gas. An example of such natural gas is methane. In one aspect the method further includes the step of using the natural gas produced from the at least one production well to at least in part generate electricity. The electricity may be used to provide power to heater wells, with the heater wells being electrically resistive heater wells.

In one embodiment of the invention, the at least one production well comprises a plurality of production wells drilled through the unheated zone. The production wells may be drilled from various places relative to a development area. For instance, the production wells may be drilled from an earth surface area directly above the unheated zone. In this instance, at least some of the production wells may be deviated, and then completed in the subsurface formation of the second depth at a spacing of at least 10 acres. In another aspect, the production wells may be drilled from an earth surface area that is not directly above the unheated zone. For instance, the surface area may be at a perimeter of an oil shale development area which comprises a plurality of heater wells for heating the subsurface formation at the first depth.

The methods of the present disclosure may include the additional step of producing hydrocarbon fluids pyrolyzed in the organic-rich rock of the subsurface formation of the first depth. In one embodiment, the production of pyrolyzed hydrocarbon fluids from the organic-rich rock occurs simultaneously, in whole or in part, with the production of hydrocarbon fluids from the subsurface formation deeper than the first depth. In an alternate aspect, the production of hydrocarbon fluids through the at least one production well is discontinued, and then the heating step is performed in order to pyrolyze at least a portion of the organic-rich rock in the unheated zone into hydrocarbon fluids.

In one aspect of the above method, the hydrocarbon fluids produced from the at least one production well at the second depth define a gas stream comprising methane and hydrogen sulfide. The organic-rich rock of the subsurface formation of the first depth may comprise a coal bed. In this instance, the method may further comprise the step of injecting the gas stream into the coal bed so as to remove at least a portion of the hydrogen sulfide from the gas stream. Such a method may further include producing gas from the coal bed. The gas stream produced from the second depth may also comprise carbon dioxide. In this instance, the method may further include the step of removing at least a portion of the carbon dioxide from the gas stream.

In another aspect of the above method, the hydrocarbon fluids produced from the at least one production well at the second depth comprise hydrogen sulfide. The organic-rich rock of the subsurface formation of the first depth may again comprise a coal bed. In this instance, the method may further comprise the step of injecting a gas stream from the hydrocarbon fluids that has a substantial portion of the hydrogen sulfide into the coal bed. Still further, the method may include producing a methane-rich gas from the coal bed.

In one embodiment, the method includes the step of completing at least one cooling well through the unheated zone in order to prevent pyrolysis of the organic-rich rock in the unheated zone. The cooling well preferably has a downhole piping assembly for circulating a cooling fluid. The cooling fluid may keep the unheated zone from reaching temperatures in excess of 250° C. or, more preferably, 125° C.

The ratio of the surface area of the heated zone to the unheated zone may vary. In one aspect, the at least one substantially unheated zone comprises no more than 50 percent of the area under oil shale development. Alternatively, the at least one substantially unheated zone comprises no more than 20 percent of the area under oil shale development or, alternatively still, no more than 10 percent of the area under oil shale development. In one embodiment, the at least one substantially unheated zone comprises a plurality of unheated zones, each of which individually comprises no more than 20 percent of the area under oil shale development. In this embodiment, the plurality of unheated zones may form a patchwork within heated areas of the area under oil shale development. In addition, the step of drilling at least one production well through a plurality of the unheated zones may comprise selecting pads on the earth surface that correspond to the patchwork of substantially unheated zones subsurface.

It may be desirable to cool the heated zone after heating. Thus, in one embodiment the method further comprises injecting water into the subsurface formation at the first depth, thereby cooling at least a portion of the heated zone.

In one embodiment, the unheated zones serve as pillars to prevent subsidence in the earth. In this embodiment, the plurality of unheated zones may form a patchwork within heated areas of the area under oil shale development. The step of selecting pads for the substantially unheated zones within the subsurface formation of the first depth may comprise determining a minimum number of unheated zones needed to prevent subsidence in the earth within the area under oil shale development.

BRIEF DESCRIPTION OF THE DRAWINGS

So that the features of the present invention can be better understood, certain drawings, graphs and flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
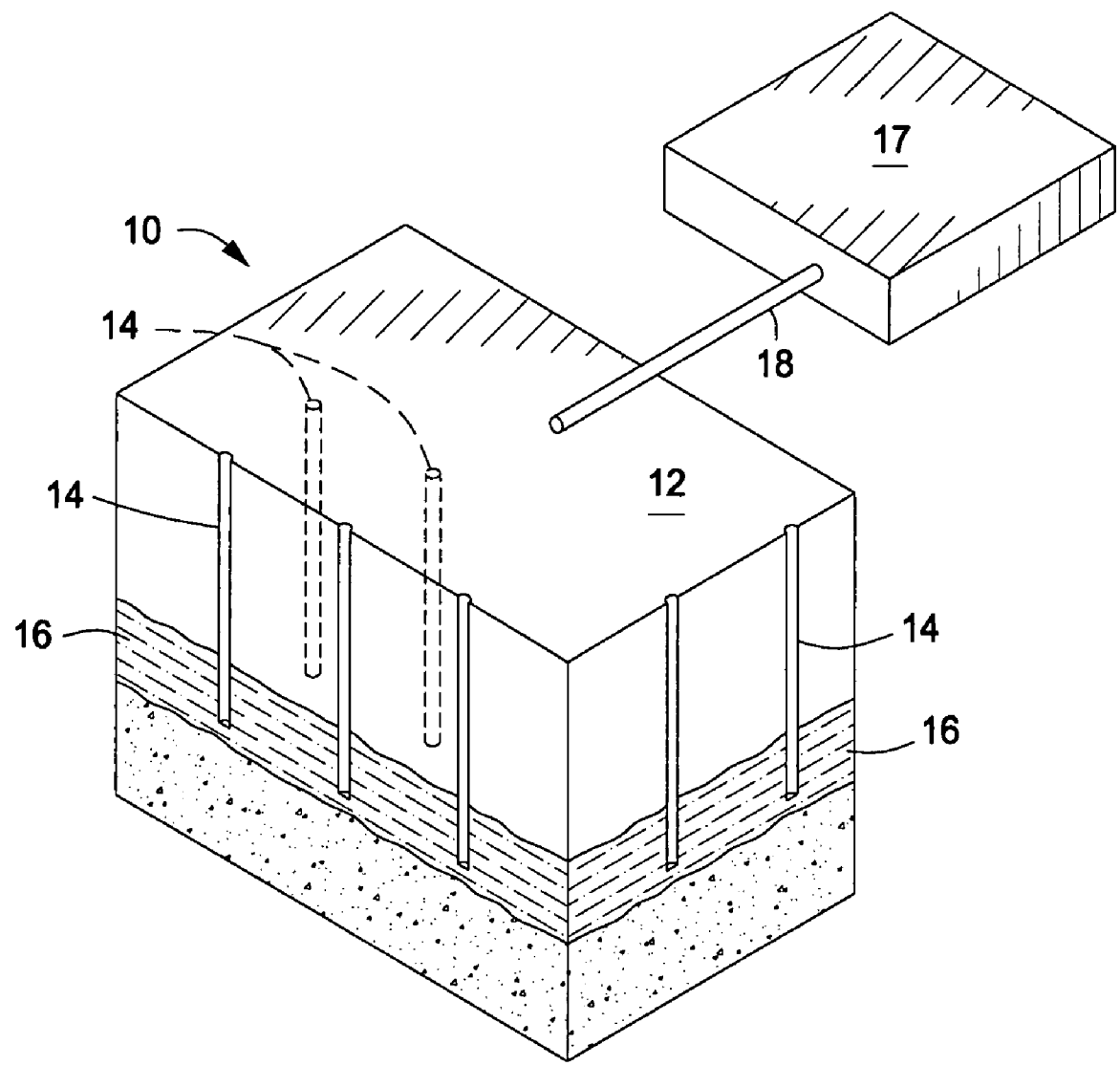
FIG. 1 is a cross-sectional view of an illustrative subsurface area. The subsurface area includes an organic-rich rock matrix that defines a subsurface formation.

As used herein, the term "hydrocarbon(s)" refers to organic material with molecular structures containing carbon bonded to hydrogen. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at ambient conditions (15° C. and 1 atm pressure). Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the terms "produced fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, pyrolyzed shale oil, synthesis gas, a pyrolysis product of coal, carbon dioxide, hydrogen sulfide and water (including steam). Produced fluids may include both hydrocarbon fluids and non-hydrocarbon fluids.

As used herein, the term "condensable hydrocarbons" means those hydrocarbons that condense at 25° C. and one atmosphere absolute pressure. Condensable hydrocarbons may include a mixture of hydrocarbons having carbon numbers greater than 4.

As used herein, the term "non-condensable hydrocarbons" means those hydrocarbons that do not condense at 25° C. and one atmosphere absolute pressure. Non-condensable hydrocarbons may include hydrocarbons having carbon numbers less than 5.

As used herein, the term "heavy hydrocarbons" refers to hydrocarbon fluids that are highly viscous at ambient conditions (15° C. and 1 atm pressure). Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20 degrees. Heavy oil, for example, generally has an API gravity of about 10-20 degrees, whereas tar generally has an API gravity below about 10 degrees. The viscosity of heavy hydrocarbons is generally greater than about 100 centipoise at 15° C.

As used herein, the term "solid hydrocarbons" refers to any hydrocarbon material that is found naturally in substantially solid form at formation conditions. Non-limiting examples include kerogen, coal, shungites, asphaltites, and natural mineral waxes.

As used herein, the term "formation hydrocarbons" refers to both heavy hydrocarbons and solid hydrocarbons that are contained in an organic-rich rock formation. Formation hydrocarbons may be, but are not limited to, kerogen, oil shale, coal, bitumen, tar, natural mineral waxes, and asphaltites.

As used herein, the term "tar" refers to a viscous hydrocarbon that generally has a viscosity greater than about 10,000 centipoise at 15° C. The specific gravity of tar generally is greater than 1.000. Tar may have an API gravity less than 10 degrees. "Tar sands" refers to a formation that has tar in it.

As used herein, the term "kerogen" refers to a solid, insoluble hydrocarbon that principally contains carbon, hydrogen, nitrogen, oxygen, and sulfur. Oil shale contains kerogen.

As used herein, the term "bitumen" refers to a non-crystalline solid or viscous hydrocarbon material that is substantially soluble in carbon disulfide.

As used herein, the term "oil" refers to a hydrocarbon fluid containing a mixture of condensable hydrocarbons.

As used herein, the term "subsurface" refers to geologic strata occurring below the earth's surface.

As used herein, the term "hydrocarbon-rich formation" refers to any formation that contains more than trace amounts of hydrocarbons. For example, a hydrocarbon-rich formation may include portions that contain hydrocarbons at a level of greater than 5 volume percent. The hydrocarbons located in a hydrocarbon-rich formation may include, for example, oil, natural gas, heavy hydrocarbons, and solid hydrocarbons.

As used herein, the term "organic-rich rock" refers to any rock matrix holding solid hydrocarbons and/or heavy hydrocarbons. Rock matrices may include, but are not limited to, sedimentary rocks, shales, siltstones, sands, silicilytes, carbonates, and diatomites.

As used herein, the term "formation" refers to any finite subsurface region. The formation may contain one or more hydrocarbon-containing layers, one or more non-hydrocarbon containing layers, an overburden, and/or an underburden of any subsurface geologic formation. An "overburden" and/or an "underburden" is geological material above or below the formation of interest. An overburden or underburden may include one or more different types of substantially impermeable materials. For example, overburden and/or underburden may include rock, shale, mudstone, or wet/tight carbonate (i.e., an impermeable carbonate without hydrocarbons). An overburden and/or an underburden may include a hydrocarbon-containing layer that is relatively impermeable. In some cases, the overburden and/or underburden may be permeable.

As used herein, the term "organic-rich rock formation" refers to any formation containing organic-rich rock. Organic-rich rock formations include, for example, oil shale formations, coal formations, and tar sands formations.

As used herein, the term "pyrolysis" refers to the breaking of chemical bonds through the application of heat. For example, pyrolysis may include transforming a compound into one or more other substances by heat alone or by heat in combination with an oxidant. Pyrolysis may include modifying the nature of the compound by addition of hydrogen atoms which may be obtained from molecular hydrogen, water, carbon dioxide, or carbon monoxide. Heat may be transferred to a section of the formation to cause pyrolysis.

As used herein, the term "water-soluble minerals" refers to minerals that are soluble in water. Water-soluble minerals include, for example, nahcolite (sodium bicarbonate), soda ash (sodium carbonate), dawsonite ($NaAl(CO_3)(OH)_2$), or combinations thereof. Substantial solubility may require heated water and/or a non-neutral pH solution.

As used herein, the term "formation water-soluble minerals" refers to water-soluble minerals that are found naturally in a formation.

As used herein, the term "migratory contaminant species" refers to species that are both soluble or moveable in water or an aqueous fluid, and are considered to be potentially harmful or of concern to human health or the environment. Migratory contaminant species may include inorganic and organic contaminants. Organic contaminants may include saturated hydrocarbons, aromatic hydrocarbons, and oxygenated hydrocarbons. Inorganic contaminants may include metal contaminants, and ionic contaminants of various types that may significantly alter pH or the formation fluid chemistry. Aromatic hydrocarbons may include, for example, benzene, toluene, xylene, ethylbenzene, and tri-methylbenzene, and various types of polyaromatic hydrocarbons such as anthracenes, naphthalenes, chrysenes and pyrenes. Oxygenated hydrocarbons may include, for example, alcohols, ketones, phenols, and organic acids such as carboxylic acid. Metal contaminants may include, for example, arsenic, boron, chromium, cobalt, molybdenum, mercury, selenium, lead, vanadium, nickel or zinc. Ionic contaminants include, for example, sulfides, sulfates, chlorides, fluorides, ammonia, nitrates, calcium, iron, magnesium, potassium, lithium, boron, and strontium.

As used herein, the term "cracking" refers to a process involving decomposition and molecular recombination of organic compounds to produce a greater number of molecules than were initially present. In cracking, a series of reactions take place accompanied by a transfer of hydrogen atoms between molecules. For example, naphtha may undergo a thermal cracking reaction to form ethene and $H_2$ among other molecules.

As used herein, the term "sequestration" refers to the storing of a fluid that is a by-product of a process rather than discharging the fluid to the atmosphere or open environment.

As used herein, the term "subsidence" refers to a downward movement of a surface relative to an initial elevation of the surface.

As used herein, the term "thickness" of a layer refers to the distance between the upper and lower boundaries of a cross section of a layer, wherein the distance is measured normal to the average tilt of the cross section.

As used herein, the term "thermal fracture" refers to fractures created in a formation caused directly or indirectly by expansion or contraction of a portion of the formation and/or fluids within the formation, which in turn is caused by increasing/decreasing the temperature of the formation and/or fluids within the formation, and/or by increasing/decreasing a pressure of fluids within the formation due to heating. Thermal fractures may propagate into or form in neighboring regions significantly cooler than the heated zone.

As used herein, the term "hydraulic fracture" refers to a fracture at least partially propagated into a formation, wherein the fracture is created through injection of pressurized fluids into the formation. The fracture may be artificially held open by injection of a proppant material. Hydraulic fractures may be substantially horizontal in orientation, substantially vertical in orientation, or oriented along any other plane.

As used herein, the term "wellbore" refers to a hole in the subsurface made by drilling or insertion of a conduit into the subsurface. A wellbore may have a substantially circular cross section, or other cross-sectional shapes (e.g., circles, ovals, squares, rectangles, triangles, slits, or other regular or irregular shapes). As used herein, the term "well", when referring to an opening in the formation, may be used interchangeably with the term "wellbore."

Description of Specific Embodiments

The inventions are described herein in connection with certain specific embodiments. However, to the extent that the following detailed description is specific to a particular embodiment or a particular use, such is intended to be illustrative only and is not to be construed as limiting the scope of the inventions.

As discussed herein, some embodiments of the inventions include or have application related to an in situ method of recovering natural resources. The natural resources may be recovered from an organic-rich rock formation, including, for example, an oil shale formation. The organic-rich rock formation may include formation hydrocarbons, including, for example, kerogen, coal, and heavy hydrocarbons. In some embodiments of the inventions the natural resources may include hydrocarbon fluids, including, for example, products of the pyrolysis of formation hydrocarbons such as oil shale. In some embodiments of the inventions the natural resources may also include water-soluble minerals, including, for example, nahcolite (sodium bicarbonate, or $2NaHCO_3$), soda ash (sodium carbonate, or $Na_2CO_3$) and dawsonite ($NaAl(CO_3)(OH)_2$).

FIG. 1 presents a perspective view of an illustrative oil shale development area 10. A surface 12 of the development area 10 is indicated. Below the surface is an organic-rich rock formation 16. The illustrative subsurface formation 16 contains formation hydrocarbons (such as, for example, kerogen) and possibly valuable water-soluble minerals (such as, for example, nahcolite). It is understood that the representative formation 16 may be any organic-rich rock formation, including a rock matrix containing coal or tar sands, for example. In addition, the rock matrix making up the formation 16 may be permeable, semi-permeable or non-permeable. The present inventions are particularly advantageous in oil shale development areas initially having very limited or effectively no fluid permeability.

In order to access formation 16 and recover natural resources therefrom, a plurality of wellbores is formed. Wellbores are shown at 14 in FIG. 1. The representative wellbores 14 are essentially vertical in orientation relative to the surface 12. However, it is understood that some or all of the wellbores 14 could deviate into an obtuse or even horizontal orientation. In the arrangement of FIG. 1, each of the wellbores 14 is completed in the oil shale formation 16. The completions may be either open or cased hole. The well completions may also include propped or unpropped hydraulic fractures emanating therefrom.

In the view of FIG. 1, only seven wellbores 14 are shown. However, it is understood that in an oil shale development project, numerous additional wellbores 14 will most likely be drilled. The wellbores 14 may be located in relatively close proximity, being from 10 feet to up to 300 feet in separation. In some embodiments, a well spacing of 15 to 25 feet is provided. Typically, the wellbores 14 are also completed at shallow depths, being from 200 to 5,000 feet at total depth. In some embodiments the oil shale formation targeted for in situ retorting is at a depth greater than 200 feet below the surface or alternatively 400 feet below the surface. Alternatively, conversion and production of an oil shale formation occur at depths between 500 and 2,500 feet.

The wellbores 14 will be selected for certain functions and may be designated as heat injection wells, water injection wells, oil production wells and/or water-soluble mineral solution production wells. In one aspect, the wellbores 14 are dimensioned to serve two, three, or all four of these purposes. Suitable tools and equipment may be sequentially run into and removed from the wellbores 14 to serve the various purposes.

A fluid processing facility 17 is also shown schematically. The fluid processing facility 17 is equipped to receive fluids produced from the organic-rich rock formation 16 through one or more pipelines or flow lines 18. The fluid processing facility 17 may include equipment suitable for receiving and separating oil, gas, and water produced from the heated formation. The fluid processing facility 17 may further include equipment for separating out dissolved water-soluble minerals and/or migratory contaminant species, including, for example, dissolved organic contaminants, metal contaminants, or ionic contaminants in the produced water recovered from the organic-rich rock formation 16. The contaminants may include, for example, aromatic hydrocarbons such as benzene, toluene, xylene, and tri-methylbenzene. The contaminants may also include polyaromatic hydrocarbons such as anthracene, naphthalene, chrysene and pyrene. Metal contaminants may include species containing arsenic, boron, chromium, mercury, selenium, lead, vanadium, nickel, cobalt, molybdenum, or zinc. Ionic contaminant species may include, for example, sulfates, chlorides, fluorides, lithium, potassium, aluminum, ammonia, and nitrates.

Figure 2:
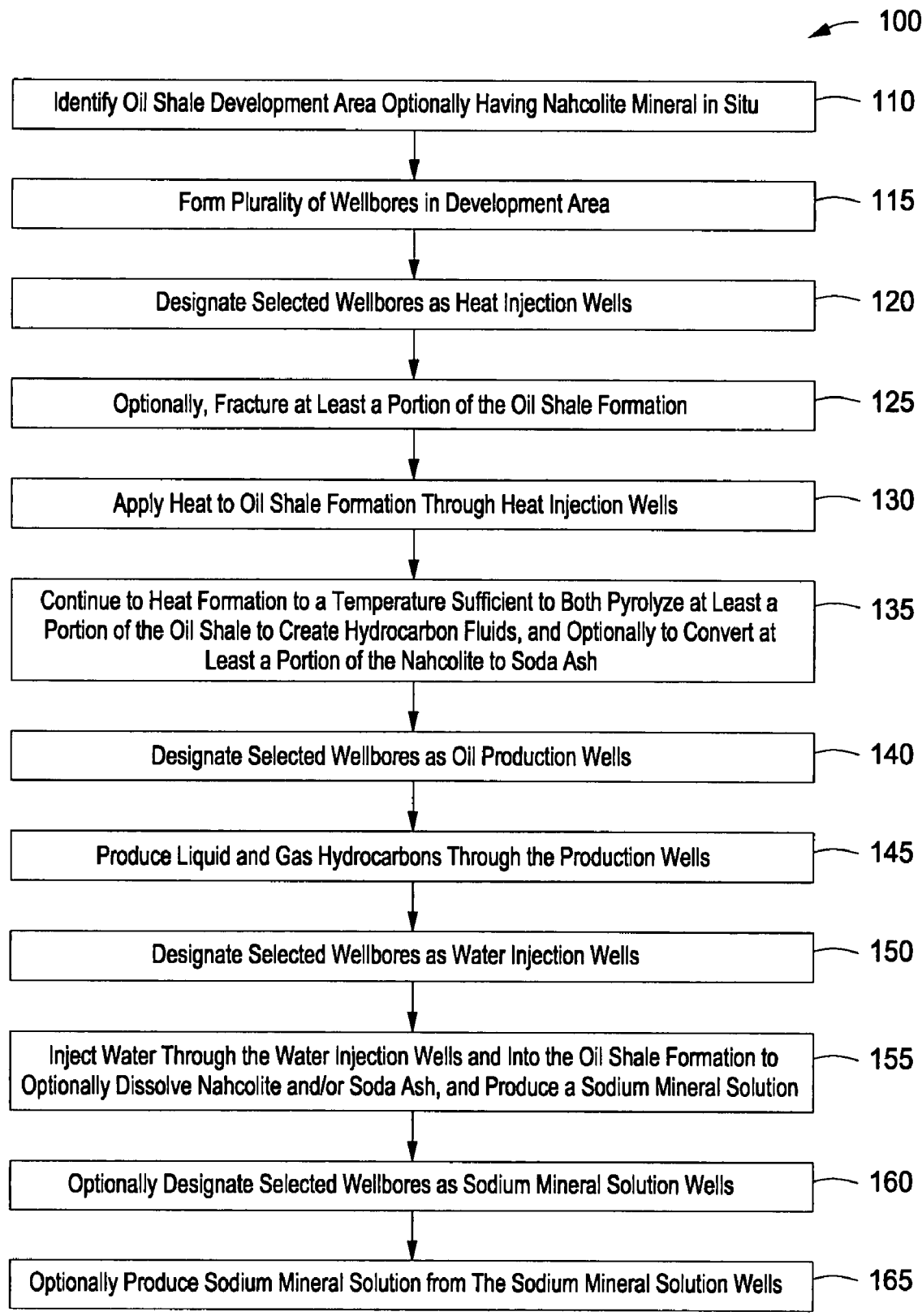
FIG. 2 is a flow chart demonstrating a general method of in situ thermal recovery of oil and gas from an organic-rich rock formation, in one embodiment.

In order to recover oil, gas, and sodium (or other) water-soluble minerals, a series of steps may be undertaken. FIG. 2 presents a flow chart demonstrating a method of in situ thermal recovery of oil and gas from an organic-rich rock formation 100, in one embodiment. It is understood that the order of some of the steps from FIG. 2 may be changed, and that the sequence of steps is merely for illustration.

First, the oil shale (or other organic-rich rock) formation 16 is identified within the development area 10. This step is shown in box 110. Optionally, the oil shale formation may contain nahcolite or other sodium minerals. The targeted development area within the oil shale formation may be identified by measuring or modeling the depth, thickness and organic richness of the oil shale as well as evaluating the position of the organic-rich rock formation relative to other rock types, structural features (e.g. faults, anticlines or synclines), or hydrogeological units (i.e. aquifers). This is accomplished by creating and interpreting maps and/or models of depth, thickness, organic richness and other data from available tests and sources. This may involve performing geological surface surveys, studying outcrops, performing seismic surveys, and/or drilling boreholes to obtain core samples from subsurface rock. Rock samples may be analyzed to assess kerogen content and fluid hydrocarbon-generating capability.

The kerogen content of the organic-rich rock formation may be ascertained from outcrop or core samples using a variety of data. Such data may include organic carbon content, hydrogen index, and modified Fischer assay analyses. Subsurface permeability may also be assessed via rock samples, outcrops, or studies of ground water flow. Furthermore the connectivity of the development area to ground water sources may be assessed.

Next, a plurality of wellbores 14 is formed across the targeted development area 10. This step is shown schematically in box 115. The purposes of the wellbores 14 are set forth above and need not be repeated. However, it is noted that for purposes of the wellbore formation step of box 115, only a portion of the wells need be completed initially. For instance, at the beginning of the project heat injection wells are needed, while a majority of the hydrocarbon production wells are not yet needed. Production wells may be brought in once conversion begins, such as after 4 to 12 months of heating.

It is understood that petroleum engineers will develop a strategy for the best depth and arrangement for the wellbores 14, depending upon anticipated reservoir characteristics, economic constraints, and work scheduling constraints. In addition, engineering staff will determine what wellbores 14 shall be used for initial formation 16 heating. This selection step is represented by box 120.

Concerning heat injection wells, there are various methods for applying heat to the organic-rich rock formation 16. The present methods are not limited to the heating technique employed unless specifically so stated in the claims. The heating step is represented generally by box 130. Preferably, for in situ processes the heating of a production zone takes place over a period of months, or even four or more years.

The formation 16 is heated to a temperature sufficient to pyrolyze at least a portion of the oil shale in order to convert the kerogen to hydrocarbon fluids. The bulk of the target zone of the formation may be heated to between 270° C. to 800° C. Alternatively, the targeted volume of the organic-rich formation is heated to at least 350° C. to create production fluids. The conversion step is represented in FIG. 2 by box 135. The resulting liquids and hydrocarbon gases may be refined into products which resemble common commercial petroleum products. Such liquid products include transportation fuels such as diesel, jet fuel and naptha. Generated gases include light alkanes, light alkenes, $H_2$, $CO_2$, CO, and $NH_3$.

Conversion of the oil shale will create permeability in the oil shale section in rocks that were originally impermeable. Preferably, the heating and conversion processes of boxes 130 and 135, occur over a lengthy period of time. In one aspect, the heating period is from three months to four or more years. Also as an optional part of box 135, the formation 16 may be heated to a temperature sufficient to convert at least a portion of nahcolite, if present, to soda ash. Heat applied to mature the oil shale and recover oil and gas will also convert nahcolite to sodium carbonate (soda ash), a related sodium mineral. The process of converting nahcolite (sodium bicarbonate) to soda ash (sodium carbonate) is described herein.

In connection with the heating step 130, the rock formation 16 may optionally be fractured to aid heat transfer or later hydrocarbon fluid production. The optional fracturing step is shown in box 125. Fracturing may be accomplished by creating thermal fractures within the formation through application of heat. By heating the organic-rich rock and transforming the kerogen to oil and gas, the permeability is increased via thermal fracture formation and subsequent production of a portion of the hydrocarbon fluids generated from the kerogen. Alternatively, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability and/or be used to provide a heater well.

As part of the hydrocarbon fluid production process 100, certain wells 14 may be designated as oil and gas production wells. This step is depicted by box 140. Oil and gas production might not be initiated until it is determined that the kerogen has been sufficiently retorted to allow maximum recovery of oil and gas from the formation 16. In some instances, dedicated production wells are not drilled until after heat injection wells (box 130) have been in operation for a period of several weeks or months. Thus, box 140 may include the formation of additional wellbores 14. In other instances, selected heater wells are converted to production wells.

After certain wellbores 14 have been designated as oil and gas production wells, oil and/or gas is produced from the wellbores 14. The oil and/or gas production process is shown at box 145. At this stage (box 145), any water-soluble minerals, such as nahcolite and converted soda ash may remain substantially trapped in the rock formation 16 as finely disseminated crystals or nodules within the oil shale beds, and are not produced. However, some nahcolite and/or soda ash may be dissolved in the water created during heat conversion (box 135) within the formation.

Box 150 presents an optional next step in the oil and gas recovery method 100. Here, certain wellbores 14 are designated as water or aqueous fluid injection wells. Aqueous fluids are solutions of water with other species. The water may constitute "brine," and may include dissolved inorganic salts of chloride, sulfates and carbonates of Group I and II elements of The Periodic Table of Elements. Organic salts can also be present in the aqueous fluid. The water may alternatively be fresh water containing other species. The other species may be present to alter the pH. Alternatively, the other species may reflect the availability of brackish water not saturated in the species wished to be leached from the subsurface. Preferably, the water injection wells are selected from some or all of the wellbores used for heat injection or for oil and/or gas production. However, the scope of the step of box 150 may include the drilling of yet additional wellbores 14 for use as dedicated water injection wells. In this respect, it may be desirable to complete water injection wells along a periphery of the development area 10 in order to create a boundary of high pressure.

Next, optionally water or an aqueous fluid is injected through the water injection wells and into the oil shale formation 16. This step is shown at box 155. The water may be in the form of steam or pressurized hot water. Alternatively the injected water may be cool and becomes heated as it contacts the previously heated formation. The injection process may further induce fracturing. This process may create fingered caverns and brecciated zones in the nahcolite-bearing intervals some distance, for example up to 200 feet out, from the water injection wellbores. In one aspect, a gas cap, such as nitrogen, may be maintained at the top of each "cavern" to prevent vertical growth.

Along with the designation of certain wellbores 14 as water injection wells, the design engineers may also designate certain wellbores 14 as water or water-soluble mineral solution production wells. This step is shown in box 160. These wells may be the same as wells used to previously produce hydrocarbons or inject heat. These recovery wells may be used to produce an aqueous solution of dissolved water-soluble minerals and other species, including, for example, migratory contaminant species. For example, the solution may be one primarily of dissolved soda ash. This step is shown in box 165. Alternatively, single wellbores may be used to both inject water and then to recover a sodium mineral solution. Thus, box 165 includes the option of using the same wellbores 14 for both water injection and solution production (Box 165).

Temporary control of the migration of the migratory contaminant species, especially during the pyrolysis process, can be obtained via placement of the injection and production wells 14 such that fluid flow out of the heated zone is minimized. Typically, this involves placing injection wells at the periphery of the heated zone so as to cause pressure gradients which prevent flow inside the heated zone from leaving the zone.

Figure 3:
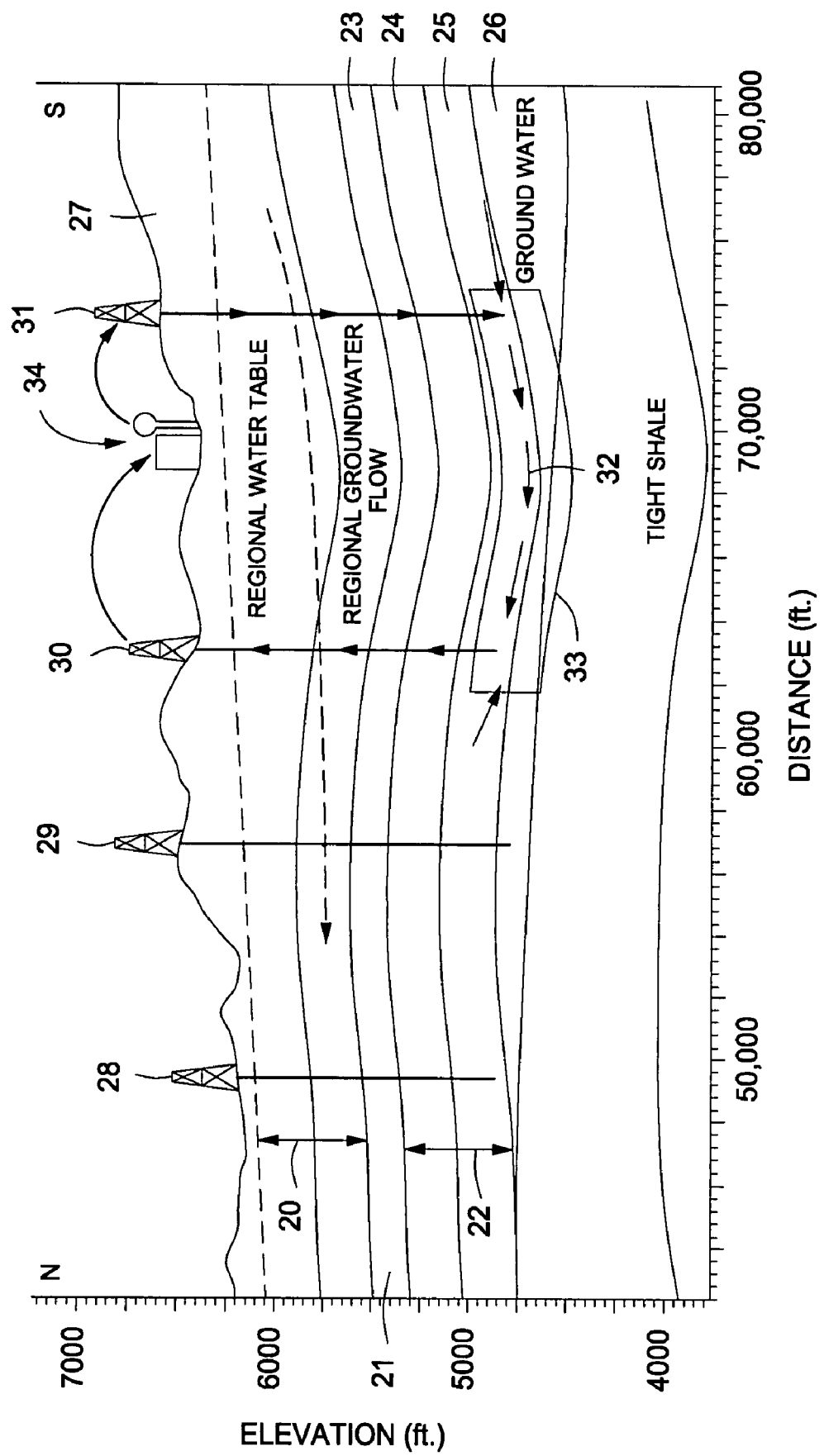
FIG. 3 is a cross-sectional view of an illustrative oil shale formation that is within or connected to groundwater aquifers and a formation leaching operation.

FIG. 3 is a cross-sectional view of an illustrative oil shale formation that is within or connected to ground water aquifers and a formation leaching operation. Four separate oil shale formation zones are depicted (23, 24, 25 and 26) within the oil shale formation. The water aquifers are below the ground surface 27, and are categorized as an upper aquifer 20 and a lower aquifer 22. Intermediate the upper and lower aquifers is an aquitard 21. It can be seen that certain zones of the formation are both aquifers or aquitards and oil shale zones. A plurality of wells (28, 29, 30 and 31) is shown traversing vertically downward through the aquifers. One of the wells is serving as a water injection well 31, while another is serving as a water production well 30. In this way, water is circulated 32 through at least the lower aquifer 22.

FIG. 3 shows diagrammatically the water circulation 32 through an oil shale zone 33 that was heated, that resides within or is connected to an aquifer 22, and from which hydrocarbon fluids were previously recovered. Introduction of water via the water injection well 31 forces water into the previously heated oil shale 33 so that water-soluble minerals and migratory contaminants species are swept to the water production well 30. The water may then processed in a facility 34 wherein the water-soluble minerals (e.g. nahcolite or soda ash) and the migratory contaminants may be substantially removed from the water stream. Water is then reinjected into the oil shale volume 33 and the formation leaching is repeated. This leaching with water is intended to continue until levels of migratory contaminant species are at environmentally acceptable levels within the previously heated oil shale zone 33. This may require 1 cycle, 2 cycles, 5 cycles 10 cycles or more cycles of formation leaching, where a single cycle indicates injection and production of approximately one pore volume of water.

It is understood that there may be numerous water injection and water production wells in an actual oil shale development. Moreover, the system may include monitoring wells (28 and 29) which can be utilized during the oil shale heating phase, the shale oil production phase, the leaching phase, or during any combination of these phases to monitor for migratory contaminant species and/or water-soluble minerals.

In some fields, formation hydrocarbons, such as oil shale, may exist in more than one subsurface formation. In some instances, the organic-rich rock formations may be separated by rock layers that are hydrocarbon-free or that otherwise have little or no commercial value. Therefore, it may be desirable for the operator of a field under hydrocarbon development to undertake an analysis as to which of the subsurface, organic-rich rock formations to target or in which order they should be developed.

The organic-rich rock formation may be selected for development based on various factors. One such factor is the thickness of the hydrocarbon containing layer within the formation. Greater pay zone thickness may indicate a greater potential volumetric production of hydrocarbon fluids. Each of the hydrocarbon containing layers may have a thickness that varies depending on, for example, conditions under which the formation hydrocarbon containing layer was formed. Therefore, an organic-rich rock formation will typically be selected for treatment if that formation includes at least one formation hydrocarbon-containing layer having a thickness sufficient for economical production of produced fluids.

An organic-rich rock formation may also be chosen if the thickness of several layers that are closely spaced together is sufficient for economical production of produced fluids. For example, an in situ conversion process for formation hydrocarbons may include selecting and treating a layer within an organic-rich rock formation having a thickness of greater than about 5 meters, 10 meters, 50 m, or even 100 meters. In this manner, heat losses (as a fraction of total injected heat) to layers formed above and below an organic-rich rock formation may be less than such heat losses from a thin layer of formation hydrocarbons. A process as described herein, however, may also include selecting and treating layers that may include layers substantially free of formation hydrocarbons or thin layers of formation hydrocarbons.

The richness of one or more organic-rich rock formations may also be considered. Richness may depend on many factors including the conditions under which the formation hydrocarbon containing layer was formed, an amount of formation hydrocarbons in the layer, and/or a composition of formation hydrocarbons in the layer. A thin and rich formation hydrocarbon layer may be able to produce significantly more valuable hydrocarbons than a much thicker, less rich formation hydrocarbon layer. Of course, producing hydrocarbons from a formation that is both thick and rich is desirable.

The kerogen content of an organic-rich rock formation may be ascertained from outcrop or core samples using a variety of data. Such data may include organic carbon content, hydrogen index, and modified Fischer assay analyses. The Fischer Assay is a standard method which involves heating a sample of a formation hydrocarbon containing layer to approximately 500° C. in one hour, collecting fluids produced from the heated sample, and quantifying the amount of fluids produced.

Subsurface formation permeability may also be assessed via rock samples, outcrops, or studies of ground water flow. Furthermore the connectivity of the development area to ground water sources may be assessed. Thus, an organic-rich rock formation may be chosen for development based on the permeability or porosity of the formation matrix even if the thickness of the formation is relatively thin.

Other factors known to petroleum engineers may be taken into consideration when selecting a formation for development. Such factors include depth of the perceived pay zone, stratigraphic proximity of fresh ground water to kerogen-containing zones, continuity of thickness, and other factors. For instance, the assessed fluid production content within a formation will also effect eventual volumetric production.

In producing hydrocarbon fluids from an oil shale field, it may be desirable to control the migration of pyrolyzed fluids. In some instances, this includes the use of injection wells, particularly around the periphery of the field. Such wells may inject water, steam, $CO_2$, heated methane, or other fluids to drive cracked kerogen fluids inwardly towards production wells. In some embodiments, physical barriers may be placed around the area of the organic-rich rock formation under development. One example of a physical barrier involves the creation of freeze walls. Freeze walls are formed by circulating refrigerant through peripheral wells to substantially reduce the temperature of the rock formation. This, in turn, prevents the pyrolyzation of kerogen present at the periphery of the field and the outward migration of oil and gas. Freeze walls will also cause native water in the formation along the periphery to freeze.

The use of subsurface freezing to stabilize poorly consolidated soils or to provide a barrier to fluid flow is known in the art. Shell Exploration and Production Company has discussed the use of freeze walls for oil shale production in several patents, including U.S. Pat. Nos. 6,880,633 and 7,032,660. Shell's '660 patent uses subsurface freezing to protect against groundwater flow and groundwater contamination during in situ shale oil production. Additional patents that disclose the use of so-called freeze walls are U.S. Pat. Nos. 3,528,252, 3,943,722, 3,729,965, 4,358,222, and 4,607,488.

Another example of a physical barrier that may be used to limit fluid flow into or out of an oil shale field is the creation of grout walls. Grout walls are formed by injecting cement into the formation to fill permeable pathways. In the context of an oil shale field, cement would be injected along the periphery of the field. This prevents the movement of pyrolyzed fluids out of the field under development, and the movement of water from adjacent aquifers into the field.

As noted above, several different types of wells may be used in the development of an organic-rich rock formation, including, for example, an oil shale field. For example, the heating of the organic-rich rock formation may be accomplished through the use of heater wells. The heater wells may include, for example, electrical resistance heating elements. The production of hydrocarbon fluids from the formation may be accomplished through the use of wells completed for the production of fluids. The injection of an aqueous fluid may be accomplished through the use of injection wells. Finally, the production of an aqueous solution may be accomplished through use of solution production wells.

The different wells listed above may be used for more than one purpose. Stated another way, wells initially completed for one purpose may later be used for another purpose, thereby lowering project costs and/or decreasing the time required to perform certain tasks. For example, one or more of the production wells may also be used as injection wells for later injecting water into the organic-rich rock formation. Alternatively, one or more of the production wells may also be used as solution production wells for later producing an aqueous solution from the organic-rich rock formation.

In other aspects, production wells (and in some circumstances heater wells) may initially be used as dewatering wells (e.g., before heating is begun and/or when heating is initially started). In addition, in some circumstances dewatering wells can later be used as production wells (and in some circumstances heater wells). As such, the dewatering wells may be placed and/or designed so that such wells can be later used as production wells and/or heater wells. The heater wells may be placed and/or designed so that such wells can be later used as production wells and/or dewatering wells. The production wells may be placed and/or designed so that such wells can be later used as dewatering wells and/or heater wells. Similarly, injection wells may be wells that initially were used for other purposes (e.g., heating, production, dewatering, monitoring, etc.), and injection wells may later be used for other purposes. Similarly, monitoring wells may be wells that initially were used for other purposes (e.g., heating, production, dewatering, injection, etc.). Finally, monitoring wells may later be used for other purposes such as water production.

The wellbores for the various wells may be located in relatively close proximity, being from 10 feet to up to 300 feet in separation. Alternatively, the wellbores may be spaced from 30 to 200 feet or 50 to 100 feet. Typically, the wellbores are also completed at shallow depths, being from 200 to 5,000 feet at total depth. Alternatively, the wellbores may be completed at depths from 1,000 to 4,000 feet, or 1,500 to 3,500 feet. In some embodiments, the oil shale formation targeted for in situ retorting is at a depth greater than 200 feet below the surface. In alternative embodiments, the oil shale formation targeted for in situ retorting is at a depth greater than 500, 1,000, or 1,500 feet below the surface. In alternative embodiments, the oil shale formation targeted for in situ retorting is at a depth between 200 and 5,000 feet, alternatively between 1,000 and 4,000 ft, 1,200 and 3,700 feet, or 1,500 and 3,500 feet below the surface.

It is desirable to arrange the various wells for an oil shale field in a pre-planned pattern. For instance, heater wells may be arranged in a variety of patterns including, but not limited to triangles, squares, hexagons, and other polygons. The pattern may include a regular polygon to promote uniform heating through at least the portion of the formation in which the heater wells are placed. The pattern may also be a line drive pattern. A line drive pattern generally includes a first linear array of heater wells, a second linear array of heater wells, and a production well or a linear array of production wells between the first and second linear array of heater wells. Interspersed among the heater wells are typically one or more production wells. The injection wells may likewise be disposed within a repetitive pattern of units, which may be similar to or different from that used for the heater wells.

One method to reduce the number of wells is to use a single well as both a heater well and a production well. Reduction of the number of wells by using single wells for sequential purposes can reduce project costs. One or more monitoring wells may be disposed at selected points in the field. The monitoring wells may be configured with one or more devices that measure a temperature, a pressure, and/or a property of a fluid in the wellbore. In some instances, a heater well may also serve as a monitoring well, or otherwise be instrumented.

Another method for reducing the number of heater wells is to use well patterns. Regular patterns of heater wells equidistantly spaced from a production well may be used. The patterns may form equilateral triangular arrays, hexagonal arrays, or other array patterns. The arrays of heater wells may be disposed such that a distance between each heater well is less than about 70 feet (21 m). A portion of the formation may be heated with heater wells disposed substantially parallel to a boundary of the hydrocarbon formation.

In alternative embodiments, the array of heater wells may be disposed such that a distance between each heater well may be less than about 100 feet, or 50 feet, or 30 feet. Regardless of the arrangement of or distance between the heater wells, in certain embodiments, a ratio of heater wells to production wells disposed within a organic-rich rock formation may be greater than about 5, 8, 10, 20, or more.

In one embodiment, individual production wells are surrounded by at most one layer of heater wells. This may include arrangements such as 5-spot, 7-spot, or 9-spot arrays, with alternating rows of production and heater wells. In another embodiment, two layers of heater wells may surround a production well, but with the heater wells staggered so that a clear pathway exists for the majority of flow away from the further heater wells. Flow and reservoir simulations may be employed to assess the pathways and temperature history of hydrocarbon fluids generated in situ as they migrate from their points of origin to production wells.

Figure 4:
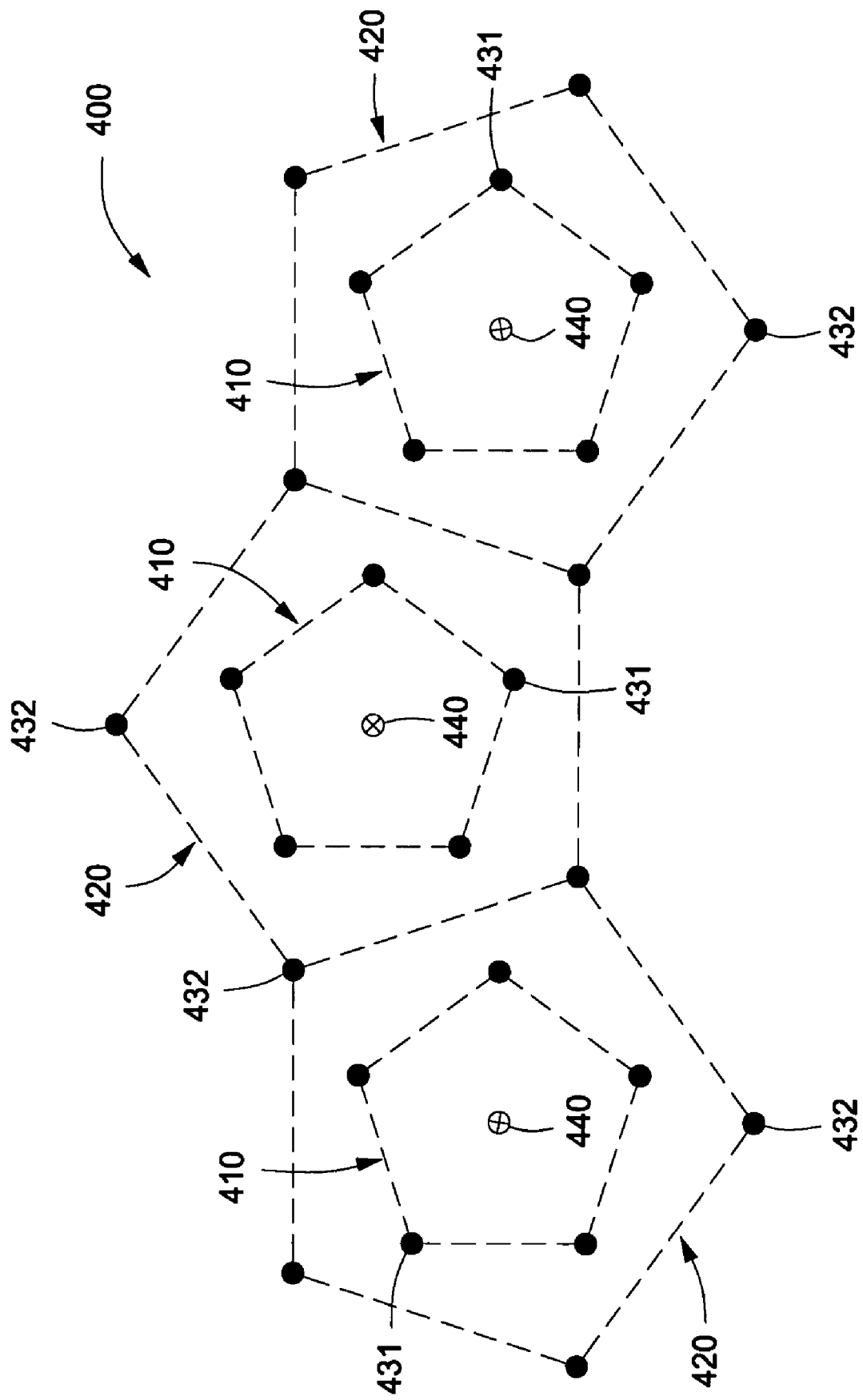
FIG. 4 is a plan view of an illustrative heater well pattern, around a production well. Two layers of heater wells are shown.

FIG. 4 provides a plan view of an illustrative heater well arrangement using more than one layer of heater wells. The heater well arrangement is used in connection with the production of hydrocarbons from a shale oil development area 400. In FIG. 4, the heater well arrangement employs a first layer of heater wells 410, surrounded by a second layer of heater wells 420. The heater wells in the first layer 410 are referenced at 431, while the heater wells in the second layer 420 are referenced at 432.

A production well 440 is shown central to the well layers 410 and 420. It is noted that the heater wells 432 in the second layer 420 of wells are offset from the heater wells 431 in the first layer 410 of wells, relative to the production well 440. The purpose is to provide a flowpath for converted hydrocarbons that minimizes travel near a heater well in the first layer 410 of heater wells. This, in turn, minimizes secondary cracking of hydrocarbons converted from kerogen as hydrocarbons flow from the second layer of wells 420 to the production wells 440.

In the illustrative arrangement of FIG. 4, the first layer 410 and the second layer 420 each defines a 5-spot pattern. However, it is understood that other patterns may be employed, such as 3-spot or 6-spot patterns. In any instance, a plurality of heater wells 431 comprising a first layer of heater wells 410 is placed around a production well 440, with a second plurality of heater wells 432 comprising a second layer of heater wells 420 placed around the first layer 410.

The heater wells in the two layers also may be arranged such that the majority of hydrocarbons generated by heat from each heater well 432 in the second layer 420 are able to migrate to a production well 440 without passing substantially near a heater well 431 in the first layer 410. The heater wells 431, 432 in the two layers 410, 420 further may be arranged such that the majority of hydrocarbons generated by heat from each heater well 432 in the second layer 420 are able to migrate to the production well 440 without passing through a zone of substantially increasing formation temperature.

One method to reduce the number of heater wells is to use well patterns that are elongated in a particular direction, particularly in the direction of most efficient thermal conductivity. Heat convection may be affected by various factors such as bedding planes and stresses within the formation. For instance, heat convection may be more efficient in the direction perpendicular to the least horizontal principal stress on the formation. In some instanced, heat convection may be more efficient in the direction parallel to the least horizontal principal stress.

In connection with the development of an oil shale field, it may be desirable that the progression of heat through the subsurface in accordance with steps 130 and 135 be uniform. However, for various reasons the heating and maturation of formation hydrocarbons in a subsurface formation may not proceed uniformly despite a regular arrangement of heater and production wells. Heterogeneities in the oil shale properties and formation structure may cause certain local areas to be more or less productive. Moreover, formation fracturing which occurs due to the heating and maturation of the oil shale can lead to an uneven distribution of preferred pathways and, thus, increase flow to certain production wells and reduce flow to others. Uneven fluid maturation may be an undesirable condition since certain subsurface regions may receive more heat energy than necessary where other regions receive less than desired. This, in turn, leads to the uneven flow and recovery of production fluids. Produced oil quality, overall production rate, and/or ultimate recoveries may be reduced.

To detect uneven flow conditions, production and heater wells may be instrumented with sensors. Sensors may include equipment to measure temperature, pressure, flow rates, and/or compositional information. Data from these sensors can be processed via simple rules or input to detailed simulations to reach decisions on how to adjust heater and production wells to improve subsurface performance. Production well performance may be adjusted by controlling backpressure or throttling on the well. Heater well performance may also be adjusted by controlling energy input. Sensor readings may also sometimes imply mechanical problems with a well or downhole equipment which requires repair, replacement, or abandonment.

In one embodiment, flow rate, compositional, temperature and/or pressure data are utilized from two or more wells as inputs to a computer algorithm to control heating rate and/or production rates. Unmeasured conditions at or in the neighborhood of the well are then estimated and used to control the well. For example, in situ fracturing behavior and kerogen maturation are estimated based on thermal, flow, and compositional data from a set of wells. In another example, well integrity is evaluated based on pressure data, well temperature data, and estimated in situ stresses. In a related embodiment the number of sensors is reduced by equipping only a subset of the wells with instruments, and using the results to interpolate, calculate, or estimate conditions at uninstrumented wells. Certain wells may have only a limited set of sensors (e.g., wellhead temperature and pressure only) where others have a much larger set of sensors (e.g., wellhead temperature and pressure, bottomhole temperature and pressure, production composition, flow rate, electrical signature, casing strain, etc.).

As noted above, there are various methods for applying heat to an organic-rich rock formation. For example, one method may include electrical resistance heaters disposed in a wellbore or outside of a wellbore. One such method involves the use of electrical resistive heating elements in a cased or uncased wellbore. Electrical resistance heating involves directly passing electricity through a conductive material such that resistive losses cause it to heat the conductive material. Other heating methods include the use of downhole combustors, in situ combustion, radio-frequency (RF) electrical energy, or microwave energy. Still others include injecting a hot fluid into the oil shale formation to directly heat it. The hot fluid may or may not be circulated. One method may include generating heat by burning a fuel external to or within a subsurface formation. For example, heat may be supplied by surface burners or downhole burners or by circulating hot fluids (such as methane gas or naphtha) into the formation through, for example, wellbores via, for example, natural or artificial fractures. Some burners may be configured to perform flameless combustion. Alternatively, some methods may include combusting fuel within the formation such as via a natural distributed combustor, which generally refers to a heater that uses an oxidant to oxidize at least a portion of the carbon in the formation to generate heat, and wherein the oxidation takes place in a vicinity proximate to a wellbore. The present methods are not limited to the heating technique employed unless so stated in the claims.

One method for formation heating involves the use of electrical resistors in which an electrical current is passed through a resistive material which dissipates the electrical energy as heat. This method is distinguished from dielectric heating in which a high-frequency oscillating electric current induces electrical currents in nearby materials and causes them to heat. The electric heater may include an insulated conductor, an elongated member disposed in the opening, and/or a conductor disposed in a conduit. An early patent disclosing the use of electrical resistance heaters to produce oil shale in situ is U.S. Pat. No. 1,666,488. The '488 patent issued to Crawshaw in 1928. Since 1928, various designs for downhole electrical heaters have been proposed. Illustrative designs are presented in U.S. Pat. Nos. 1,701,884, 3,376,403, 4,626,665, 4,704,514, and 6,023,554).

A review of application of electrical heating methods for heavy oil reservoirs is given by R. Sierra and S.M. Farouq Ali, "Promising Progress in Field Application of Reservoir Electrical Heating Methods", Society of Petroleum Engineers Paper 69709, 2001.

Certain previous designs for in situ electrical resistance heaters utilized solid, continuous heating elements (e.g., metal wires or strips). However, such elements may lack the necessary robustness for long-term, high temperature applications such as oil shale maturation. As the formation heats and the oil shale matures, significant expansion of the rock occurs. This leads to high stresses on wells intersecting the formation. These stresses can lead to bending and stretching of the wellbore pipe and internal components. Cementing (e.g., U.S. Pat. No. 4,886,118) or packing (e.g., U.S. Pat. No. 2,732,195) a heating element in place may provide some protection against stresses, but some stresses may still be transmitted to the heating element.

As an alternative, international patent publication WO 2005/010320 teaches the use of electrically conductive fractures to heat the oil shale. A heating element is constructed by forming wellbores and then hydraulically fracturing the oil shale formation around the wellbores. The fractures are filled with an electrically conductive material which forms the heating element. Calcined petroleum coke is an exemplary suitable conductant material. Preferably, the fractures are created in a vertical orientation along longitudinal, horizontal planes formed by horizontal wellbores. Electricity may be conducted through the conductive fractures from the heel to the toe of each well. The electrical circuit may be completed by an additional horizontal well that intersects one or more of the vertical fractures near the toe to supply the opposite electrical polarity.

The WO 2005/010320 process creates an "in situ toaster" that artificially matures oil shale through the application of electric heat. Modeling suggests that temperatures in the immediate vicinity of the fracture may exceed 600° C. Thermal conduction heats the oil shale to conversion temperatures in excess of 300° C. causing artificial maturation.

International patent publication WO 2005/045192 teaches an alternative heating means that employs the circulation of a heated fluid within an oil shale formation. In the process of WO 2005/045192 supercritical heated naphtha is circulated through fractures in the formation. This means that the oil shale is heated by circulating a dense, hot hydrocarbon vapor through sets of closely-spaced hydraulic fractures. In one aspect, the fractures are horizontally formed and conventionally propped. Fracture temperatures of 320°-400° C. are maintained for up to five to ten years. Vaporized naptha may be the preferred heating medium due to its high volumetric heat capacity, ready availability and relatively low degradation rate at the heating temperature. In the WO 2005/045192 process, as the kerogen matures, fluid pressure will drive the generated oil to the heated fractures, where it will be produced with the cycling hydrocarbon vapor.

The purpose for heating the organic-rich rock formation is to pyrolyze at least a portion of the solid formation hydrocarbons to create hydrocarbon fluids. The solid formation hydrocarbons may be pyrolyzed in situ by raising the organic-rich rock formation (or zones within the formation), to a pyrolyzation temperature. In certain embodiments, the temperature of the formation may be slowly raised through the pyrolysis temperature range. For example, an in situ conversion process may include heating at least a portion of the organic-rich rock formation to raise the average temperature of the zone above about 270° C. at a rate less than a selected amount (e.g., about 10° C., 5° C.; 3° C., 1° C., 0.5° C., or 0.1° C.) per day. In a further embodiment, the portion may be heated such that an average temperature of the selected zone may be less than about 375° C. or, in some embodiments, less than about 400° C. The formation may be heated such that a temperature within the formation reaches (at least) an initial pyrolyzation temperature (e.g., a temperature at the lower end of the temperature range where pyrolyzation begins to occur.

The pyrolysis temperature range may vary depending on the types of formation hydrocarbons within the formation, the heating methodology, and the distribution of heating sources. For example, a pyrolysis temperature range may include temperatures between about 270° C. and about 900° C. Alternatively, the bulk of the target zone of the formation may be heated to between 300° to 600° C. In an alternative embodiment, a pyrolysis temperature range may include temperatures between about 270° C. to about 500° C.

Preferably, for in situ processes the heating of a production zone takes place over a period of months, or even four or more years. Alternatively, the formation may be heated for one to fifteen years, alternatively, 3 to 10 years, 1.5 to 7 years, or 2 to 5 years. The bulk of the target zone of the formation may be heated to between 270° to 800° C. Preferably, the bulk of the target zone of the formation is heated to between 300° to 600° C. Alternatively, the bulk of the target zone is ultimately heated to a temperature below 400° C. (752° F.).

In certain embodiments of the methods of the present invention, downhole burners may be used to heat a targeted oil shale zone. Downhole burners of various design have been discussed in the patent literature for use in oil shale and other largely solid hydrocarbon deposits. Examples include U.S. Pat. Nos. 2,887,160; 2,847,071; 2,895,555; 3,109,482; 3,225,829; 3,241,615; 3,254,721; 3,127,936; 3,095,031; 5,255,742; and 5,899,269. Downhole burners operate through the transport of a combustible fuel (typically natural gas) and an oxidizer (typically air) to a subsurface position in a wellbore. The fuel and oxidizer react downhole to generate heat. The combustion gases are removed (typically by transport to the surface, but possibly via injection into the formation). Oftentimes, downhole burners utilize pipe-in-pipe arrangements to transport fuel and oxidizer downhole, and then to remove the flue gas back up to the surface. Some downhole burners generate a flame, while others may not.

The use of downhole burners is an alternative to another form of downhole heat generation called steam generation. In downhole steam generation, a combustor in the well is used to boil water placed in the wellbore for injection into the formation. Applications of the downhole heat technology have been described in F. M. Smith, "A Down-hole burner—Versatile tool for well heating," 25$^{th}$ Technical Conference on Petroleum Production, Pennsylvania State University, pp 275-285 (Oct. 19-21, 1966); H. Brandt, W. G. Poynter, and J. D. Hummell, "Stimulating Heavy Oil Reservoirs with Downhole Air-Gas Burners," World Oil, pp. 91-95 (September 1965); and C. I. DePriester and A. J. Pantaleo, "Well Stimulation by Downhole Gas-Air Burner," Journal of Petroleum Technology, pp. 1297-1302 (December 1963).

Downhole burners have advantages over electrical heating methods due to the reduced infrastructure cost. In this respect, there is no need for an expensive electrical power plant and distribution system. Moreover, there is increased thermal efficiency because the energy losses inherently experienced during electrical power generation are avoided.

Few applications of downhole burners exist due to various design issues. Such downhole burner design issues include temperature control and metallurgy limitations. In this respect, the flame temperature can overheat the tubular and burner hardware and cause them to fail via melting, thermal stresses, severe loss of tensile strength, or creep. Certain stainless steels, typically with high chromium content, can tolerate temperatures up to ~700° C. for extended periods. (See for example H. E. Boyer and T. L. Gall (eds.), *Metals Handbook*, "Chapter 16: Heat-Resistant Materials", American Society for Metals, (1985.) The existence of flames can cause hot spots within the burner and in the formation surrounding the burner. This is due to radiant heat transfer from the luminous portion of the flame. However, a typical gas flame can produce temperatures up to about 1,650° C. Materials of construction for the burners must be sufficient to withstand the temperatures of these hot spots. The heaters are therefore more expensive than a comparable heater without flames.

For downhole burner applications, heat transfer can occur in one of several ways. These include conduction, convection, and radiative methods. Radiative heat transfer can be particularly strong for an open flame. Additionally, the flue gases can be corrosive due to the $CO_2$ and water content. Use of refractory metals or ceramics can help solve these problems, but typically at a higher cost. Ceramic materials with acceptable strength at temperatures in excess of 900° C. are generally high alumina content ceramics. Other ceramics that may be useful include chrome oxide, zirconia oxide, and magnesium oxide based ceramics. Additionally, depending on the nature of the downhole combustion $NO_x$ generation may be significant.

Heat transfer in a pipe-in-pipe arrangement for a downhole burner can also lead to difficulties. The down going fuel and air will heat exchange with the up going hot flue gases. In a well there is minimal room for a high degree of insulation and hence significant heat transfer is typically expected. This cross heat exchange can lead to higher flame temperatures as the fuel and air become preheated. Additionally, the cross heat exchange can limit the transport of heat downstream of the burner since the hot flue gases may rapidly lose heat energy to the rising cooler flue gases.

In the production of oil and gas resources, it may be desirable to use the produced hydrocarbons as a source of power for ongoing operations. This may be applied to the development of oil and gas resources from oil shale. In this respect, when electrically resistive heaters are used in connection with in situ shale oil recovery, large amounts of power are required.

Electrical power may be obtained from turbines that turn generators. It may be economically advantageous to power the gas turbines by utilizing produced gas from the field. However, such produced gas must be carefully controlled so not to damage the turbine, cause the turbine to misfire, or generate excessive pollutants (e.g., $NO_x$).

One source of problems for gas turbines is the presence of contaminants within the fuel. Contaminants include solids, water, heavy components present as liquids, and hydrogen sulfide. Additionally, the combustion behavior of the fuel is important. Combustion parameters to consider include heating value, specific gravity, adiabatic flame temperature, flammability limits, autoignition temperature, autoignition delay time, and flame velocity. Wobbe Index (WI) is often used as a key measure of fuel quality. WI is equal to the ratio of the lower heating value to the square root of the gas specific gravity. Control of the fuel's Wobbe Index to a target value and range of, for example, ±10% or ±20% can allow simplified turbine design and increased optimization of performance.

Fuel quality control may be useful for shale oil developments where the produced gas composition may change over the life of the field and where the gas typically has significant amounts of $CO_2$, $CO$, and $H_2$ in addition to light hydrocarbons. Commercial scale oil shale retorting is expected to produce a gas composition that changes with time.

Inert gases in the turbine fuel can increase power generation by increasing mass flow while maintaining a flame temperature in a desirable range. Moreover inert gases can lower flame temperature and thus reduce $NO_x$ pollutant generation. Gas generated from oil shale maturation may have significant $CO_2$ content. Therefore, in certain embodiments of the production processes, the $CO_2$ content of the fuel gas is adjusted via separation or addition in the surface facilities to optimize turbine performance.

Achieving a certain hydrogen content for low-BTU fuels may also be desirable to achieve appropriate burn properties. In certain embodiments of the processes herein, the $H_2$ content of the fuel gas is adjusted via separation or addition in the surface facilities to optimize turbine performance. Adjustment of $H_2$ content in non-shale oil surface facilities utilizing low BTU fuels has been discussed in the patent literature (e.g., U.S. Pat. Nos. 6,684,644 and 6,858,049, the entire disclosures of which are hereby incorporated by reference).

The process of heating formation hydrocarbons within an organic-rich rock formation, for example, by pyrolysis, may generate fluids. The heat-generated fluids may include water which is vaporized within the formation. In addition, the action of heating kerogen produces pyrolysis fluids which tend to expand upon heating. The produced pyrolysis fluids may include not only water, but also, for example, hydrocarbons, oxides of carbon, ammonia, molecular nitrogen, and molecular hydrogen. Therefore, as temperatures within a heated portion of the formation increase, a pressure within the heated portion may also increase as a result of increased fluid generation, molecular expansion, and vaporization of water. Thus, some corollary exists between subsurface pressure in an oil shale formation and the fluid pressure generated during pyrolysis. This, in turn, indicates that formation pressure may be monitored to detect the progress of a kerogen conversion process.

The pressure within a heated portion of an organic-rich rock formation depends on other reservoir characteristics. These may include, for example, formation depth, distance from a heater well, a richness of the formation hydrocarbons within the organic-rich rock formation, the degree of heating, and/or a distance from a producer well.

It may be desirable for the developer of an oil shale field to monitor formation pressure during development. Pressure within a formation may be determined at a number of different locations. Such locations may include, but may not be limited to, at a wellhead and at varying depths within a wellbore. In some embodiments, pressure may be measured at a producer well. In an alternate embodiment, pressure may be measured at a heater well. In still another embodiment, pressure may be measured downhole of a dedicated monitoring well.

The process of heating an organic-rich rock formation to a pyrolysis temperature range not only will increase formation pressure, but will also increase formation permeability. The pyrolysis temperature range should be reached before substantial permeability has been generated within the organic-rich rock formation. An initial lack of permeability may prevent the transport of generated fluids from a pyrolysis zone within the formation. In this manner, as heat is initially transferred from a heater well to an organic-rich rock formation, a fluid pressure within the organic-rich rock formation may increase proximate to that heater well. Such an increase in fluid pressure may be caused by, for example, the generation of fluids during pyrolysis of at least some formation hydrocarbons in the formation.

Alternatively, pressure generated by expansion of pyrolysis fluids or other fluids generated in the formation may be allowed to increase. This assumes that an open path to a production well or other pressure sink does not yet exist in the formation. In one aspect, a fluid pressure may be allowed to increase to or above a lithostatic stress. In this instance, fractures in the hydrocarbon containing formation may form when the fluid pressure equals or exceeds the lithostatic stress. For example, fractures may form from a heater well to a production well. The generation of fractures within the heated portion may reduce pressure within the portion due to the production of produced fluids through a production well.

Once pyrolysis has begun within an organic-rich rock formation, fluid pressure may vary depending upon various factors. These include, for example, thermal expansion of hydrocarbons, generation of pyrolysis fluids, rate of conversion, and withdrawal of generated fluids from the formation. For example, as fluids are generated within the formation, fluid pressure within the pores may increase. Removal of generated fluids from the formation may then decrease the fluid pressure within the near wellbore region of formation.

In certain embodiments, a mass of at least a portion of an organic-rich rock formation may be reduced due, for example, to pyrolysis of formation hydrocarbons and the production of hydrocarbon fluids from the formation. As such, the permeability and porosity of at least a portion of the formation may increase. Any in situ method that effectively produces oil and gas from oil shale will create permeability in what was originally a very low permeability rock. The extent to which this will occur is illustrated by the large amount of expansion that must be accommodated if fluids generated from kerogen are unable to flow. The concept is illustrated in FIG. 5.

Figure 5:
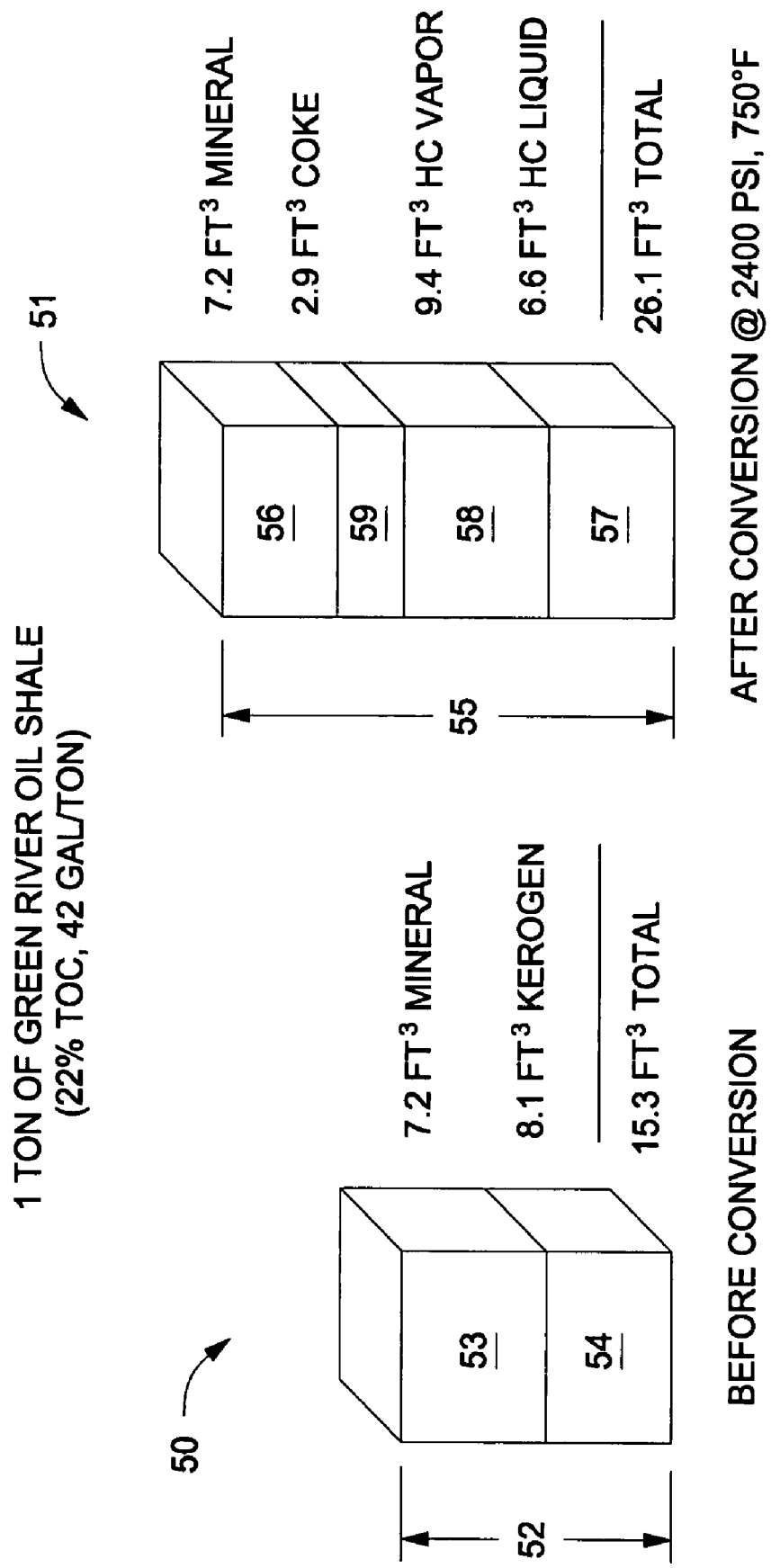
FIG. 5 is a bar chart comparing one ton of Green River oil shale before and after a simulated in situ, retorting process.

FIG. 5 provides a bar chart comparing one ton of Green River oil shale before 50 and after 51 a simulated in situ, retorting process. The simulated process was carried out at 2,400 psi and 750° F. on oil shale having a total organic carbon content of 22 wt. % and a Fisher assay of 42 gallons/ton. Before the conversion, a total of 15.3 ft$^3$ of rock matrix 52 existed. This matrix comprised 7.2 ft$^3$ of mineral 53, i.e., dolomite, limestone, etc., and 8.1 ft$^3$ of kerogen 54 imbedded within the shale. As a result of the conversion the material expanded to 26.1 ft$^3$ 55. This represented 7.2 ft$^3$ of mineral 56 (the same number as before the conversion), 6.6 ft$^3$ of hydrocarbon liquid 57, 9.4 ft$^3$ of hydrocarbon vapor 58, and 2.9 ft$^3$ of coke 59. It can be seen that substantial volume expansion occurred during the conversion process. This, in turn, increases permeability of the rock structure.

In an embodiment, heating a portion of an organic-rich rock formation in situ to a pyrolysis temperature may increase permeability of the heated portion. For example, permeability may increase due to formation of thermal fractures within the heated portion caused by application of heat. As the temperature of the heated portion increases, water may be removed due to vaporization. The vaporized water may escape and/or be removed from the formation. In addition, permeability of the heated portion may also increase as a result of production of hydrocarbon fluids from pyrolysis of at least some of the formation hydrocarbons within the heated portion on a macroscopic scale.

Certain systems and methods described herein may be used to treat formation hydrocarbons in at least a portion of a relatively low permeability formation (e.g., in "tight" formations that contain formation hydrocarbons). Such formation hydrocarbons may be heated to pyrolyze at least some of the formation hydrocarbons in a selected zone of the formation. Heating may also increase the permeability of at least a portion of the selected zone. Hydrocarbon fluids generated from pyrolysis may be produced from the formation, thereby further increasing the formation permeability.

Permeability of a selected zone within the heated portion of the organic-rich rock formation may also rapidly increase while the selected zone is heated by conduction. For example, permeability of an impermeable organic-rich rock formation may be less than about 0.1 millidarcy before heating. In some embodiments, pyrolyzing at least a portion of organic-rich rock formation may increase permeability within a selected zone of the portion to greater than about 10 millidarcies, 100 millidarcies, 1 Darcy, 10 Darcies, 20 Darcies, or 50 Darcies. Therefore, a permeability of a selected zone of the portion may increase by a factor of more than about 10, 100, 1,000, 10,000, or 100,000. In one embodiment, the organic-rich rock formation has an initial total permeability less than 1 millidarcy, alternatively less than 0.1 or 0.01 millidarcies, before heating the organic-rich rock formation. In one embodiment, the organic-rich rock formation has a post heating total permeability of greater than 1 millidarcy, alternatively, greater than 10, 50 or 100 millidarcies, after heating the organic-rich rock formation.

In connection with heating the organic-rich rock formation, the organic-rich rock formation may optionally be fractured to aid heat transfer or hydrocarbon fluid production. In one instance, fracturing may be accomplished naturally by creating thermal fractures within the formation through application of heat. Thermal fracture formation is caused by thermal expansion of the rock and fluids and by chemical expansion of kerogen transforming into oil and gas. Thermal fracturing can occur both in the immediate region undergoing heating, and in cooler neighboring regions. The thermal fracturing in the neighboring regions is due to propagation of fractures and tension stresses developed due to the expansion in the hotter zones. Thus, by both heating the organic-rich rock and transforming the kerogen to oil and gas, the permeability is increased not only from fluid formation and vaporization, but also via thermal fracture formation. The increased permeability aids fluid flow within the formation and production of the hydrocarbon fluids generated from the kerogen.

In addition, a process known as hydraulic fracturing may be used. Hydraulic fracturing is a process known in the art of oil and gas recovery where a fracture fluid is pressurized within the wellbore above the fracture pressure of the formation, thus developing fracture planes within the formation to relieve the pressure generated within the wellbore. Hydraulic fractures may be used to create additional permeability and/or be used to provide an extended geometry for a heater well. The WO 2005/010320 patent publication incorporated above describes one such method.

In connection with the production of hydrocarbons from a rock matrix, particularly those of shallow depth, a concern may exist with respect to earth subsidence. This is particularly true in the in situ heating of organic-rich rock where a portion of the matrix itself is thermally converted and removed. Initially, the formation may contain formation hydrocarbons in solid form, such as, for example, kerogen. The formation may also initially contain water-soluble minerals. Initially, the formation may also be substantially impermeable to fluid flow.

The in situ heating of the matrix pyrolyzes at least a portion of the formation hydrocarbons to create hydrocarbon fluids. This, in turn, creates permeability within a matured (pyrolyzed) organic-rich rock zone in the organic-rich rock formation. The combination of pyrolyzation and increased permeability permits hydrocarbon fluids to be produced from the formation. At the same time, the loss of supporting matrix material also creates the potential for subsidence relative to the earth surface.

In some instances, subsidence is sought to be minimized in order to avoid environmental or hydrogeological impact. In this respect, changing the contour and relief of the earth surface, even by a few inches, can change runoff patterns, affect vegetation patterns, and impact watersheds. In addition, subsidence has the potential of damaging production or heater wells formed in a production area. Such subsidence can create damaging hoop and compressional stresses on wellbore casings, cement jobs, and equipment downhole.

In order to avoid or minimize subsidence, it is proposed to leave selected portions of the formation hydrocarbons substantially unpyrolyzed. This serves to preserve one or more unmatured, organic-rich rock zones. In some embodiments, the unmatured organic-rich rock zones may be shaped as substantially vertical pillars extending through a substantial portion of the thickness of the organic-rich rock formation.

The heating rate and distribution of heat within the formation may be designed and implemented to leave sufficient unmatured pillars to prevent subsidence. In one aspect, heat injection wellbores are formed in a pattern such that untreated pillars of oil shale are left therebetween to support the overburden and prevent subsidence.

It is preferred that thermal recovery of oil and gas be conducted before any solution mining of nahcolite or other water-soluble minerals present in the formation. Solution mining can generate large voids in a rock formation and collapse breccias in an oil shale development area. These voids and brecciated zones may pose problems for in situ and mining recovery of oil shale, further increasing the utility of supporting pillars.

In some embodiments, compositions and properties of the hydrocarbon fluids produced by an in situ conversion process may vary depending on, for example, conditions within an organic-rich rock formation. Controlling heat and/or heating rates of a selected section in an organic-rich rock formation may increase or decrease production of selected produced fluids.

In one embodiment, operating conditions may be determined by measuring at least one property of the organic-rich rock formation. The measured properties may be input into a computer executable program. At least one property of the produced fluids selected to be produced from the formation may also be input into the computer executable program. The program may be operable to determine a set of operating conditions from at least the one or more measured properties. The program may also be configured to determine the set of operating conditions from at least one property of the selected produced fluids. In this manner, the determined set of operating conditions may be configured to increase production of selected produced fluids from the formation.

Certain heater well embodiments may include an operating system that is coupled to any of the heater wells such as by insulated conductors or other types of wiring. The operating system may be configured to interface with the heater well. The operating system may receive a signal (e.g., an electromagnetic signal) from a heater that is representative of a temperature distribution of the heater well. Additionally, the operating system may be further configured to control the heater well, either locally or remotely. For example, the operating system may alter a temperature of the heater well by altering a parameter of equipment coupled to the heater well. Therefore, the operating system may monitor, alter, and/or control the heating of at least a portion of the formation.

In some embodiments, a heater well may be turned down and/or off after an average temperature in a formation may have reached a selected temperature. Turning down and/or off the heater well may reduce input energy costs, substantially inhibit overheating of the formation, and allow heat to substantially transfer into colder regions of the formation.

Temperature (and average temperatures) within a heated organic-rich rock formation may vary, depending on, for example, proximity to a heater well, thermal conductivity and thermal diffusivity of the formation, type of reaction occurring, type of formation hydrocarbon, and the presence of water within the organic-rich rock formation. At points in the field where monitoring wells are established, temperature measurements may be taken directly in the wellbore. Further, at heater wells the temperature of the immediately surrounding formation is fairly well understood. However, it is desirable to interpolate temperatures to points in the formation intermediate temperature sensors and heater wells.

In accordance with one aspect of the production processes of the present inventions, a temperature distribution within the organic-rich rock formation may be computed using a numerical simulation model. The numerical simulation model may calculate a subsurface temperature distribution through interpolation of known data points and assumptions of formation conductivity. In addition, the numerical simulation model may be used to determine other properties of the formation under the assessed temperature distribution. For example, the various properties of the formation may include, but are not limited to, permeability of the formation.

The numerical simulation model may also include assessing various properties of a fluid formed within an organic-rich rock formation under the assessed temperature distribution. For example, the various properties of a formed fluid may include, but are not limited to, a cumulative volume of a fluid formed in the formation, fluid viscosity, fluid density, and a composition of the fluid formed in the formation. Such a simulation may be used to assess the performance of a commercial-scale operation or small-scale field experiment. For example, a performance of a commercial-scale development may be assessed based on, but not limited to, a total volume of product that may be produced from a research-scale operation.

Some embodiments include producing at least a portion of the hydrocarbon fluids from the organic-rich rock formation. The hydrocarbon fluids may be produced through production wells. Production wells may be cased or uncased wells and drilled and completed through methods known in the art.

Some embodiments further include producing a production fluid from the organic-rich rock formation where the production fluid contains the hydrocarbon fluids and an aqueous fluid. The aqueous fluid may contain water-soluble minerals and/or migratory contaminant species. In such case, the production fluid may be separated into a hydrocarbon stream and an aqueous stream at a surface facility. Thereafter the water-soluble minerals and/or migratory contaminant species may be recovered from the aqueous stream. This embodiment may be combined with any of the other aspects of the invention discussed herein.

The produced hydrocarbon fluids may include a pyrolysis oil component (or condensable component) and a pyrolysis gas component (or non-condensable component). Condensable hydrocarbons produced from the formation will typically include paraffins, cycloalkanes, mono-aromatics, and di-aromatics as components. Such condensable hydrocarbons may also include other components such as tri-aromatics and other hydrocarbon species.

In certain embodiments, a majority of the hydrocarbons in the produced fluid may have a carbon number of less than approximately 25. Alternatively, less than about 15 weight % of the hydrocarbons in the fluid may have a carbon number greater than approximately 25. The non-condensable hydrocarbons may include, but are not limited to, hydrocarbons having carbon numbers less than 5.

In certain embodiments, the API gravity of the condensable hydrocarbons in the produced fluid may be approximately 20 or above (e.g., 25, 30, 40, 50, etc.). In certain embodiments, the hydrogen to carbon atomic ratio in produced fluid may be at least approximately 1.7 (e.g., 1.8, 1.9, etc.).

Some production procedures include in situ heating of an organic-rich rock formation that contains both formation hydrocarbons and formation water-soluble minerals prior to substantial removal of the formation water-soluble minerals from the organic-rich rock formation. In some embodiments of the invention there is no need to partially, substantially or completely remove the water-soluble minerals prior to in situ heating. For example, in an oil shale formation that contains naturally occurring nahcolite, the oil shale may be heated prior to substantial removal of the nahcolite by solution mining. Substantial removal of a water-soluble mineral may represent the degree of removal of a water-soluble mineral that occurs from any commercial solution mining operation as known in the art. Substantial removal of a water-soluble mineral may be approximated as removal of greater than 5 weight percent of the total amount of a particular water-soluble mineral present in the zone targeted for hydrocarbon fluid production in the organic-rich rock formation. In alternative embodiments, in situ heating of the organic-rich rock formation to pyrolyze formation hydrocarbons may be commenced prior to removal of greater than 3 weight percent, alternatively 7 weight percent, 10 weight percent or 13 weight percent of the formation water-soluble minerals from the organic-rich rock formation.

The impact of heating oil shale to produce oil and gas prior to producing nahcolite is to convert the nahcolite to a more recoverable form (soda ash), and provide permeability facilitating its subsequent recovery. Water-soluble mineral recovery may take place as soon as the retorted oil is produced, or it may be left for a period of years for later recovery. If desired, the soda ash can be readily converted back to nahcolite on the surface. The ease with which this conversion can be accomplished makes the two minerals effectively interchangeable.

In some production processes, heating the organic-rich rock formation includes generating soda ash by decomposition of nahcolite. The method may include processing an aqueous solution containing water-soluble minerals in a surface facility to remove a portion of the water-soluble minerals. The processing step may include removing the water-soluble minerals by precipitation caused by altering the temperature of the aqueous solution.

The water-soluble minerals may include sodium. The water-soluble minerals may also include nahcolite (sodium bicarbonate), soda ash (sodium carbonate), dawsonite (NaAl$(CO_3)(OH)_2$), or combinations thereof. The surface processing may further include converting the soda ash back to sodium bicarbonate (nahcolite) in the surface facility by reaction with $CO_2$. After partial or complete removal of the water-soluble minerals, the aqueous solution may be reinjected into a subsurface formation where it may be sequestered. The subsurface formation may be the same as or different from the original organic-rich rock formation.

In some production processes, heating of the organic-rich rock formation both pyrolyzes at least a portion of the formation hydrocarbons to create hydrocarbon fluids and makes available migratory contaminant species previously bound in the organic-rich rock formation. The migratory contaminant species may be formed through pyrolysis of the formation hydrocarbons, may be liberated from the formation itself upon heating, or may be made accessible through the creation of increased permeability upon heating of the formation. The migratory contaminant species may be soluble in water or other aqueous fluids present in or injected into the organic-rich rock formation.

Producing hydrocarbons from pyrolyzed oil shale will generally leave behind some migratory contaminant species which are at least partially water-soluble. Depending on the hydrological connectivity of the pyrolyzed shale oil to shallower zones, these components may eventually migrate into ground water in concentrations which are environmentally unacceptable. The types of potential migratory contaminant species depend on the nature of the oil shale pyrolysis and the composition of the oil shale being converted. If the pyrolysis is performed in the absence of oxygen or air, the contaminant species may include aromatic hydrocarbons (e.g. benzene, toluene, ethylbenzene, xylenes), polyaromatic hydrocarbons (e.g. anthracene, pyrene, naphthalene, chrysene), metal contaminants (e.g. As, Co, Pb, Mo, Ni, and Zn), and other species such as sulfates, ammonia, Al, K, Mg, chlorides, flourides and phenols. If oxygen or air is employed, contaminant species may also include ketones, alcohols, and cyanides. Further, the specific migratory contaminant species present may include any subset or combination of the above-described species.

It may be desirable for a field developer to assess the connectivity of the organic-rich rock formation to aquifers. This may be done to determine if, or to what extent, in situ pyrolysis of formation hydrocarbons in the organic-rich rock formation may create migratory species with the propensity to migrate into an aquifer. If the organic-rich rock formation is hydrologically connected to an aquifer, precautions may be taken to reduce or prevent species generated or liberated during pyrolysis from entering the aquifer. Alternatively, the organic-rich rock formation may be flushed with water or an aqueous fluid after pyrolysis as described herein to remove water-soluble minerals and/or migratory contaminant species. In other embodiments, the organic-rich rock formation may be substantially hydrologically unconnected to any source of ground water. In such a case, flushing the organic-rich rock formation may not be necessary for removal of migratory contaminant species but may nevertheless be desirable for recovery of water-soluble minerals.

Following production of hydrocarbons from an organic-rich formation, some migratory contaminant species may remain in the rock formation. In such case, it may be desirable to inject an aqueous fluid into the organic-rich rock formation and have the injected aqueous fluid dissolve at least a portion of the water-soluble minerals and/or the migratory contaminant species to form an aqueous solution. The aqueous solution may then be produced from the organic-rich rock formation through, for example, solution production wells. The aqueous fluid may be adjusted to increase the solubility of the migratory contaminant species and/or the water-soluble minerals. The adjustment may include the addition of an acid or base to adjust the pH of the solution. The resulting aqueous solution may then be produced from the organic-rich rock formation to the surface for processing.

After initial aqueous fluid production, it may further be desirable to flush the matured organic-rich rock zone and the unmatured organic-rich rock zone with an aqueous fluid. The aqueous fluid may be used to further dissolve water-soluble minerals and migratory contaminant species. The flushing may optionally be completed after a substantial portion of the hydrocarbon fluids have been produced from the matured organic-rich rock zone. In some embodiments, the flushing step may be delayed after the hydrocarbon fluid production step. The flushing may be delayed to allow heat generated from the heating step to migrate deeper into surrounding unmatured organic-rich rock zones to convert nahcolite within the surrounding unmatured organic-rich rock zones to soda ash. Alternatively, the flushing may be delayed to allow heat generated from the heating step to generate permeability within the surrounding unmatured organic-rich rock zones. Further, the flushing may be delayed based on current and/or forecast market prices of sodium bicarbonate, soda ash, or both as further discussed herein. This method may be combined with any of the other aspects of the invention as discussed herein Upon flushing of an aqueous solution, it may be desirable to process the aqueous solution in a surface facility to remove at least some of the migratory contaminant species. The migratory contaminant species may be removed through use of, for example, an adsorbent material, reverse osmosis, chemical oxidation, bio-oxidation, and/or ion exchange. Examples of these processes are individually known in the art. Exemplary adsorbent materials may include activated carbon, clay, or fuller's earth.

In certain areas with oil shale resources, additional hydrocarbon resources may exist at lower depths. Other hydrocarbon resources may include a deeper oil shale formation. Other hydrocarbon resources may also include natural gas in a deeper, low-permeability formation. Such formations exist in some portions of the Western United States in so-called "tight gas" formations. Other hydrocarbon resources may include natural gas trapped in and adsorbed onto coal. Such formations are sometimes referred to as "coalbed methane."

A challenge exists with the simultaneous development of a formation which requires pyrolysis and a deeper formation. In this respect, the pyrolysis of an oil shale or tar sands formation for the production of oil and gas requires that the formation be heated. Such temperatures often exceed 600° F. No current technology exists for drilling through such high temperature rocks in order to access a deeper hydrocarbon resource. Even if wells are pre-drilled to the deeper formation, conventional well designs are not intended to survive the extreme thermal stresses created by these temperatures.

Accordingly, it is proposed herein to reserve certain areas within a hydrocarbon development area which are not substantially heated. At the surface, such areas may be referred to as pads. Wells targeting a deeper resource are drilled vertically or directionally from the surface well pads. The directional wells to the deeper resource can be deviated below the oil shale zones so that they avoid the high temperatures associated with in situ oil shale heating.

Figure 6:
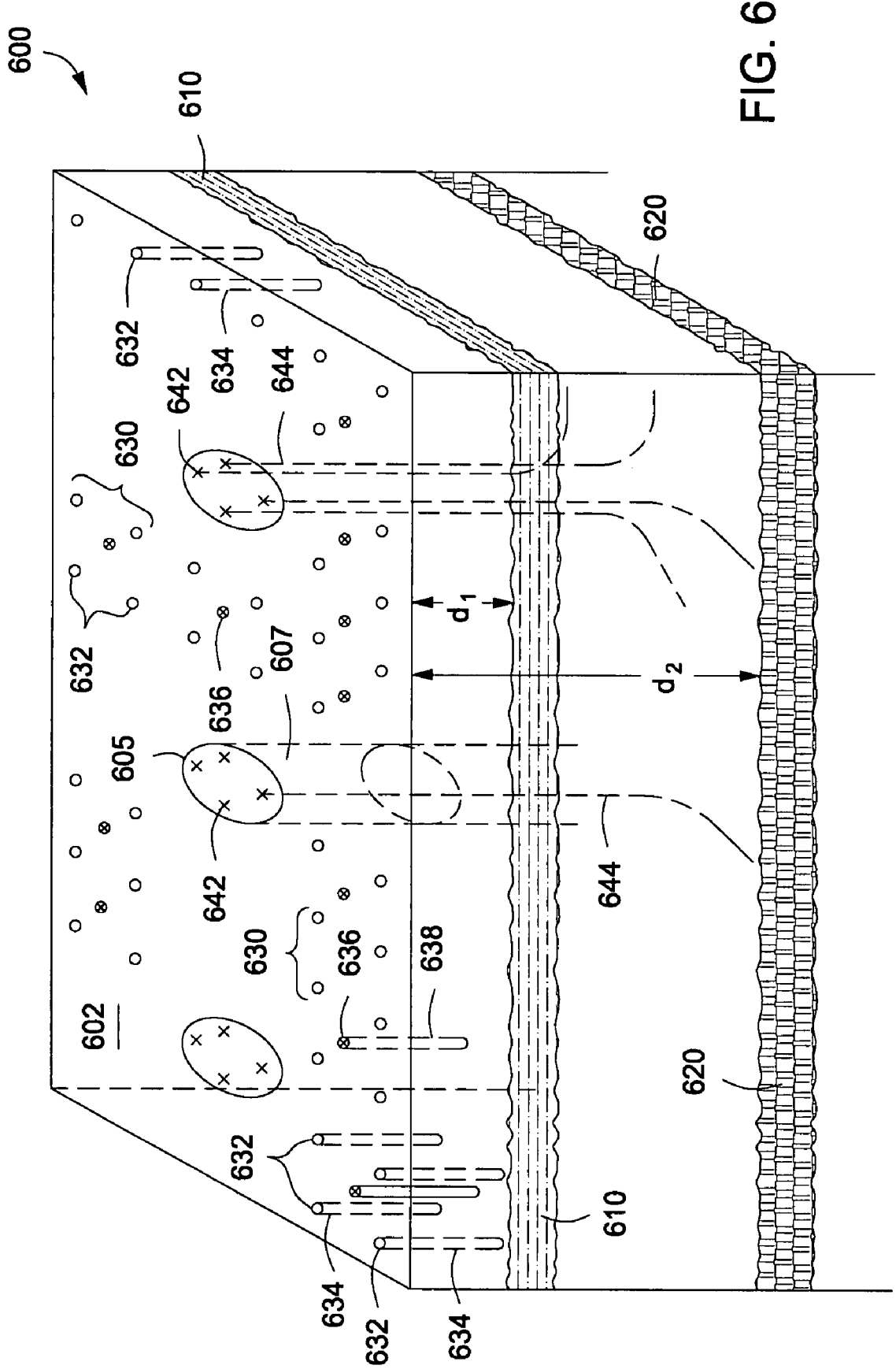
FIG. 6 is a perspective view of a portion of a hydrocarbon development area, in one embodiment. An illustrative organic-rich rock formation is shown beneath the surface. A second deeper hydrocarbon resource is also shown.

FIG. 6 is a cross-sectional view of a portion of a hydrocarbon development area 600. The development area 600 represents a surface 602, and a formation 610 below the surface 602. The subsurface formation 610 is an organic rich rock formation, such as oil shale. The oil shale formation 610 comprises kerogen which may be converted to hydrocarbon fluids. The development area 600 is for the purpose of developing hydrocarbons from the subsurface oil shale formation 610. This is accomplished through an in situ heating and pyrolysis process.

The formation 610 is at a depth "$d_1$". The depth "$d_1$" is generally measured by the distance between the surface 602 and the top of the formation 610. In some embodiments, the oil shale formation 610 targeted for in situ pyrolysis is at a depth greater than 200 feet below the surface. In alternative embodiments, the oil shale formation 610 targeted for in situ pyrolysis is at a depth greater than 500, 1000, or 1500 feet below the surface 602, but typically no deeper than 5,000 feet. In alternative embodiments, the oil shale formation 610 targeted for in situ pyrolysis is at a depth between 500 and 4,000 feet, alternatively between 600 and 3,500 feet, or 700 and 3,000 feet below the surface 602.

The formation 610 may be an oil shale having a very limited permeability initially, e.g., less than 5 millidarcies. In order to develop the oil shale formation 610, it is necessary to pyrolyze the solid hydrocarbons, or kerogen, in the formation 610. This is done by heating the formation 610 at or above a pyrolysis temperature for an extended period of time. In order to heat the formation 610 and produce hydrocarbons, a plurality of heater wells 632 are provided. In the illustrative development area 600, the heater wells 632 are arranged in a plurality of rows, or linear arrays. Each heater well 632 has a wellbore 634 extending down to and completed in the formation 610. Each wellbore 634 in the arrangement of FIG. 6 is substantially vertical. However, the present inventions are not limited by the nature of the completion or the arrangements for the heater wells 632.

Preferably, the heater wells 632 are designed to provide resistive heat to the formation 610 at a selected temperature. In one aspect, the pyrolyzed oil shale formation 610 will have an average permeability of greater than 10 millidarcies after heating. The heater wells 632 may be located in relatively close proximity, being from 10 feet to up to 300 feet in separation. Alternatively, the wellbores may be spaced from 20 to 200 feet or from 30 to 100 feet.

Interspersed between the lines of heater wells 632 are production wells 636. Each production well 636 also has a wellbore 638 extending down to and completed in the formation 610. Each production wellbore 636 in the arrangement of FIG. 6 is also substantially vertical. However, the present inventions are not limited by the nature of the completion or the arrangements for the production wells 636.

It can be seen that the heater wells 632 and the production wells 636 are arranged in repeating 5-spot patterns. The patterns are selectively indicated at 630. The 5-spot pattern is merely illustrative; the relative arrangement of the heater wells 632 to the production wells 636 may be in any other pattern, including any other polygonal pattern such as a 3-spot pattern or a 7-spot pattern (not shown).

It is noted that the process of heating an oil shale formation 610 using the heater wells 632 also changes the permeability of the formation 610. By heating the oil shale and transforming the kerogen to oil and gas, the permeability is increased through the gradual conversion of kerogen to fluids. Pyrolyzed hydrocarbon fluids migrate in the formation 610 to the wellbores 638 of the production wells 636.

In the development area 600 of FIG. 6, another hydrocarbon resource is located below the oil shale formation. The deeper resource is indicated at 620, and is located at a second depth "$d_2$". The depth "$d_2$" is again measured by the distance between the surface 602 and the top of the deeper resource 620. In some embodiments, the deeper resource 620 targeted for production is at a depth greater than 3,000 feet below the surface. In alternative embodiments, the deeper resource 620 is at a depth greater than 5,000, 7,500, or 10,000 feet below the surface 602.

The deeper hydrocarbon resource 620 may comprise a deeper oil shale formation. Alternatively, the deeper resource 620 may be a "tight gas" formation. Alternatively still, the deeper hydrocarbon resource may be a "coalbed methane" formation. Still further, the deeper resource 620 may be a more conventional oil and gas resource.

In order to access the deeper hydrocarbon resource 620, a plurality of deeper production wells 642 are provided. Each deeper production well 642 has a wellbore 644 that is completed in the deeper resource 620. In this instance, at least some of the wellbores 644 are deviated. In this way, the completions extend to various portions of the deeper resource 620.

One or more pads 605 are preserved in the well patterns 630. The pads 605 represent areas in the surface 602 without heater wells 632. The pads 605 further represent pillars of substantially unheated rock that extend down to the oil shale (or more shallow) formation 610. In this respect, surface locations for the well pads 605 may be selected to coincide with portions of the oil shale formation 610 left untreated so as to act as pillars supporting the overburden should the treated oil shale lose its mechanical integrity. The pillars represent an unheated zone 607.

In the view of FIG. 6, three well pads 605 are shown. The well pads 605 are sized to permit one to 20 deeper production wells 642 to be drilled to the deeper hydrocarbon resource 620. In one embodiment, up to ten drill sites (not shown) at 2-acre spacing are provided on the pad 605.

Some distance is desirable between the heater wells 632 and the pads 605. In one aspect, a spacing of 50 feet is provided between the pads 605 and the nearest heater well 632. In another aspect, a spacing of 100 feet, or 150 feet, or 200 feet, is provided between the pads 605 and the nearest heater well 632. The spacing should be sufficient to prevent the wellbores 644 for the deeper production wells 642 from being exposed to temperatures above about 300° F.

In the well development area 600, the pads 605 are located interior to the development area 600. However, in an alternative embodiment, the pads may also be along a periphery of the development area.

Figure 7:
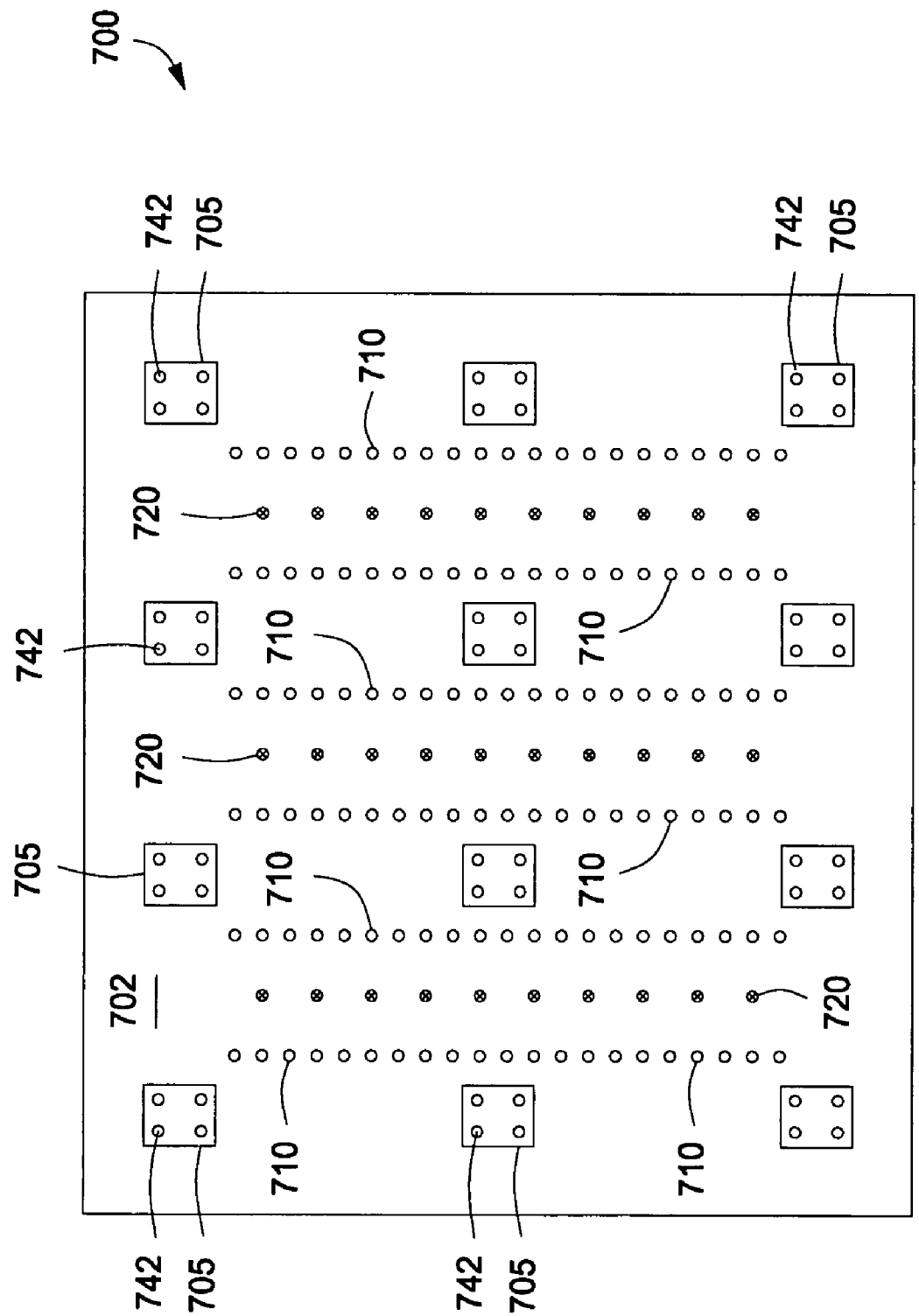
FIG. 7 is a plan view of a hydrocarbon development area, in an alternate embodiment. A plurality of pads is shown in the hydrocarbon development area.

FIG. 7 is a plan view of a hydrocarbon development area 700, in such an alternate embodiment. Here, a plurality of pads 705 is provided. The pads 705 are located on the earth surface 702. Each pad 705 has at least one deeper production well 742. The deeper production wells 742 extend down to a deeper resource, such as resource 620 shown in FIG. 6. Some of the pads 705 are disposed within the development area 700. Deeper production wells 742 located on such pads 705 are preferably vertical. However, some of the pads 705 are disposed at the periphery of the development area 705. In that case, the deeper production wells 742 may be deviated and completed for production at a point within the development area 700.

In the illustrative development area 700, well pads 705 for drilling wells to the deeper resource are roughly 850 feet by 350 feet. If the deeper resource were developed on approximately 20 acre spacing, 21 wells would be drilled from each of the pads 705.

The development area 700 is also for the purpose of producing hydrocarbons from a more shallow formation (such as oil shale formation 610 of FIG. 6). For this operation, a plurality of heater wells 710 is provided. The heater wells 710 heat the formation, such as through resistive heat, in order to pyrolyze organic rich rock. In this way, hydrocarbon fluids are generated for recovery.

In order to produce the hydrocarbon fluids, a plurality of production wells are formed. Production wells are shown at 720. In the illustrative development area arrangement 700, the heater well 710—to—production well 720 ratio is 6:1. However, any ratio may be employed for the methods herein.

Simultaneous development of shale oil resources and natural gas resources in the same area can synergistically utilize certain facility and logistic operations. For example, gas treating may be performed at a single plant. Likewise personnel may be shared among the developments. Still further, the placement of pads 705 within the development area 700 helps prevent subsidence from the surface 702. The deeper hydrocarbon resource should be developed without leaving any more of the oil shale untreated than is necessary to mitigate subsidence.

Figure 8:
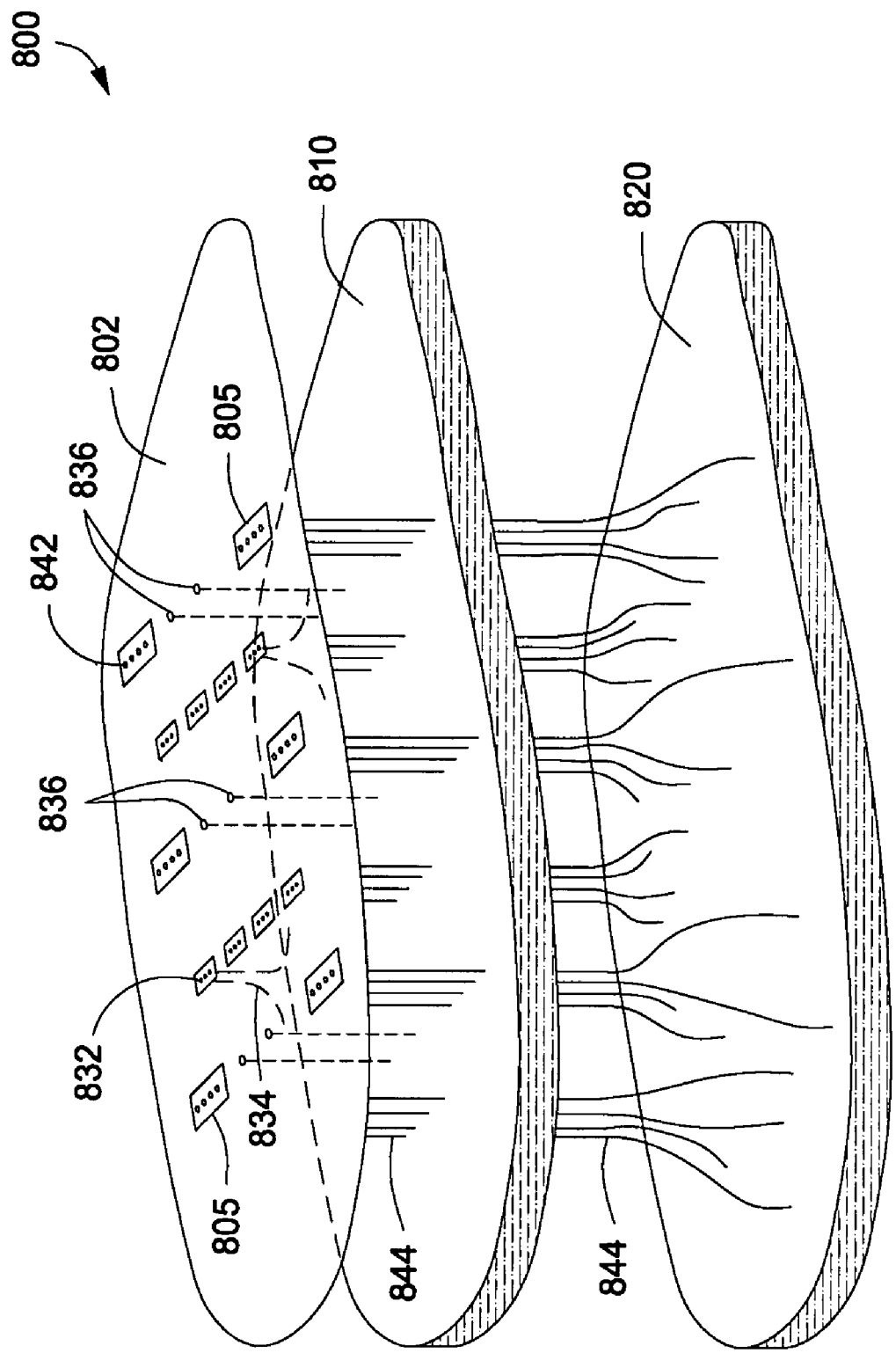
FIG. 8 is a perspective view of a shale oil development area, in one embodiment. A plurality of pads is shown for drilling wells down to a hydrocarbon reservoir deeper than a shale oil depth.

FIG. 8 provides a perspective view of an illustrative hydrocarbon development area 800, in yet an additional arrangement. Here, a surface area is shown at 802. Below the surface 802 is an oil shale formation 810. The oil shale formation 810 may represent a plurality of zones in close proximity. Below the oil shale formation 810 is a deeper hydrocarbon resource 820.

In order to pyrolyze the oil shale into hydrocarbon fluids, a plurality of heater wells 832 are provided. The illustrative heater wells 832 are completed in the oil shale formation 810 horizontally. Two illustrative horizontal wellbores are shown in broken lines at 834. Heater wells 832 are provided to generate pyrolyzed hydrocarbon fluids within the oil shale formation 810 and production wells 836 are provided to produce the pyrolyzed hydrocarbon fluids from the oil shale formation 810.

Also visible at the surface 802 of the development area 800 are various pads 805. The pads 805 contain deeper production wells 842 for producing hydrocarbons from the deeper hydrocarbon resource 820. Each deeper production well 842 has a corresponding wellbore 844. It can be seen that the wellbores 844 are deviated in order to produce hydrocarbons from various points below the oil shale formation 810. Most importantly, the wellbores 844 for the deeper production wells 842 are arranged to avoid heat generated from the wellbores 834 of the heater wells 832.

From the above descriptions and illustrations, it can be seen that a method for producing hydrocarbons from subsurface formations at different depths is provided. In one aspect, the method includes the step of heating organic-rich rock, in situ, within a subsurface formation (such as formation 610) at a first depth $d_1$. The result of the heating step is that at least a portion of the organic-rich rock in the formation 610 is pyrolyzed into hydrocarbon fluids. Preferably, the organic-rich rock of the formation 610 of the first depth $d_1$ is oil shale.

The method also includes providing at least one substantially unheated zone (such as zone 607) within the subsurface formation 610 of the first depth $d_1$. In this way, the organic-rich rock in that zone 607 is left substantially unpyrolyzed. The method further includes drilling at least one deeper production well (such as well 642) through the unheated zone 607, and completing the at least one deeper production well 642 in a subsurface formation (such as formation 620) at a second depth $d_2$ that is deeper than the first depth $d_1$. Thereafter, hydrocarbon fluids are produced through the at least one deeper production well 642.

In one embodiment, the step of heating the subsurface formation 610 at the first depth $d_1$ comprises completing a plurality of heater wells (such as heater wells 632) designed to heat the organic-rich rock, in situ. The heater wells 632 may be electrically resistive heater wells. Alternatively, the heater wells 632 may be designed to circulate a heated fluid in order to heat the surrounding formation through thermal convection. Alternatively, the heater wells 632 may provide downhole combustion. Regardless of the method, the step of heating the subsurface formation 610 at the first depth $d_1$ preferably results in at least a portion of the organic-rich rock formation 610 reaching a temperature of 300° C. or greater.

The hydrocarbon fluids produced from the at least one deeper production well 642 may comprise natural gas. An example of such natural gas is methane. In one aspect the method further includes the step of using the natural gas produced from the at least one production well 642 to at least in part generate electricity. In one aspect, the electricity is used to provide power to the heater wells 632, with the heater wells 632 being electrically resistive heater wells.

In one embodiment of the invention, the at least one deeper production well 642 comprises a plurality of production wells drilled through the unheated zone 607. The deeper production wells 642 may be drilled from various places relative to a development area (such as area 600). For instance, the production wells 642 may be drilled from an earth surface area, or pad 605, directly above the unheated zone 607. In this instance, at least some of the production wells 642 may be deviated below the first depth $d_1$, and then completed in the subsurface formation 620 of the second depth $d_2$ at a spacing of at least 10 acres. In another aspect, the production wells 642 may be drilled from an earth surface area 602 that is not directly above the unheated zone. For instance, the surface area may be a pad 605 at a perimeter of the oil shale development area 600.

Some or all of the plurality of deeper production wells 642 are drilled from a common location on the earth's surface 602. For example, the common location may be a surface well pad 605 located on the earth's surface above the heated zone. The well pad 605 may have a surface area of less than 100,000 $ft^2$. The pad 605 may be directly above the unheated zone in order to define a drilling pad which receives, for example, about 3 to about 10 production wells. Some or all of the plurality of production wells 642 may be deviated. In this instance, the deviated production wells 642 may become substantially deviated at a depth greater than the lowest depth of the heated oil shale formation 610. Regardless of whether the production wells are or are not deviated, some or all of the plurality of production wells 642 may be completed in the deeper subsurface formation 620. Alternatively, some or all of the plurality of production wells may be completed in different subsurface formations below the first depth $d_1$.

The methods of the present disclosure may include the additional step of producing hydrocarbon fluids pyrolyzed in the organic-rich rock of the subsurface formation 610 of the first depth $d_1$. In one embodiment, the production of pyrolyzed hydrocarbon fluids from the organic-rich rock occurs simultaneously, in whole or in part, with the production of hydrocarbon fluids from the subsurface formation 620 deeper than the first depth. In an alternate aspect, the production of hydrocarbon fluids through the at least one production well 642 is discontinued, and then the heating step is performed in order to pyrolyze at least a portion of the organic-rich rock in the unheated zone 607 into hydrocarbon fluids.

In one aspect of the above method, the hydrocarbon fluids produced from the at least one production well 642 at the second depth $d_2$ define a gas stream comprising methane and hydrogen sulfide. The organic-rich rock of the subsurface formation 610 of the first depth $d_1$ may comprise a coal bed. In this instance, the method may further comprise the step of injecting the gas stream into the coal bed so as to remove at least a portion of the hydrogen sulfide from the gas stream. Such a method may further include producing gas from the coal bed. The gas stream produced from the second depth 620 may also comprise carbon dioxide. In this instance, the method may further include the step of removing at least a portion of the carbon dioxide from the gas stream.

In another aspect of the above method, the hydrocarbon fluids produced from the at least one production well 642 at the second depth $d_2$ comprise hydrogen sulfide. The organic-rich rock of the subsurface formation 610 of the first depth $d_1$ may again comprise a coal bed. In this instance, the method further may comprise the step of injecting a gas stream from the hydrocarbon fluids that has a substantial portion of the hydrogen sulfide into the coal bed. Still further, the method may include producing a methane-rich gas from the coal bed.

In one embodiment, the method includes the step of completing at least one cooling well through the unheated zone 607 in order to prevent pyrolysis of the organic-rich rock in the unheated zone 607. The cooling well preferably has a downhole piping assembly for circulating a cooling fluid. The cooling fluid may keep the unheated zone from reaching temperatures in excess of 250° C. or, more preferably, 125° C.

The portion of the surface 602 within the development area 600 that is not within the unheated zone 607 is, inferentially, a heated zone. The ratio of the surface area of the heated zone to the unheated zone 607 may vary. In one aspect, the at least one substantially unheated zone 607 comprises no more than 50 percent of the area under oil shale development. Alternatively, the at least one substantially unheated zone 607 comprises no more than 20 percent of the area under oil shale development or, alternatively still, no more than 10 percent of the area under oil shale development. In one embodiment, the at least one substantially unheated zone 607 comprises a plurality of unheated zones, each of which individually comprises no more than 20 percent of the area under oil shale development. In this embodiment, the plurality of unheated zones may form a patchwork within heated areas of the area under oil shale development. In addition, the step of drilling at least one production well through a plurality of the unheated zones 607 may comprise selecting pads 605 on the earth surface 602 that correspond to the patchwork of substantially unheated zones subsurface.

It may be desirable to cool a heated zone after heating. Thus, in one embodiment the method further comprises injecting water into one or more of the subsurface formations 610 at the first depth $d_1$ and/or the subsurface formation 620 deeper than the first depth $d_1$, thereby cooling at least a portion of the heated zone.

In one particularly preferred embodiment, the unheated zones 607 serve as pillars to prevent subsidence in the earth. In this embodiment, the plurality of unheated zones may form a patchwork within heated areas of an area (such as area 600) under oil shale development. The step of selecting pads 605 for the substantially unheated zones within the subsurface formation 610 of the first depth $d_1$ may comprise determining a minimum number of unheated zones 607 needed to prevent subsidence in the earth within the area 600 under oil shale development.

Various sequences may be used for the method of producing hydrocarbons from subsurface formations at different depths. In one aspect, the step of drilling at least one production well 642 through the unheated zone 607 occurs prior to the step of heating the organic-rich rock within the subsurface formation 610 at the first depth $d_1$. In another aspect, the step of drilling at least one production well 642 through the unheated zone 607 occurs during the first 1 to 26 weeks of first heating the organic-rich rock within the subsurface formation 610 at the first depth $d_1$. In still another aspect, the step of drilling at least one production well 642 through the unheated zone 607 occurs after at least a portion of the organic-rich rock within the subsurface formation 610 at the first depth $d_1$ has been heated to at least 100° C.

Figure 9:
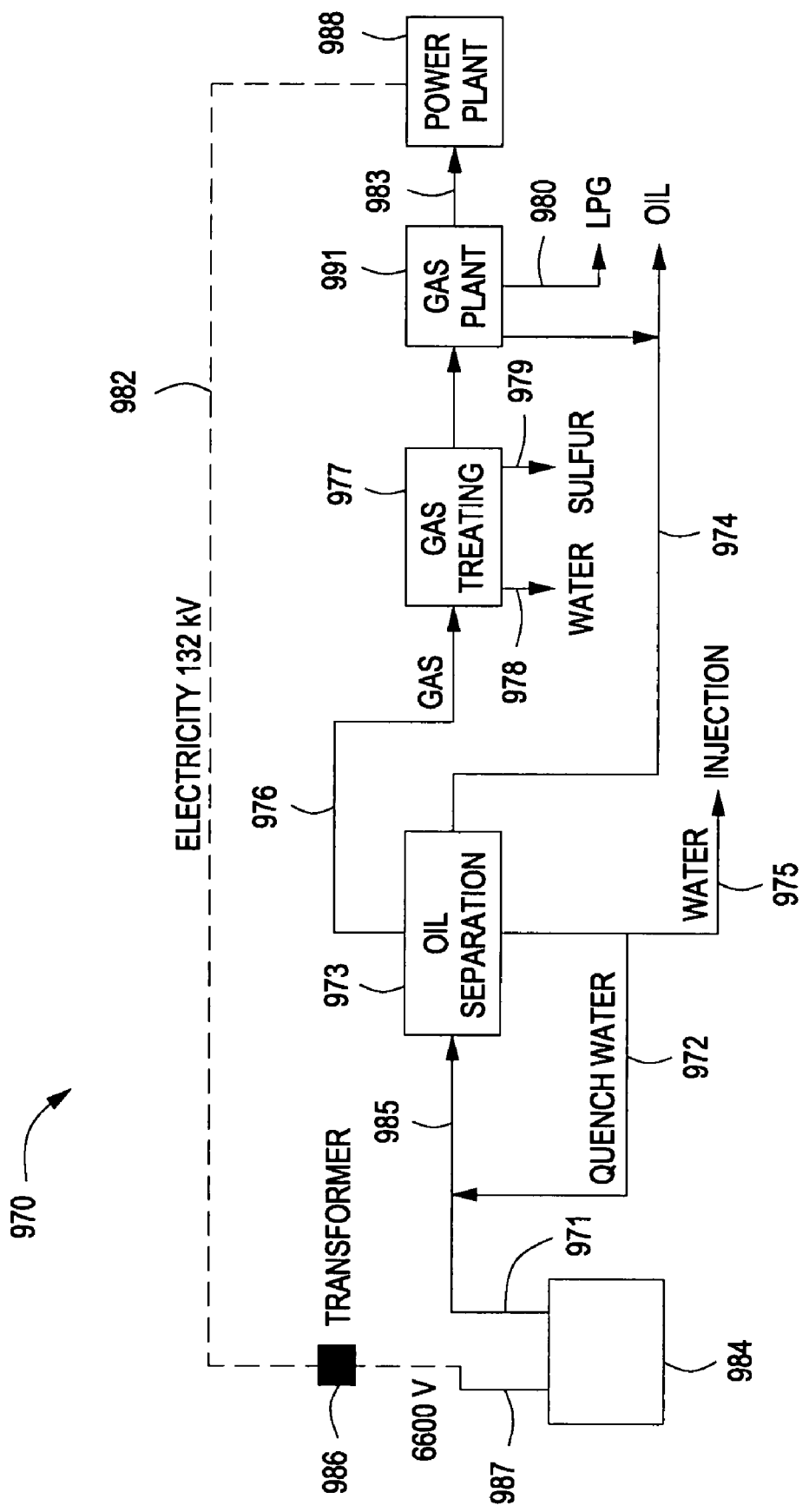
FIG. 9 is a process flow diagram of exemplary surface processing facilities for a subsurface formation development.

FIG. 9 illustrates a schematic diagram of an embodiment of surface facilities 970 that may be configured to treat a produced fluid. The produced fluid 985 may be produced from the subsurface formation 984 though a production well 971 as described herein. The produced fluid 985 may include any of the produced fluids produced by any of the methods as described herein. The subsurface formation 984 may be any subsurface formation, including, for example, an organic-rich rock formation containing any of oil shale, coal, or tar sands for example.

A production scheme may involve quenching 972 produced fluids to a temperature below 300° F., 200° F., or even 100° F., separating out condensable components (i.e., oil 974 and water 975) in an oil separator 973, treating the noncondensable components 976 (i.e. gas) in a gas treating unit 977 to remove water 978 and sulfur species 979, removing the heavier components from the gas (e.g., propane and butanes) in a gas plant 991 to form liquid petroleum gas (LPG) 980 for sale, and generating electrical power 982 in a power plant 988 from the remaining gas 983.

The electrical power 982 may be used as an energy source for heating the subsurface formation 984 through any of the methods described herein. For example, the electrical power 982 may be fed at a high voltage, for example 132,000 V, to a transformer 986 and stepped down to a lower voltage, for example 6,600 V, before being fed to an electrical resistance heater element located in a heater well 987 located in the subsurface formation 984. In this way all or a portion of the power required to heat the subsurface formation 984 may be generated from the non-condensable components 976 of the produced fluids 985. Excess gas, if available, may be exported for sale.

Produced fluids from in situ oil shale production contain a number of components which may be separated in surface facilities. The produced fluids typically contain water, non-condensable hydrocarbon alkane species (e.g., methane, ethane, propane, n-butane, isobutane), noncondensable hydrocarbon alkene species (e.g., ethene, propene), condensable hydrocarbon species composed of alkanes, olefins, aromatics, and polyaromatics among others, as well as $CO_2$, $CO$, $H_2$, $H_2S$, and $NH_3$.

In a surface facility, condensable components may be separated from non-condensable components by reducing temperature and/or increasing pressure. Temperature reduction may be accomplished using heat exchangers cooled by ambient air or available water. Alternatively, the hot produced fluids may be cooled via heat exchange with produced hydrocarbon fluids previously cooled. The pressure may be increased via centrifugal or reciprocating compressors. Alternatively, or in conjunction, a diffuser-expander apparatus may be used to condense out liquids from gaseous flows. Separations may involve several stages of cooling and/or pressure changes.

In addition to condensable hydrocarbons 980, water may be dropped out of the gas when reducing temperature or increasing pressure. Liquid water may be separated from condensed hydrocarbons via gravity settling vessels or centrifugal separators. Demulsifiers may be used to aid in water separation.

Methods to remove $CO_2$, as well as other so-called acid gases (such as $H_2S$), from produced hydrocarbon gas include the use of chemical reaction processes and of physical solvent processes. Chemical reaction processes typically involve contacting the gas stream with an aqueous amine solution at high pressure and/or low temperature. This causes the acid gas species to chemically react with the amines and go into solution. By raising the temperature and/or lowering the pressure, the chemical reaction can be reversed and a concentrated stream of acid gases can be recovered. An alternative chemical reaction process involves hot carbonate solutions, typically potassium carbonate. The hot carbonate solution is regenerated and the concentrated stream of acid gases is recovered by contacting the solution with steam. Physical solvent processes typically involve contacting the gas stream with a glycol at high pressure and/or low temperature. Like the amine processes, reducing the pressure or raising the temperature allows regeneration of the solvent and recovery of the acid gases. Certain amines or glycols may be more or less selective in the types of acid gas species removed. Sizing of any of these processes requires determining the amount of chemical to circulate, the rate of circulation, the energy input for regeneration, and the size and type of gas-chemical contacting equipment. Contacting equipment may include packed or multi-tray countercurrent towers. Optimal sizing for each of these aspects is highly dependent on the rate at which gas is being produced from the formation and the concentration of the acid gases in the gas stream.

Acid gas removal may also be effectuated through the use of distillation towers. Such towers may include an intermediate freezing section wherein frozen $CO_2$ and $H_2S$ particles are allowed to form. A mixture of frozen particles and liquids fall downward into a stripping section, where the lighter hydrocarbon gasses break out and rise within the tower. A rectification section may be provided at an upper end of the tower to further facilitate the cleaning of the overhead gas stream.

The hydrogen content of a gas stream may be adjusted by either removing all or a portion of the hydrogen or by removing all or a portion of the non-hydrogen species (e.g., $CO_2$, $CH_4$, etc.) Separations may be accomplished using cryogenic condensation, pressure-swing or temperature-swing adsorption, or selective diffusion membranes. If additional hydrogen is needed, hydrogen may be made by reforming methane via the classic water-shift reaction.

CONCLUSION

The above-described processes may be of merit in connection with the recovery of hydrocarbons in the Piceance Basin of Colorado. Some have estimated that in some oil shale deposits of the Western United States, up to 1 million barrels of oil may be recoverable per surface acre. One study has estimated the oil shale resource within the nahcolite-bearing portions of the oil shale formations of the Piceance Basin to be 400 billion barrels of shale oil in place. Overall, up to 1 trillion barrels of shale oil may exist in the Piceance Basin alone.

Certain features of the present invention are described in terms of a set of numerical upper limits and a set of numerical lower limits. It should be appreciated that ranges formed by any combination of these limits are within the scope of the invention unless otherwise indicated. Although some of the dependent claims have single dependencies in accordance with U.S. practice, each of the features in any of such dependent claims can be combined with each of the features of one or more of the other dependent claims dependent upon the same independent claim or claims.

While it will be apparent that the invention herein described is well calculated to achieve the benefits and advantages set forth above, it will be appreciated that the invention is susceptible to modification, variation and change without departing from the spirit thereof.

What is claimed is:

1. A method for producing hydrocarbons from subsurface formations at different depths, comprising:
   heating organic-rich rock comprising oil shale to a pyrolysis temperature, in situ, within a subsurface formation at a first depth, thereby pyrolyzing at least a portion of the organic-rich rock into hydrocarbon fluids;
   providing at least one substantially unheated zone within the subsurface formation of the first depth, thereby leaving the organic-rich rock in the at least one substantially unheated zone below a pyrolysis temperature, wherein the substantially unheated zone comprises a substantially unheated vertical pillar interior to and surrounded laterally by the heated portion of the organic-rich rock at the first depth;
   drilling at least one production well through the at least one substantially unheated vertical pillar at the first depth, and completing the at least one production well in a subsurface formation at a second depth that is deeper than the first depth, wherein the subsurface formation at the second depth is a tight gas formation and the at least one production well is substantially vertical in orientation as the at least one production well passes through the substantially unheated vertical pillar at the first depth; and
   producing hydrocarbon fluids comprising natural gas from the tight gas formation through the at least one production well.

2. The method of claim 1, wherein the organic-rich rock of the subsurface formation of the first depth contains solid hydrocarbons.

3. The method of claim 1, wherein heating the subsurface formation at the first depth comprises completing at least one heater designed to heat the organic-rich rock, in situ.

4. The method of claim 3, wherein the at least one heater comprises electrically resistive heaters.

5. The method of claim 3, further comprising producing hydrocarbon fluids pyrolyzed in the organic-rich rock of the subsurface formation of the first depth while simultaneously producing the hydrocarbon fluids comprising natural gas from the tight gas formation through the at least one production well.

6. The method of claim 3, further comprising the step of:
using the natural gas produced from the at least one production well to at least in part generate electricity.

7. The method of claim 6, wherein:
the at least one heater comprises electrically resistive heaters; and
the electricity is used in the operation of the heaters.

8. The method of claim 1, wherein heating the subsurface formation at the first depth results in at least a portion of the organic-rich rock formation comprising oil shale reaching a temperature of 300° C. or greater.

9. The method of claim 1, wherein the at least one production well comprises a plurality of production wells drilled through at least one substantially unheated vertical pillar in the unheated zone.

10. The method of claim 9, wherein the plurality of production wells are drilled from an earth surface area directly above the unheated zone.

11. The method of claim 10, wherein at least some of the plurality of production wells are deviated below the subsurface formation of the first depth, and then completed in the subsurface formation of the second depth at a spacing of at least 10 acres.

12. The method of claim 1, wherein the at least one production well is drilled from an earth surface area that is not directly above the unheated zone.

13. The method of claim 12, wherein the earth surface area is at a perimeter of an oil shale development area which comprises a plurality of heaters for heating the subsurface formation at the first depth.

14. The method of claim 1, wherein the production of pyrolyzed hydrocarbon fluids from the organic-rich rock occurs simultaneously, in whole or in part, with the production of hydrocarbon fluids from the subsurface tight gas formation deeper than the first depth.

15. The method of claim 1, further comprising the steps of:
discontinuing producing hydrocarbon fluids through the at least one production well; and
heating the organic-rich rock, in situ, within the unheated zone of the subsurface formation of the first depth, thereby pyrolyzing at least a portion of the organic-rich rock in the unheated zone into hydrocarbon fluids.

16. The method of claim 1, further comprising:
producing hydrocarbon fluids pyrolyzed in the organic-rich rock of the subsurface formation of the first depth, and
wherein drilling at least one production well comprises drilling a plurality of tight gas production wells through the at least one substantially unheated zone, and the at least one substantially unheated zone comprises a plurality of substantially unheated vertical pillars to prevent subsidence in the earth and to accommodate each of the gas production wells through the at least one unheated zone.

17. The method of claim 1, further comprising:
completing at least one cooling well through the unheated zone in order to prevent pyrolysis of the organic-rich rock in the unheated zone.

18. The method of claim 17, wherein the at least one cooling well comprises a downhole piping assembly for circulating a cooling fluid.

19. The method of claim 18, wherein the cooling fluid has been chilled at the earth surface prior to circulating.

20. The method of claim 1, wherein the unheated zone reaches a maximum average temperature of less than 250° C.

21. The method of claim 1, wherein the at least one substantially unheated zone comprises no more than 50 percent of the area under oil shale development.

22. The method of claim 21, wherein:
the at least one substantially unheated zone comprises a plurality of unheated pillars, each of which individually comprises no more than 20 percent of the area under oil shale development.

23. The method of claim 1, wherein the pyrolysis temperature is between 270° C. to 900° C.

24. The method of claim 23, wherein the pyrolysis temperature is between 300° C. to 600° C.

25. The method of claim 1, wherein the pyrolysis temperature is between 270° C. to 500° C.

26. A method for producing hydrocarbons from subsurface formations at different depths, comprising:
heating organic-rich rock comprising oil shale to a pyrolysis temperature, in situ, within a subsurface formation at a first depth, thereby pyrolyzing at least a portion of the organic-rich rock into hydrocarbon fluids;
providing at least one substantially unheated zone within the subsurface formation of the first depth, wherein the organic-rich rock in the at least one unheated zone reaches a maximum average temperature of less than 250° C. and includes a substantially unheated vertical pillar interior to and surrounded laterally by the heated portion of the organic-rich rock at the first depth;
drilling at least one production well through the at least one substantially unheated vertical pillar at the first depth, and completing the at least one production well in a subsurface formation at a second depth that is deeper than the first depth, wherein the subsurface formation at the second depth is a tight gas formation; and
producing hydrocarbon fluids comprising natural gas from the tight gas formation through the at least one production well.

27. The method of claim 26, wherein the organic-rich rock of the subsurface formation of the first depth contains solid hydrocarbons.

28. The method of claim 27, wherein the production of pyrolyzed hydrocarbon fluids from the organic-rich rock occurs simultaneously, in whole or in part, with the production of hydrocarbon fluids from the subsurface tight gas formation deeper than the first depth.

29. The method of claim 27, further comprising:
discontinuing producing hydrocarbon fluids through the at least one production well; and
heating the organic-rich rock, in situ, after discontinuing producing hydrocarbon fluids through the at least one production well within the unheated zone of the subsurface formation of the first depth, thereby pyrolyzing at least a portion of the organic-rich rock in the unheated zone into hydrocarbon fluids.

30. The method of claim 27, further comprising:
producing hydrocarbon fluids pyrolyzed in the organic-rich rock of the subsurface formation of the first depth; and
wherein drilling at least one production well comprises drilling a plurality of tight gas production wells through the at least one substantially unheated zone, and the at least one substantially unheated zone comprises a plurality of substantially unheated vertical pillars to prevent subsidence in the earth and to accommodate each of the gas production wells through the at least one unheated zone.

31. The method of claim 27, further comprising:
completing at least one cooling well through the unheated zone in order to prevent pyrolysis of the organic-rich rock in the unheated zone.

32. The method of claim 31, wherein the at least one cooling well comprises a downhole piping assembly for circulating a cooling fluid.

33. The method of claim 32, wherein the cooling fluid has been chilled at the earth surface prior to circulating.

34. The method of claim 27, wherein the at least one substantially unheated zone comprises no more than 50 percent of the area under oil shale development.

35. The method of claim 34, wherein:
the at least one substantially unheated zone comprises a plurality of unheated pillars, each of which individually comprises no more than 20 percent of the area under oil shale development.

36. The method of claim 26, wherein heating the subsurface formation at the first depth comprises completing at least one heater designed to heat the organic-rich rock, in situ.

37. The method of claim 36, wherein the at least one heater comprises electrically resistive heaters.

38. The method of claim 36, further comprising using the natural gas produced from the at least one production well to at least in part generate electricity.

39. The method of claim 38, wherein:
the at least one heater comprises electrically resistive heaters; and
the electricity is used in the operation of the heaters.

40. The method of claim 36, wherein the at least one production well is drilled from an earth surface area that is not directly above the unheated zone.

41. The method of claim 40, wherein the earth surface area is at a perimeter of an oil shale development area which comprises a plurality of heaters for heating the subsurface formation at the first depth.

42. The method of claim 26, wherein heating the subsurface formation at the first depth results in at least a portion of the organic-rich rock formation reaching a temperature of 300° C or greater.

43. The method of claim 26, wherein the at least one production well comprises a plurality of production wells drilled through the substantially unheated vertical pillar at the first depth.

44. The method of claim 43, wherein the plurality of production wells are drilled from an earth surface area directly above the unheated zone.

45. The method of claim 43, wherein at least some of the plurality of production wells are deviated below the subsurface formation of the first depth, and then completed in the subsurface formation of the second depth at a spacing of at least 10 acres.

46. A method for producing hydrocarbons from subsurface formations at different depths, comprising:
heating organic-rich rock comprising oil shale to a pyrolysis temperature, in situ, within a subsurface oil shale formation at a first depth, thereby pyrolyzing at least a portion of the organic-rich rock into hydrocarbon fluids;
providing at least one substantially unheated zone within the subsurface formation of the first depth, wherein the organic-rich rock in the unheated zone reaches a maximum average temperature of less than 250° C. and includes a substantially unheated vertical pillar interior to and surrounded laterally by the heated portion of the organic-rich rock at the first depth;
drilling at least one production well through the at least one substantially unheated vertical pillar at the first depth, and completing the at least one production well in a subsurface formation at a second depth that is deeper than the first depth, wherein the subsurface formation at the second depth comprises a coalbed methane formation; and
producing hydrocarbon fluids through the at least one production well.

* * * * *